US012303448B2

(12) United States Patent
Stock et al.

(10) Patent No.: US 12,303,448 B2
(45) Date of Patent: May 20, 2025

(54) MYOFASCIAL DEVICE WITH ROTATABLE ASSEMBLY

(71) Applicant: CHIRP INNOVATION, INC., Lehi, UT (US)

(72) Inventors: Tate Sherman Stock, Draper, UT (US); Reeve Stewart Sudweeks, Lehi, UT (US); Mike Hessing, Lehi, UT (US); Jason Lee Walton, Draper, UT (US); Weston N. Hills, Kamas, UT (US); Brian Connolly Nielson, American Fork, UT (US)

(73) Assignee: Chirp Innovation, Inc., Lehi, UT (US)

( * ) Notice: Subject to any disclaimer, the term of this patent is extended or adjusted under 35 U.S.C. 154(b) by 0 days.

(21) Appl. No.: 18/238,349

(22) Filed: Aug. 25, 2023

(65) Prior Publication Data

US 2025/0064669 A1 Feb. 27, 2025

(51) Int. Cl.
*A61H 15/00* (2006.01)

(52) U.S. Cl.
CPC . *A61H 15/0085* (2013.01); *A61H 2015/0021* (2013.01)

(58) Field of Classification Search
CPC ........................ A61H 15/0085; A61H 15/0092
See application file for complete search history.

(56) References Cited

U.S. PATENT DOCUMENTS 1,567,741 A * 12/1925 Lloyd .................... A61N 1/322 200/19.13
1,569,426 A * 1/1926 Krauthoff .......... A61H 15/0092 601/125
1,757,004 A * 5/1930 Chapin .............. A61H 15/0092 601/123
1,895,116 A * 1/1933 Wilsey ............... A61H 23/0254 601/120
2,003,272 A * 5/1935 Betz ................... A61H 15/0085 601/133
2,213,482 A * 9/1940 Park ................... A61H 15/0085 601/84
3,845,758 A * 11/1974 Anderson .......... A61H 15/0085 601/114
4,008,715 A * 2/1977 Brodbeck .......... A61H 15/0092 601/128
5,143,056 A * 9/1992 Yih-Jong ............... B62K 21/26 601/118

(Continued)

OTHER PUBLICATIONS

Search Report and Written Opinion for International Application No. PCT/US2024/038963, Dated Aug. 14, 2024, 11 pages.

*Primary Examiner* — LaToya M Louis
(74) *Attorney, Agent, or Firm* — Lee & Hayes, P.C.

(57) ABSTRACT

A device includes a first handle formed at least in part by a first housing and a second housing, a second handle formed at least in part by a third housing and a fourth housing, and a rotatable assembly at least partially disposed between the first handle and the second handle. The rotatable assembly is rotatable at least partially about the first housing and the second housing. The rotatable assembly includes shafts, first rotatable elements disposed about a first portion of the shafts, and second rotatable elements disposed about a second portion of the shafts. The first portion of the shafts and the second portion of the shafts are alternatingly disposed around the rotatable assembly.

6 Claims, 44 Drawing Sheets

(56) References Cited

U.S. PATENT DOCUMENTS

| | | | | | |
|---|---|---|---|---|---|
| 5,711,758 | A * | 1/1998 | Tseng | A61H 15/0085 601/72 |
| 6,702,766 | B2 * | 3/2004 | Guitay | A61H 9/005 601/126 |
| 9,572,745 | B2 * | 2/2017 | Lin | A61H 15/0092 |
| 10,765,594 | B2 * | 9/2020 | Sanchez | A61H 15/0092 |
| 10,799,420 | B2 * | 10/2020 | Ishibashi | A61H 15/0092 |
| 10,864,135 | B2 * | 12/2020 | Carlson | A61H 15/0092 |
| 11,090,218 | B2 * | 8/2021 | Henniger | A61H 7/001 |
| 11,458,063 | B1 * | 10/2022 | Miller | A61H 15/0092 |
| 11,622,909 | B2 * | 4/2023 | Wersland | A61H 15/00 601/111 |
| 2004/0019305 | A1 * | 1/2004 | Tu | A61H 15/0085 601/107 |
| 2004/0133134 | A1 * | 7/2004 | Polychronis | A61H 15/0085 601/119 |
| 2009/0112137 | A1 * | 4/2009 | Lamore | A63B 22/20 601/112 |
| 2013/0178768 | A1 * | 7/2013 | Dalebout | A61H 15/0092 601/118 |
| 2017/0007495 | A1 * | 1/2017 | Norwood | A61H 15/0092 |
| 2017/0080283 | A1 * | 3/2017 | Harman | A61H 15/0085 |
| 2017/0216136 | A1 * | 8/2017 | Gordon | A61H 23/0263 |
| 2017/0319427 | A1 | 11/2017 | Udhardt | |
| 2020/0188219 | A1 * | 6/2020 | Piucci, Jr. | A61H 15/0092 |
| 2020/0330318 | A1 * | 10/2020 | Chou | A61H 1/00 |
| 2021/0022953 | A1 * | 1/2021 | Wilson | A61H 15/0092 |
| 2021/0031030 | A1 * | 2/2021 | Min | A61N 1/328 |

* cited by examiner

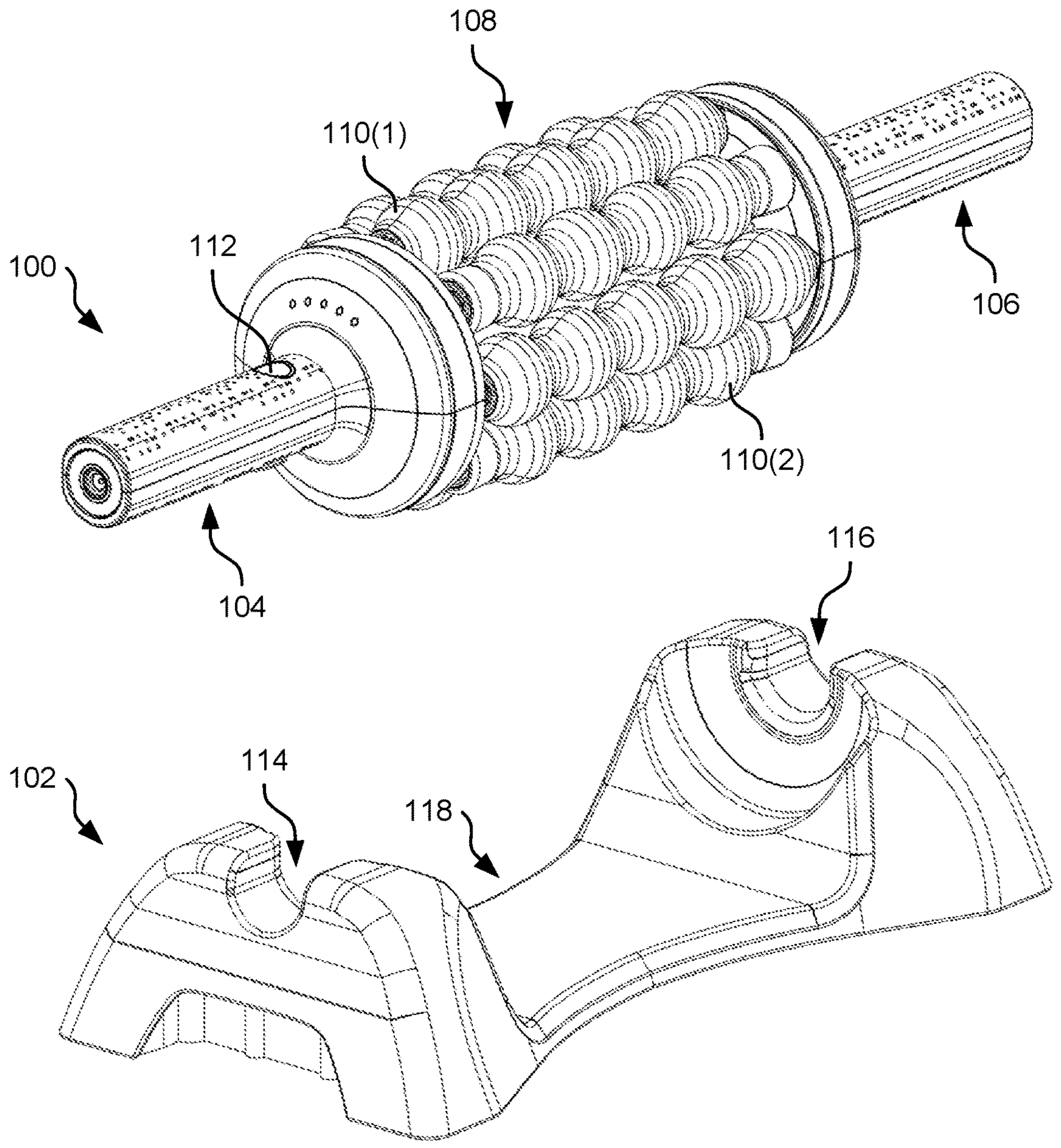
FIG. 1
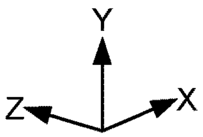

MYOFASCIAL DEVICE WITH ROTATABLE ASSEMBLY

BACKGROUND

Musculoskeletal evaluation and treatment applications have been used extensively in pain relief, massage therapy, and chiropractic clinics. Different methods of application and therapy tools have been proposed in an effort to find effective solutions that both clinicians and patients can use to treat some of the most common and widespread causes of muscular and myofascial pain and dysfunction. However, some of these therapy tools are difficult to use and/or may provide ineffective treatments against muscular and myofascial pain and dysfunction.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

FIG. 1 illustrates an example device and an example stand that may be usable or configured to receive the device, according to examples of the present disclosure.

DETAILED DESCRIPTION

Figure 2:
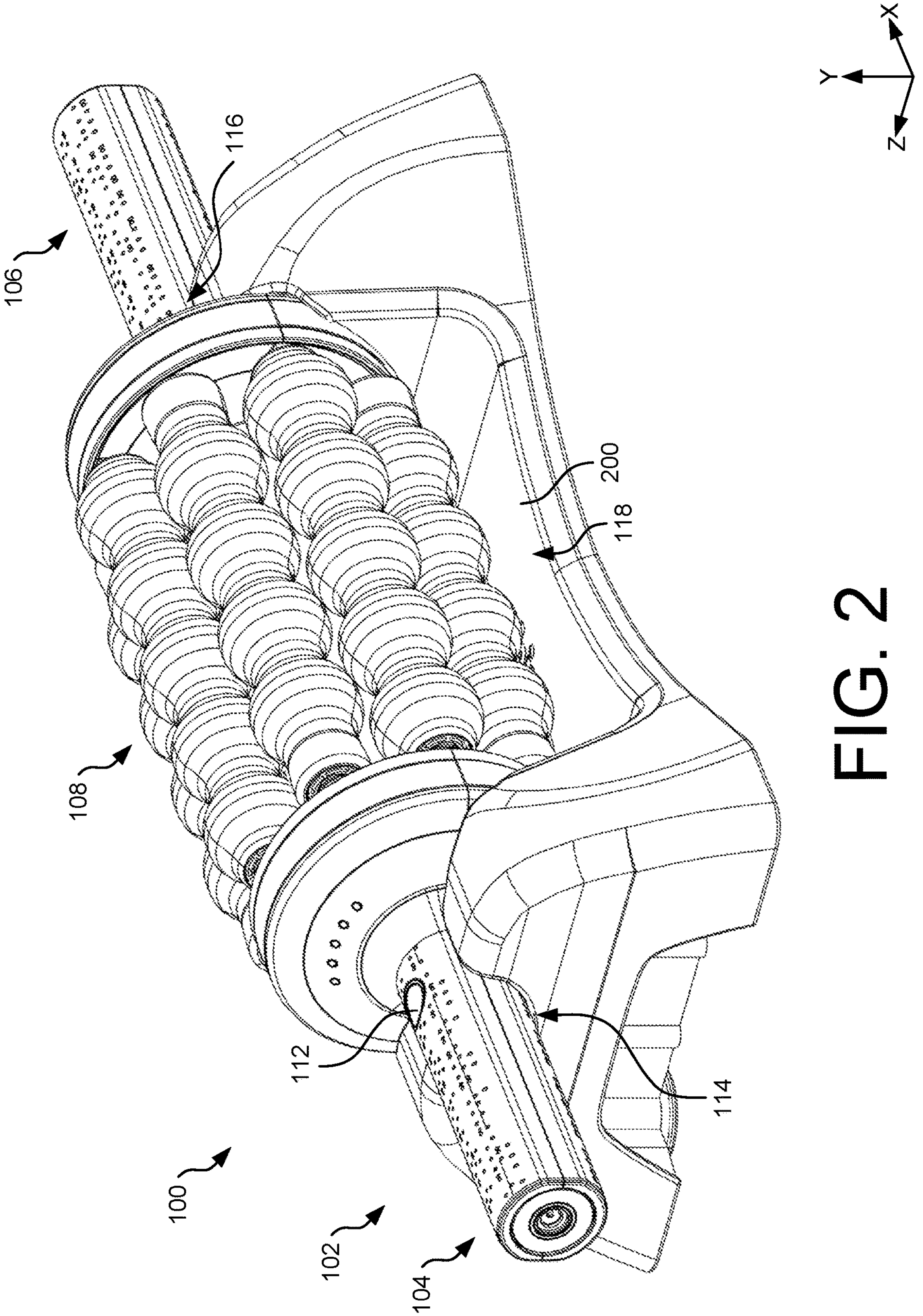
FIG. 2 illustrates the device of FIG. 1 being received within the stand of FIG. 1, according to examples of the present disclosure.

This application is directed, at least in part, to a device having rotatable elements that provide or treat muscular pain, myofascial pain, trigger points, and the like. In an embodiment, the device may include a first handle and a second handle gripped or otherwise held by a user. A rotatable assembly rotatably couples about the first handle or the second handle, and the rotatable elements may be coupled to the frames of the rotatable assembly. For example, the frames of the rotatable assembly may define shafts (e.g., axles, rods, etc.) about which the individual rotatable elements are disposed, between the first handle and the second handle. The device includes one or more motors that, when actuated, cause the rotatable assembly to rotate. The rotatable elements may correspondingly rotate about a longitudinal (or rotational axis) of the device. In an embodiment, the device may be used freehandedly such that the user may maneuver the device to/over portions of their body (e.g., legs, back, arms, etc.). In other embodiments, the device may be placed onto/into a stand, and therein, the user may maneuver their body on/over the device. As such, the device may be used in varying ways to provide or treat muscular pain, myofascial pain, trigger points, and the like.

The device may include one or more input components, such as buttons, levers, toggles, switches, etc. that control a speed of the motors. For example, depending upon the desired relief, the motor may operate at different speeds to rotate the rotatable assembly. In an embodiment, the buttons, levers, switches, etc. may receive different types of inputs to change the speed of the motor. For example, pressing and holding the button for a first period of time (e.g., one second) may cause the motor to operate at a first speed, pressing and holding the button for a second period of time, (e.g., two seconds) may cause the motor to operate at a second speed that is different than the first speed, and so forth. In an embodiment, the motor may be configured to operate at any number of speeds (e.g., one, two, four, five, ten, etc.). Additionally, rather than providing different inputs for different periods of time, the button may be depressed a certain number of times for changing or setting the speed. For example, pressing the button once may cause the motor to operate at the first speed, pressing the button twice (e.g., consecutively) may cause the motor to operate at the second speed, and so forth.

In addition to the buttons, levers, toggles, switches, etc. being used to control speeds of the motor, the buttons, levers, switches, etc. may be used to power on/off the device, a rotational movement of the device, control other setting(s) of the device (e.g., heat, vibration, time of operation, etc.). In an embodiment, the device may include an actuatable mechanism (e.g., safety button, lever, toggle, switch, etc.) that is actuated first (e.g., before) in order to change, adjust, or set the speed of the motor. For example, in order to control the speed of the motor, a first button may be depressed, and while depressing the first button, a second button may be used to control the speed of the motor. This may, for example, prevent an inadvertent operation of the device. However, once the speed of the motor is set, the first button and/or the second button may be released such that the user may not have to continuously depress the first button and/or the second button. In an embodiment, the buttons, levers, switches, etc. may be located on the first handle and/or the second handle. Although described as including two buttons, the device may include more than or less than two buttons.

The device may, in an embodiment, include output components such as lighting element(s), speaker(s), etc. The lighting elements may output an indication of the speed of the motor and/or other settings of the device. For example, if the motor includes five speeds, and the user has selected the second speed, the lighting element(s) may output an indication of such. In an embodiment, the device may include a light bar, a light ring, a series of lights, etc. that is/are illuminated to indicate the speed of the motor. In other embodiments, the speakers may output an indication of the speed (e.g., low, medium, high, etc.). Of course, it is to be understood that the output components may output other indications associated with additional or alternative setting(s) of the device.

The rotatable assembly may include a first frame (e.g., section, segment, portion, half, etc.) and a second frame (e.g., segment, portion, half, etc.). In an embodiment, each of the first frame and the second frame may form a portion (e.g., length) of the shafts about which the rotatable elements are disposed. For example, the first frame may include a first base and first posts may extend from the first base. The second frame may include a second base and second posts may extend from the second base. The first posts and the second posts, when the rotatable assembly is assembled, may align to form the shafts. In other words, the first posts may form a first length of the shafts and the second posts may form a second length of the shafts. The first frame and the second frame may be coupled together using fasteners, snap fits, pressure fits, and so forth. However, in an embodiment, before the first frame and the second frame are coupled together to form the shafts, the rotatable elements may be slid onto the first frame (e.g., onto the first posts) and the second frame (or the second posts) may be slid through rotatable elements so as to align, mate, or couple to the first frame. In an embodiment, the rotatable assembly, once assembled, may be slid onto the first handle and therein, the second handle may be coupled to the first handle. When assembled, the rotatable assembly may be disposed or connected between the first handle and the second handle. However, although described as including two handles, in an embodiment, the device may include a single handle, or more than two handles.

In an embodiment, the rotatable assembly may include a gear that engages with gears of the motor (or which are operably coupled to the motor). For example, the first base and/or the second base may include a ring gear that is engaged by one or more internal spur gears disposed in the first handle or the second handle. During actuation of the motor, and rotation of the one or more internal spur gears, motion is imparted to the rotatable assembly via the engagement between the one or more internal spur gears and the ring gear. In an embodiment, the rotatable assembly may be mounted on one or more bearings (e.g., roller bearings) to permit rotation of the rotatable assembly. For example, a first end of the rotatable assembly (e.g., the first base) may be mounted via a first gear to the first handle, and a second end of the rotatable assembly (e.g., the second base), may be mounted via a second gear to the second handle. Moreover, in an embodiment, the first end of the rotatable assembly (e.g., the first base) may be mounted to the first handle via a first bearing, and a second end of the rotatable assembly may be mounted to the second handle via a second bearing. In an embodiment motor may be mounted or otherwise disposed in the first handle. As such, in an embodiment, the first handle may include one or more spur gears for engaging with the ring gear. Although described as including certain types of gears, such as ring gears and spur gears, other gears are envisioned. The first handle may also include one or more holes to permit airflow through the first handle for cooling or dissipating heat generated by the motor.

In an embodiment, the rotatable assembly may be interchangeable with other rotatable assemblies. For example, each rotatable assembly have a certain contour or shape of the rotatable elements, and interchanging the rotatable assemblies may provide for rotatable elements with different contours and shapes. In an embodiment, a size of the rotatable assembly may vary. Additionally, instead of replacing the rotatable assembly, the rotatable elements may be interchangeable with one another.

In an embodiment, the rotatable elements may include a plurality of first rotatable elements and a plurality of second rotatable elements. The first rotatable elements may include first structural features (e.g., ribs, protrusions, texture, etc.) and the second rotatable elements may include second structural features (e.g., ribs, protrusions, texture, etc.) that are different than the first structural features. In an embodiment, the first structural features and the second structural features may be complimentary in that the first structural features and the second structural features are interlocking, interwoven, etc. For example, each of the first rotatable elements and the second rotatable elements may have a first end and a second end spaced apart from the first end along a length thereof. Between the first end and the second end, the exterior surface of the first rotatable elements and the second rotatable elements may undulate to form peaks and valleys. Here, a cross-sectional dimension of the first rotatable elements and the second rotatable elements may vary along the length of the first rotatable elements and the second rotatable elements, respectively.

The undulating surface of the first rotatable elements and the second rotatable elements may be offset from one another when coupled to the first frame and the second frame such that the peaks of the exterior surface formed in the first rotatable element fits, resides, is disposed within, or is received by, the valleys of the surface formed in the exterior surface of the second rotatable element. However, although the first rotatable elements and the second rotatable elements are described as having undulating surfaces, in an embodiment, the first rotatable elements and the second rotatable elements may include other surfaces and/or be differently shaped. For example, the first rotatable elements and the second rotatable elements may include different surface finishes, shapes, contours, etc. to provide or treat muscular pain, myofascial pain, trigger points, and the like. Moreover, in an embodiment, the first rotatable elements and the second rotatable elements may be made up of a single piece of material, or may include multiple pieces of materials.

The first handle and/or the second handle may also include various brackets, mounts, etc. for receiving components of the device, respectively for aligning or otherwise orienting the components within the first handle and the second handle. Suitable manufacturing techniques for forming the device include injection molding, extrusion, casting, etc. The device, or components thereof, may also be made from metal (e.g., aluminum), plastic, composites, and/or any combination thereof. The rotatable elements may be manufactured from a low-density foam or rubber material, though other compressible materials may be used as well. In an embodiment, the rotatable elements may include a closed-cell foam such as an ethylene-vinyl acetate ("EVA") foam. In an embodiment, the rotatable elements may have durometer rating of between approximately 0.forty and approximately sixty.

In an embodiment, the device may include, or be usable with, a stand. For example, the stand may include a first receptacle for receiving at least a portion of the first handle and a second receptacle for receiving at least a portion of the second handle. The first receptacle may engage with the first handle and the second receptacle may engage with the second handle to prevent (e.g., hold) the first handle and the second handle during operation of the device. The first receptacle and the second receptacle may be formed within struts of the stand, and between the struts, the stand may form a trough. The trough is sized to receive the rotatable assembly (including the rotatable elements), such that the device may be operable while placed on the stand. For example, when the first handle is disposed within the first receptacle and the second handle is disposed within the second receptacle, the rotatable assembly may be allowed to rotate within the trough (e.g., between the first receptacle and the second receptacle).

In an embodiment, the first handle or the second handle may be configured to provide a stand or prop for the device. For example, the first handle and/or the second handle may be rotated to dispose the rotatable assembly above a ground surface. The first handle and the second handle may then be rotated back during use. Ball joints, knuckle joints, and the like may provide such movement.

In addition to the components described above, the device may include various components that permit its operation. For example, the device may include various hardware components (e.g., processor(s), memory, printed circuit boards (PCBs), printed circuit board assemblies (PCBAs), etc.), sensor(s) (e.g., temperature, force, pressure, resistance, etc.), batteries, ports (e.g., charging, auxiliary, USB-C), network interfaces to permit connection with one or more devices (e.g., phone, tablet, computer, etc.), heat dissipating elements, and so forth. In an embodiment, the device may be configured to continuously adapt based on sensed conditions. For example, a sensor may measure the current (e.g., draw) on the motor during use. If a user, for example, changes an amount of force by which the device is pressed against their body (e.g., legs, arms, etc.), and therefore, a speed of the rotatable assembly (or the motor) is reduced, the device may sense this reduction. If the draw on the motor is greater than a threshold for a threshold period of time, the device may cause an increased current to be supplied to the motor to increase its speed. In doing so, the user may be capable of applying the device to their body at a given force without sacrificing the speed at which the rotatable assembly rotates. Upon removal of the device, less resistance is provided to the motor and consequently, the motor may rotate at higher speeds. However, if the draw on the motor is less than the threshold for the threshold period of time, the device may cause a decreased current to be supplied to the motor to decrease its speed.

Although the device is described as including certain assemblies, or that certain components are disposed within certain assemblies, other variations are envisioned. For example, the device may include more than or less than three of the assemblies, and/or the assemblies may include different components than described.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example device 100 and an example stand 102 that is configured to receive the device 100, according to examples of the present disclosure. The device 100, in an embodiment, may include a first handle 104 and a second handle 106 spaced apart from the first handle 104 (e.g., in the X-direction). In an embodiment, the first handle 104 and the second handle 106 may be configured to be held by a user operating the device 100. For example, a first hand of the user may grip the first handle 104 and/or a second hand of the user may grip the second handle 106. However, although described as including the first handle 104 and the second handle 106, in an embodiment, the device 100 may only include a single handle, or may include more than two handles. Additionally, the first handle 104 and/or the second handle 106 may include different shapes than shown.

The device 100 may further include a rotatable assembly 108 that is disposed between the first handle 104 and the second handle 106. During operation, the rotatable assembly 108 may rotate about the first handle 104 (or housing(s) thereof) and/or the second handle 106 (or housing(s) thereof), or a central axis extending through the device 100. For example, the rotatable assembly 108 may rotate (e.g., about the X-axis) between the first handle 104 and the second handle 106. During rotation, in an embodiment, the first handle 104 and/or the second handle 106 may remain stationary. As will be explained herein, the rotatable assembly 108 may include a plurality of rotatable elements 110, such as first rotatable elements 110(1) and second rotatable elements 110(2). The first rotatable elements 110(1) and the second rotatable elements 110(2) may be alternatingly coupled to or disposed on/about the rotatable assembly 108 (e.g., about the X-axis). For example, the first rotatable elements 110(1) and the second rotatable elements 110(2) may alternate with one another around the rotatable assembly 108. As will also be explained herein, the first rotatable elements 110(1) and the second rotatable elements 110(2) may include different surfaces, curves, textures, etc. so as to interweave, interlock, intertwine, etc. with one another. In an embodiment, an exterior surface of the first rotatable elements 110(1) and the second rotatable elements 110(2) undulate along at least a portion of the length of the first rotatable elements 110(1) and the second rotatable elements 110(2), respectively.

In an embodiment, the device 100 includes a first button 112 (e.g., toggle, switch, etc.) that at least partially controls an operation of the device 100. For example, as will be explained herein, a motor may operably couple to the rotatable assembly 108 for imparting motion to the rotatable assembly 108. The first button 112, for example, may control a speed of the motor. In an embodiment, the first button 112 may be pressed for different periods of time and/or a different number of times for controlling the speed of the motor. As examples, pressing and holding the first button 112 for a first period of time (e.g., one second) may cause the motor to operate at a first speed, pressing and holding the first button 112 for a second period of time, (e.g., two seconds) may cause the motor to operate at a second speed that is different than the first speed, and so forth. Additionally or alternatively, rather than providing different inputs for different periods of time, the first button 112 may be depressed a certain number of times for changing or setting the speed. For example, pressing the first button 112 once may cause the motor to operate at the first speed, pressing the first button 112 twice (e.g., consecutively) may cause the motor to operate at the second speed, and so forth. In an embodiment, the motor may be configured to operate at any number of speeds (e.g., one, two, four, five, ten, etc.). As shown, the first button 112 may be located on the first handle 104. In an embodiment, the first button 112 represents a mechanical type of button, a resistive type of button, a capacitive type of button, and so forth. Additionally, although described as a button, the first button 112 may represent a switch, lever, knob, etc. that may be depressible, rotatable, or otherwise actuatable.

In an embodiment, the device 100 may be operated in a first manner, without the stand 102, and in a second manner, with the stand 102. For example, in the first manner, the device 100 may be used freehandedly in that the user may maneuver the device 100 to portions of their body (e.g., legs, back, arms, etc.). In the second manner, the device 100 may be placed onto/into the stand 102, and therein, the user may maneuver their body on/over the device 100 as it rests on the stand 102. Details of the stand 102 are described herein, however, the stand 102 may include a first receptacle 114 for receiving a portion of the first handle 104, and a second receptacle 116 for receiving a portion of the second handle 106. The first receptacle 114 may engage with the first handle 104 and the second receptacle 116 may engage with the second handle 106 to prevent (e.g., hold) the first handle 104 and the second handle 106 during operation of the device 100. A trough 118 (e.g., cavity, crater, etc.) may accommodate the rotatable assembly 108 (and the rotatable elements 110). The stand 102 may further include additional voids, cavities, receptacles, etc. for receiving additional portions of the first handle 104, the second handle 106, or more generally, the device 100.

FIG. 2 illustrates the device 100 being disposed on, in, or within the stand 102, according to examples of the present disclosure. As shown, the first handle 104 may be at least partially received within the first receptacle 114, and the second handle 106 may be at least partially received within the second receptacle 116. Further, the rotatable assembly 108 is disposed between the first receptacle 114 and the second receptacle 116, within the trough 118. A gap distance exists between a bottom surface 200 of the trough 118 and the rotatable assembly 108 (or the rotatable elements 110) to permit operation of the device 100. That is, the device 100 may be operated as shown in FIG. 2 (i.e., on the stand 102) whereby the rotatable assembly 108 is permitted rotate (e.g., about the X-axis) via actuation of the motor. During rotation of the rotatable assembly 108, the first handle 104 and the second handle 106 remain stationary. Compared to the freehanded use of the device 100, the operation of the device 100 with the stand 102 permits the user to maneuver (e.g., roll), place, or rest portions of their body over the rotatable elements 110 to provide myofascial pain relief.

As will be explained herein, the device 100 may include a safety button that is actuated (e.g., before) in order to operate the device 100. For example, in order to adjust the speed of the motor (e.g., via the first button 112), a second button may first be depressed. In other words, pressing the first button 112, without pressing the second button, may restrict operation of the device 100. However, pressing the second button, and pressing the first button 112 while continuing to press the second button, may permit operation of the device 100. After the first button 112 is depressed (with the second button depressed) the second button may be released in order to operate the device 100 without continuing to depress the second button. However, in an embodiment, the second button may be depressed continuously to operate the device 100. When placed within the stand 102, the second button may be depressed (e.g., in the Y-direction) via the stand 102. More particularly, the second button may be depressed via an engagement within the stand 102, such as within the first receptacle 114 or the second receptacle 116. In an embodiment, the second button may be located on an opposite side/surface of the first handle 104 as the first button 112.

Figure 3:
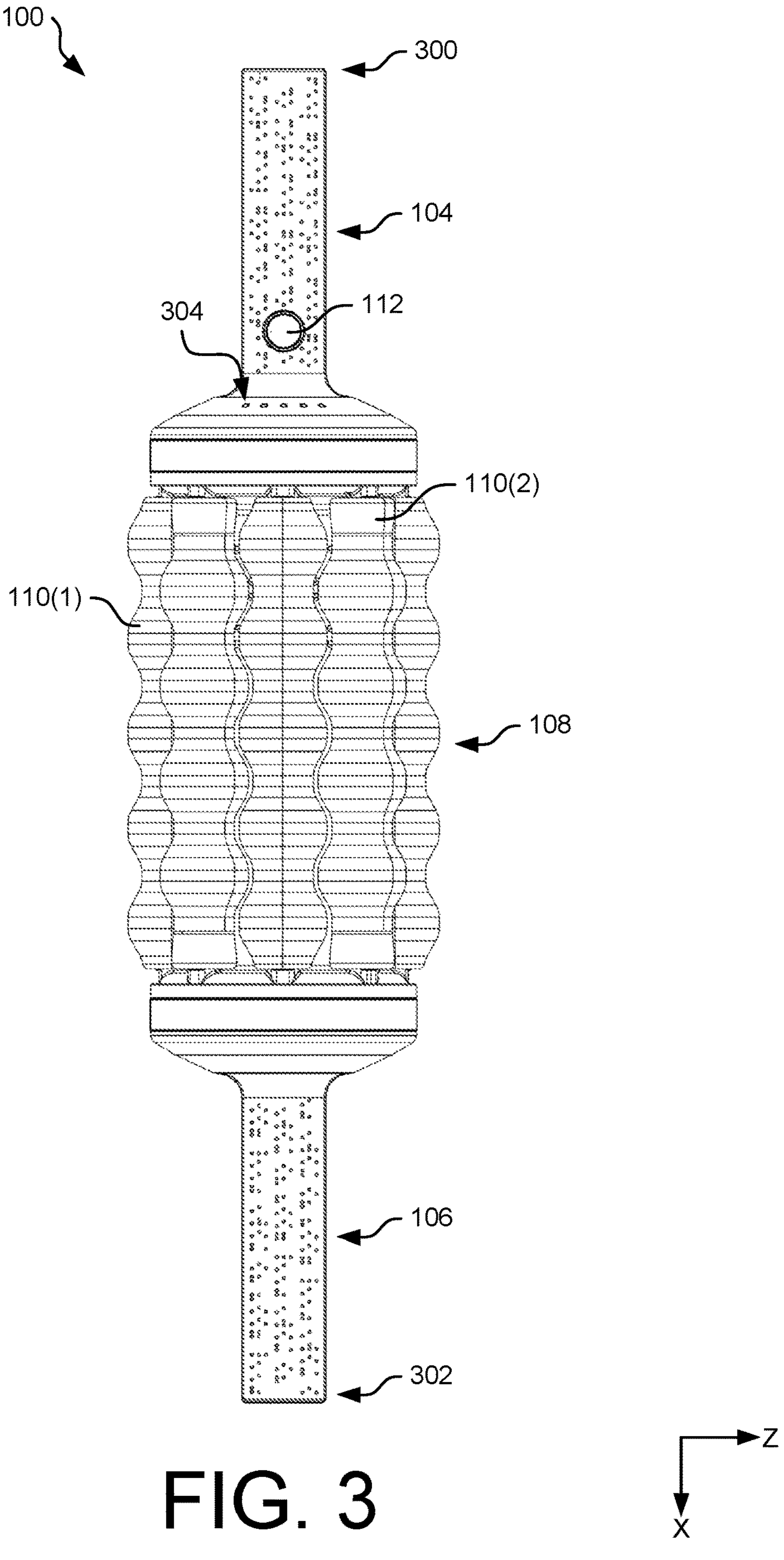
FIG. 3 illustrates a side view of the device of FIG. 1, according to examples of the present disclosure.

FIG. 3 illustrates a top view of the device 100, according to examples of the present disclosure. In an embodiment, the device 100 extends between a first end 300 and a second end 302. The first handle 104 may be disposed at or define the first end 300, while the second handle 106 may be disposed at or define the second end 302. The rotatable assembly 108, including the first rotatable elements 110(1) and the second rotatable elements 110(2), are disposed at least partially between the first handle 104 and the second handle 106.

The first handle 104 includes the first button 112. In addition, the first handle 104 (or a housing thereof) may include lighting elements that output light through one or more apertures 304. For example, the one or more apertures 304 are shown including five apertures. In an embodiment, the lighting elements may output an indication of the speed of the motor and/or other settings of the device 100 via the apertures 304. For example, the motor may include five speeds and if the user has selected a second speed, a second aperture of the apertures 304 may output light from lighting element(s) residing therebeneath. If the user has selected a fourth speed, a fourth aperture of the apertures 304 may output light from lighting element(s) residing therebeneath. As such, the apertures 304 may be used to indicate an operational state or status of the device 100. However, although five of the apertures 304 are described, the device 100 may include more than or less than five of the apertures 304. Additionally, the apertures 304 may be located differently on or about the device 100 than shown. Still, rather than having the apertures 304, the device 100 may include a light bar, display screen, or other components to indicate the speed of the motor, or more generally, setting(s) of the device 100.

Figure 4:
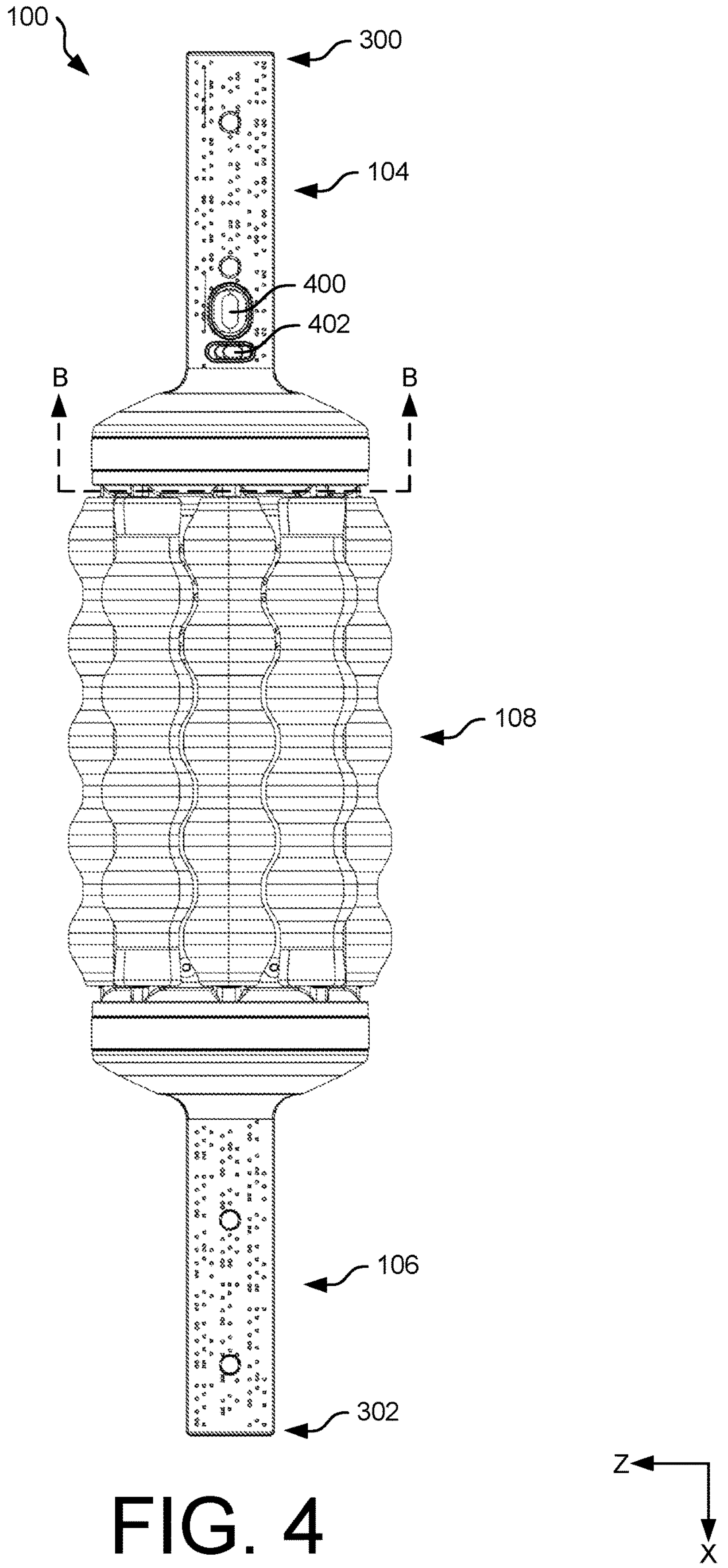
FIG. 4 illustrates a side view of the device of FIG. 1, according to examples of the present disclosure.

FIG. 4 illustrates a bottom view of the device 100, according to examples of the present disclosure. As introduced above, the first handle 104 may include a second button 400 (e.g., toggle, switch, etc.). In an embodiment, depressing the second button 400 may permit the first button 112 to be used to control actuation of the motor, and consequently, rotation of the rotatable assembly 108. In other words, the second button 400 may first be depressed (or otherwise actuated) and therein, the first button 112 may be depressed (or otherwise actuated) to control rotation of the rotatable assembly 108. In an embodiment, after the first button 112 is used to cause rotation of the rotatable assembly 108, the first button 112 may be disengaged by the user. In an embodiment, the second button 400 may be continuously depressed in order to permit operation of the device 100. That is, if after the rotatable assembly 108 is rotated, the second button 400 becomes disengaged, the rotatable assembly 108 may stop rotating. To operate the device 100 subsequently, the second button 400 may be first depressed and thereafter, the first button 112 may be depressed to the desired speed. However, as noted above, when placed on the stand 102, the second button 400 may be depressed. In an embodiment, the second button 400 represents a mechanical type of button, a resistive type of button, a capacitive type of button, and so forth. Additionally, although described as a button, the second button 400 may represent a switch, lever, knob, etc. that may be depressible, rotatable, or otherwise actuatable.

The device 100 may further include a switch 402 (e.g., toggle, switch, etc.). In an embodiment, the switch 402 is located on the first handle 104, adjacent to the second button 400. The switch 402 may correspond to an on/off switch, and may be movable between different positions (e.g., a first position and a second position) to power on and off the device 100. In an embodiment, the switch 402 may control a rotational direction (e.g., clockwise, counterclockwise, on/off, etc.) of the device 100. In an embodiment, the switch 402 represents a mechanical type of button, a resistive type of button, a capacitive type of button, and so forth. Additionally, although described as a switch, the switch 402 may represent a button, lever, knob, etc. that may be depressible, rotatable, or otherwise actuatable. In an embodiment, the second button 400 and/or the switch 402 may be located closer to the first end 300 than the second end 302.

Although the device 100 is described as including two buttons, such as the first button 112 and the second button 400, the device 100 may include more than or less than two of the buttons. For example, in an embodiment, the second button 400 may be omitted. Additionally, or alternatively, the switch 402 may be omitted, or additional switches may be included.

Figure 5A:
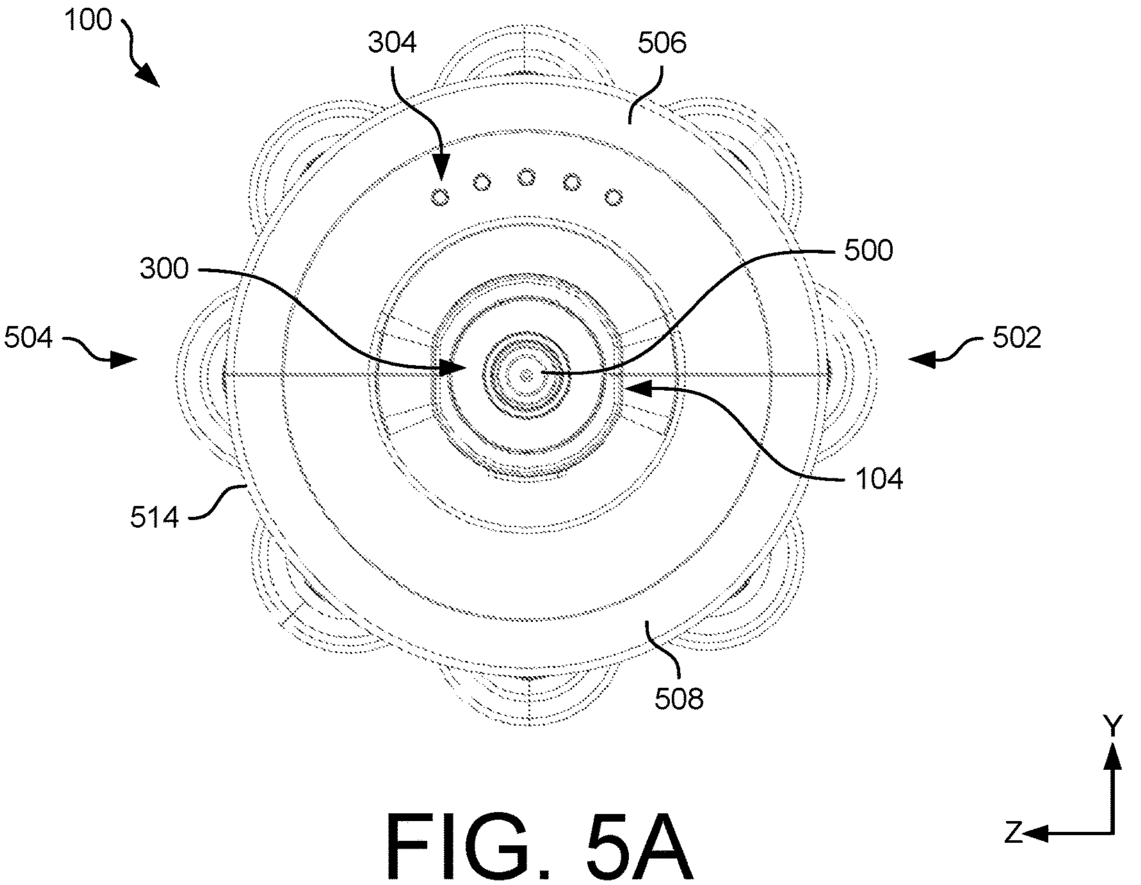
FIGS. 5A and 5B illustrate end views of the device of FIG. 1, according to examples of the present disclosure.
Figure 5B:
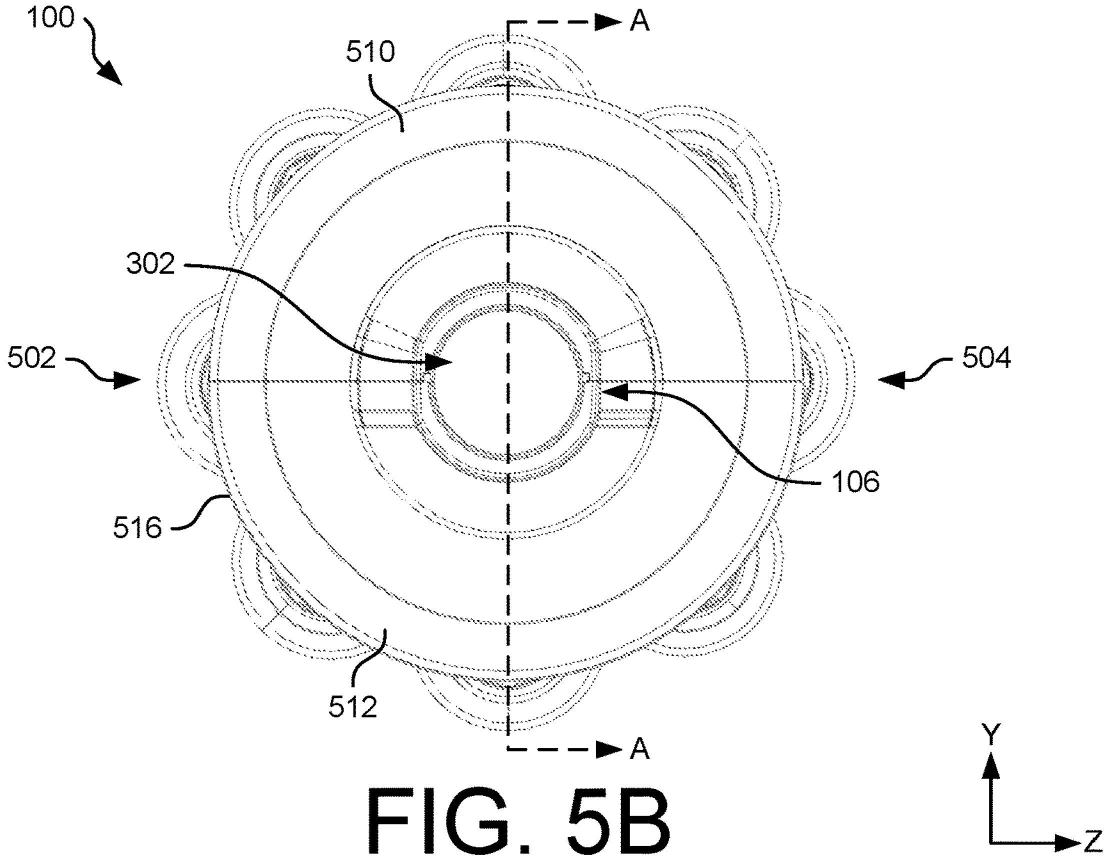

FIGS. 5A and 5B illustrate end views of the device 100, according to examples of the present disclosure. FIG. 5A illustrates the first end 300 of the device 100 while FIG. 5B illustrates the second end 302 of the device 100.

The first end 300 may include a port 500 into which a cord, cable, wire, etc. is insertable. In an embodiment, the port 500 may correspond to a charging port into which a power cable is disposed for charging a battery of the device 100. However, the port 500 may include another type of port, such as an auxiliary port, a USB-C port, etc. Additionally, or alternatively, instead of being used to charge the battery, the port 500 may be used to provide updates to the device 100, upload/download data, etc.

The apertures 304 are shown arranged along an arc or curve. In an embodiment, the apertures 304 disposed through the first handle 104 (or housing(s) thereof) may follow a curvature of a perimeter of the first handle 104 (or the housing(s)). In an embodiment, the apertures 304 are centered between a first side 502 of the device 100 and a second side 504 of the device 100 spaced apart from the first side 502 (e.g., in the Z-direction).

As will be explained herein, the first handle 104 may be formed at least in part by a first housing 506 and a second housing 508. The second handle 106 may be formed at least in part by a third housing 510 and fourth housing 512. For example, the first housing 506 and the second housing 508 may couple together to form the first handle 104, while the third housing 510 and the fourth housing 512 may couple together to form the second handle 106. The rotatable elements 110 may extend beyond a first perimeter 514 of the first handle 104, or the first housing 506 and the second housing 508, and a second perimeter 516 of the second handle 106, or the third housing 510 and the fourth housing 512. In doing so, the rotatable elements 110 are configured to engage with the user, without the first housing 506, the second housing 508, the third housing 510, and/or the fourth housing 512 contacting the user. As shown, the first perimeter 514 and the second perimeter 516 may have a circular shape. However, the first housing 506, the second housing 508, the third housing 510, and/or the fourth housing 512 may form other shapes for the first perimeter 514 and the second perimeter 516, respectively, such as a hexagonal shape, ovular shape, square shape, etc.

Figure 6A:
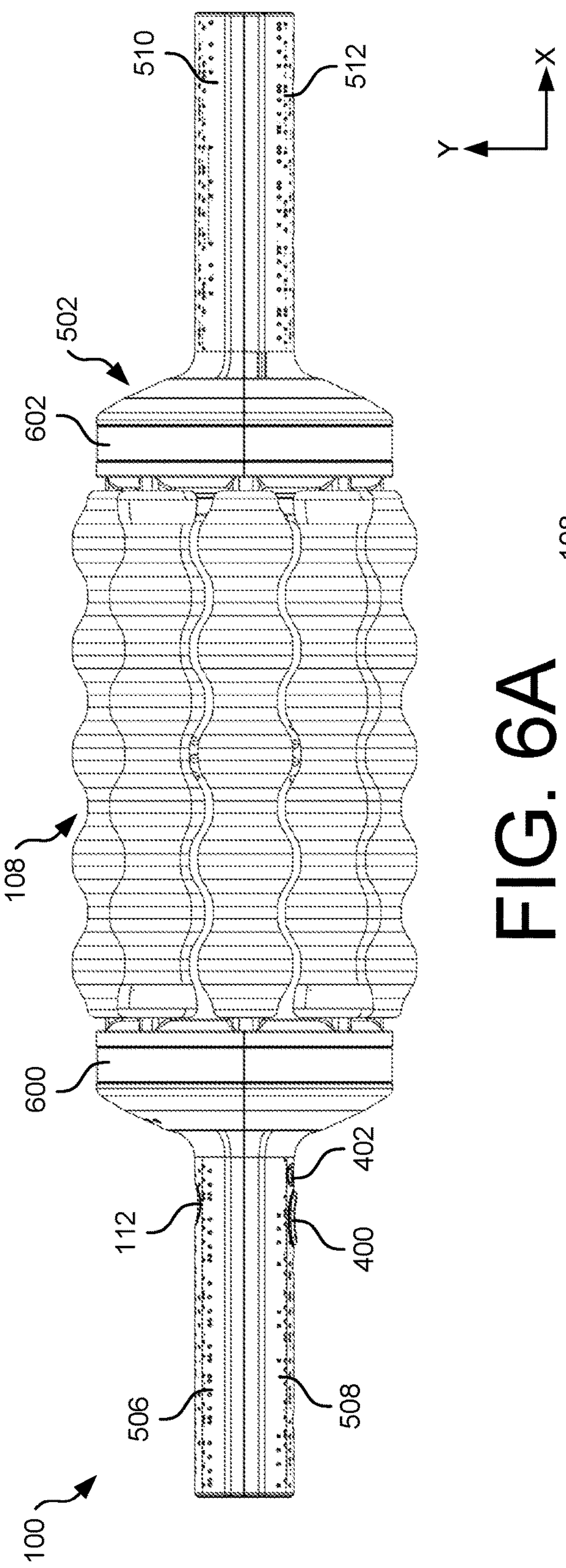
FIGS. 6A and 6B illustrate side views of the device of FIG. 1, according to examples of the present disclosure.
Figure 6B:
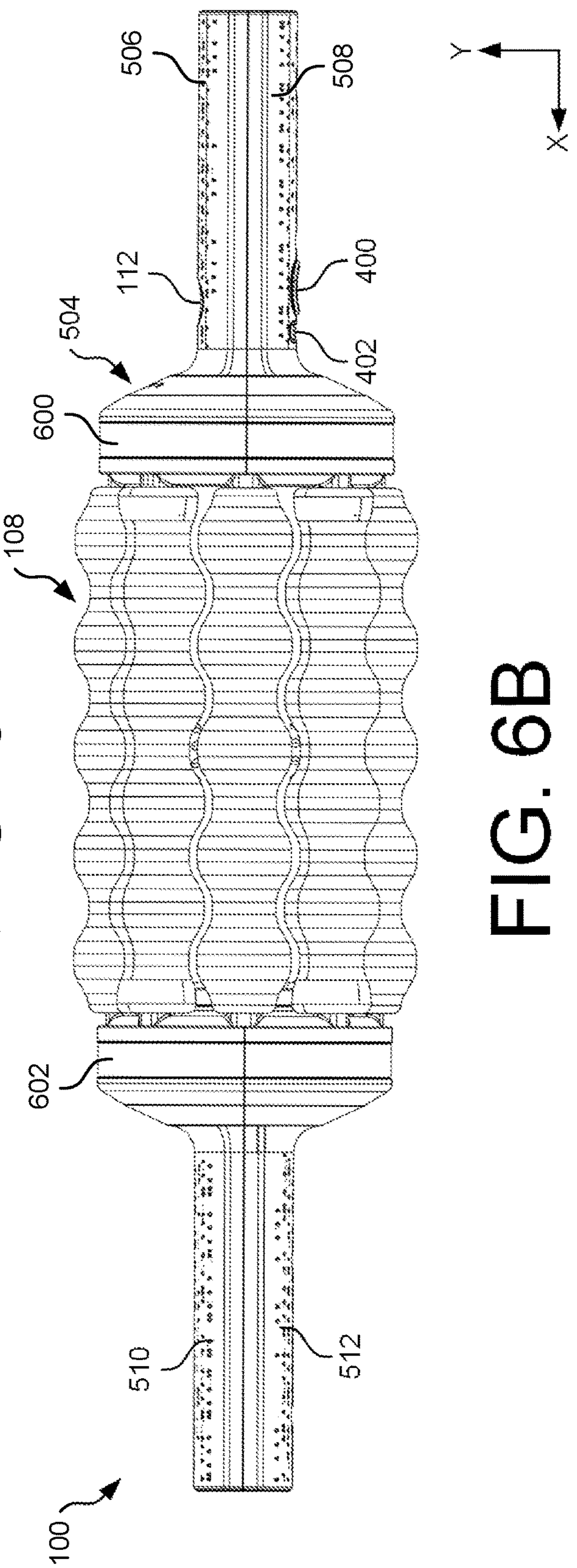

FIGS. 6A and 6B illustrate side views of the device 100, according to examples of the present disclosure. FIG. 6A illustrates the first side 502 of the device 100 while FIG. 6B illustrates the second side 504 of the device 100.

In an embodiment, the first housing 506 and the second housing 508 couple together to form a first assembly of the device 100. Once assembled together, the rotatable assembly 108 (including the rotatable elements 110), may be slid onto/over a portion of the first assembly. Therein, the third housing 510 and the fourth housing 512, which may couple together to form a second assembly of the device 100, may couple to the first assembly, to form the device 100. As will be explained herein, the motor, battery, and other components of the device 100 may be disposed within the first assembly. However, although described as having assemblies, the device 100 may include other assemblies, sub-assemblies, and so forth, and the components may be arranged in the assemblies, sub-assemblies, and so forth differently than shown and described.

In an embodiment, the first button 112, the second button 400, the switch 402, and/or port 500 are located on the first assembly. More particularly, the first button 112 may be disposed through the first housing 506, the second button 400 and/or the switch 402 may be disposed through the second housing 508, and/or the port 500 may be disposed through or within the first housing 506. However, the first button 112, the second button 400, the switch 402, and/or port 500 may be disposed through other housings than described.

In an embodiment, the first housing 506 and the second housing 508 may be coupled together via fasteners, snap-fit connections, adhesives, etc. In an embodiment, one or more first covers 600 are disposed over fasteners used to connect the first housing 506 and the second housing 508 together. Additionally, the third housing 510 and the fourth housing 512 may be coupled together via fasteners, snap-fit connections, adhesives, etc. In an embodiment, one or more second covers 602 are disposed over fasteners used to connect the third housing 510 and the fourth housing 512 together.

Figure 7:
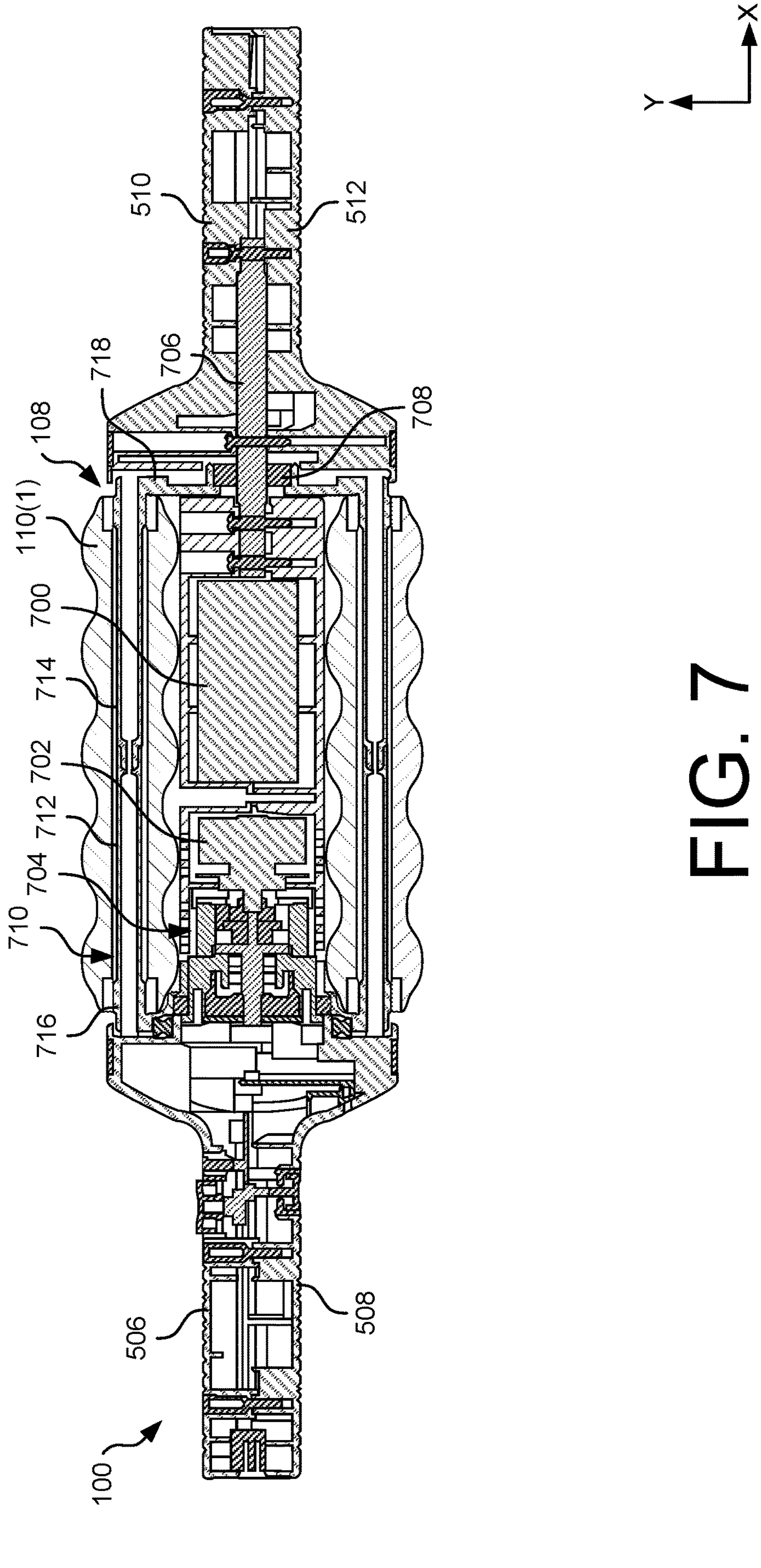
FIG. 7 illustrates a cross-sectional view of the device of FIG. 1, taken along line A-A of FIG. 5B, according to examples of the present disclosure.

FIG. 7 illustrates a cross-sectional view of the device 100, taken along line A-A of FIG. 5B, according to examples of the present disclosure.

The device 100 includes a battery 700 and a motor 702 for imparting motion to the rotatable assembly 108. In an embodiment, the battery 700 and the motor 702 are disposed within the first housing 506 and/or the second housing 508, or an assembly formed by the first housing 506 and the second housing 508. The device 100 may also include a gearbox 704 coupled to the motor 702. The gearbox 704, or gears thereof, may engage with the rotatable assembly 108 to transfer motion from the motor 702 to the rotatable assembly 108. The third housing 510 and the fourth housing 512, or an assembly thereof, may couple to the first housing 506 and the second housing 508, or an assembly thereof, via a rod 706. As will be explained herein, the rotatable assembly 108 may be rotatably mounted about the rod 706 via a bearing 708.

The rotatable assembly 108 may include shafts 710 that are formed at least in part by a first post 712 and a second post 714. The rotatable elements 110 may be disposed about the shafts 710, respectively. As will be explained herein, in an embodiment, the rotatable assembly 108 may be formed at least in part by a first frame 716 and a second frame 718, wherein the first frame 716 and the second frame 718 couple together to form a frame, body, etc. of the rotatable assembly 108. The first posts 712 may extend from (or be part of) the first frame 716 (e.g., in the X-direction), and the second posts 714 may extend from (or be part of) the second frame 718 (e.g., in the X-direction). Corresponding first posts 712 may engage with corresponding second posts 714 to form the shafts 710 about which the rotatable elements 110 are disposed.

Figure 8:
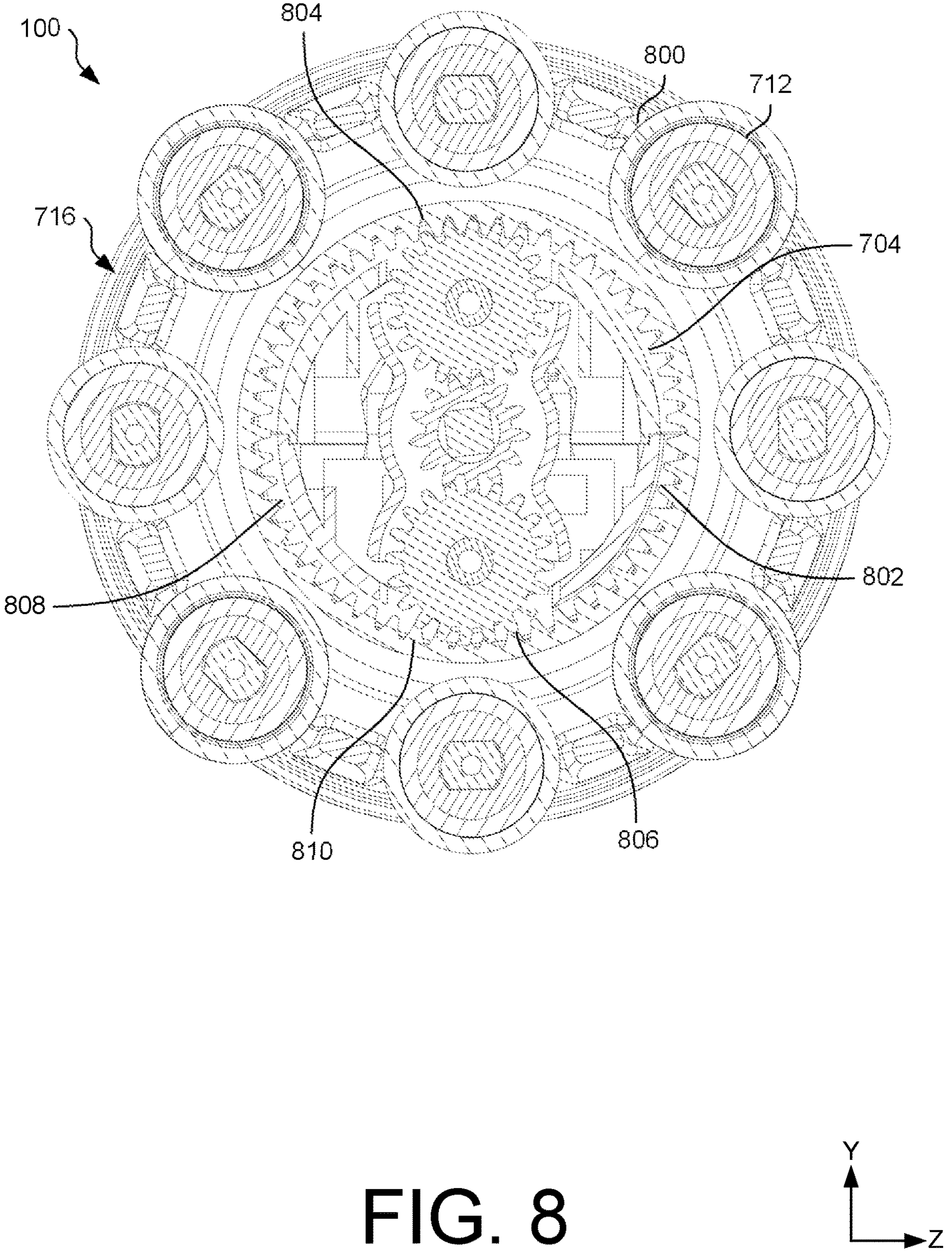
FIG. 8 illustrates a cross-sectional view of the device of FIG. 1, taken along line B-B of FIG. 4, according to examples of the present disclosure.

FIG. 8 illustrates a cross-sectional view of the device 100, taken along line B-B of FIG. 4, according to examples of the present disclosure. The view shown in FIG. 8 illustrates the first posts 712 of the first frame 716, such as a first base 800 of the first frame 716. The rotatable elements 110 are hidden to illustrate details of the gearbox 704 and the first frame 716.

The gearbox 704 may include at least a first gear 802, a second gear 804, and a third gear 806. The first gear 802 may be operably coupled to the motor 702 via a shaft 808. During actuation of the motor 702, the shaft 808 may rotate in a first direction (e.g., clockwise about the X-axis). Correspondingly, the first gear 802 may rotate in the first direction. Meanwhile, the second gear 804 and the third gear 806, which are engaged with the first gear 802, may rotate in a second direction (e.g., counterclockwise about the X-direction). The second gear 804 and the third gear 806 may impart motion to the rotatable assembly 108 via rotation of the first frame 716. In other words, in an embodiment, the rotatable assembly 108 may be driven from one end of the rotatable assembly 108, as compared to both ends (e.g., proximate to the second handle 106). In an embodiment, the first base 800 (or the first frame 716) includes a fourth gear 810 engaged by the second gear 804 and the third gear 806. During rotation of the second gear 804 and the third gear 806 in the second direction, the fourth gear 810 may rotate in the second direction.

In an embodiment, the first gear 802, the second gear 804, and the third gear 806 may represent a spur gear. The first gear 802 may include less teeth than the second gear 804 and the third gear 806. In an embodiment, the first gear 802 may also include a smaller diameter than the second gear 804 and the third gear 806. In an embodiment, the second gear 804 and the third gear 806 may be identical. The first gear 802, the second gear 804, and the third gear 806 may remain stationary so as to not laterally during rotation of the rotatable assembly 108. The fourth gear 810, meanwhile, may represent a ring gear engaged by the second gear 804 and the third gear 806. As will be explained herein, a portion of the second gear 804 may extend through the first housing 506 for engaging with the fourth gear 810 at a first location, and a portion of the third gear 806 may extend through the third housing for engaging with the fourth gear 810 at a second location that is opposite the first location.

Although the gearbox 704 is shown including certain gears, and the first frame 716 is shown including certain gears, the gearbox 704, the first frame 716, and/or the second frame 718 may include different gears (e.g., helical gears, worm gears, etc.), more gears than shown, different sizes of the gears, etc. For example, although the gearbox 704 is shown engaging with the first frame 716 to impart motion to the rotatable assembly 108, the gearbox 704 may additionally or alternatively engage with the second frame 718 for imparting motion to the rotatable assembly 108. The first frame 716 and the second frame 718, or the rotatable assembly 108, may also be disposed about bearings for reducing friction and/or noise.

Figure 9:
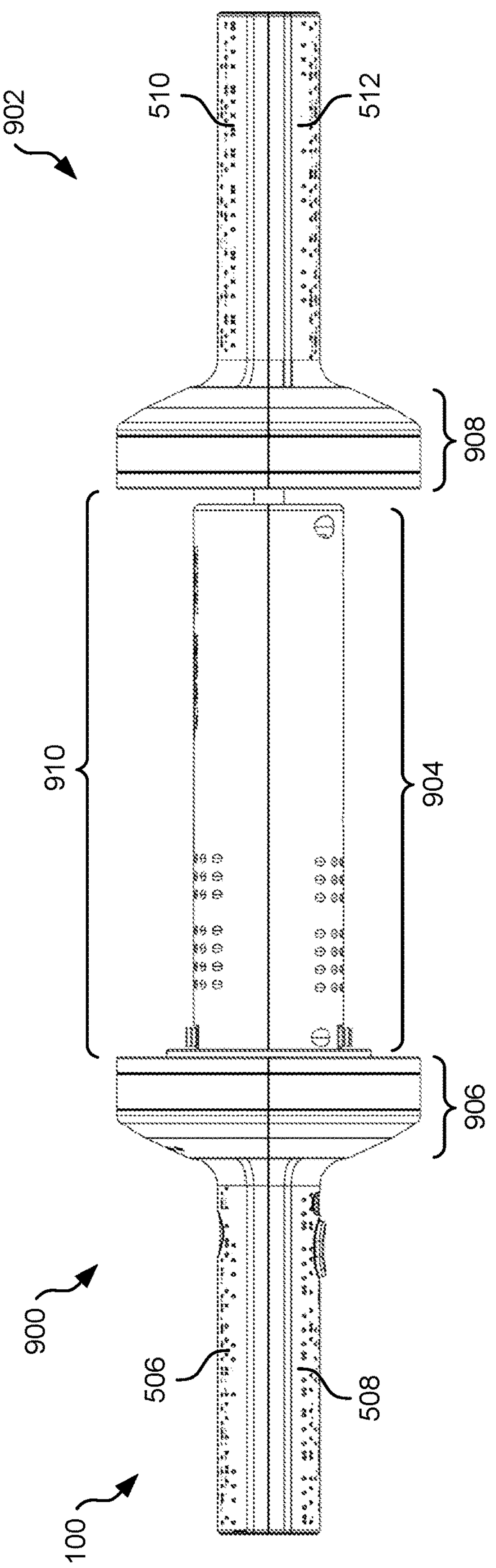
FIG. 9 illustrate an example first assembly and an example second assembly of the device of FIG. 1, according to examples of the present disclosure.

FIG. 9 illustrates a side view of the device 100, showing the rotatable assembly 108 removed, according to examples of the present disclosure. In an embodiment, the device 100 includes a first assembly 900 formed by the first housing 506 and the second housing 508, and a second assembly 902 formed by the third housing 510 and the fourth housing 512. The first assembly 900 and the second assembly 902 may couple together via the rod 706. In an embodiment, the first assembly 900 may include a length (e.g., in the X-direction) that is greater than a length of the second assembly 902.

The first assembly 900 includes a case 904 about which the rotatable assembly 108 is at least partially disposed. For example, the rotatable assembly 108 may be disposed about the case 904, but in an embodiment, may not engage with the case 904. The second gear 804 and the third gear 806 may be disposed through the case 904 (e.g., the first housing 506 and the second housing 508), or an exterior surface thereof, for engaging with the fourth gear 810 of the first frame 716. Additionally, the first assembly 900 may include a first collar 906 formed by the first housing 506 and the second housing 508, and the second assembly 902 may include a second collar 908 formed by the third housing 510 and the fourth housing 512. A gap distance 910 exists between the first collar 906 and the second collar 908, within which the rotatable assembly 108 is received.

Although the device 100 is described as including the first assembly 900, the second assembly 902, and rotatable assembly 108, the device 100 may include more than or less than the number of assemblies than described and illustrated. Additionally, although certain components are described as being included within the first assembly 900, the second assembly 902, and rotatable assembly 108, other variations are envisioned. For example, the motor 702 may be disposed within an assembly other than the first assembly 900. Additionally, although the first assembly 900 is described as including the first housing 506 and the second housing 508, the first assembly 900 may include more than or less than two housings, and/or the housings may be different than shown. For example, a single housing may form the first handle 104. Likewise, in an embodiment, although the second assembly 902 is described as including the third housing 510 and the fourth housing 512, the second assembly 920 may include more than or less than two housings, and/or the housings may be different than shown. For example, a single housing may form the second handle 106. In some instances, a first housing may form a portion (e.g., half) of the first handle 104 and a portion of the second handle 106, while a second housing that couples to the first housing may form another portion (e.g., half) of the first handle 104 and the second handle 106.

Figure 10A:
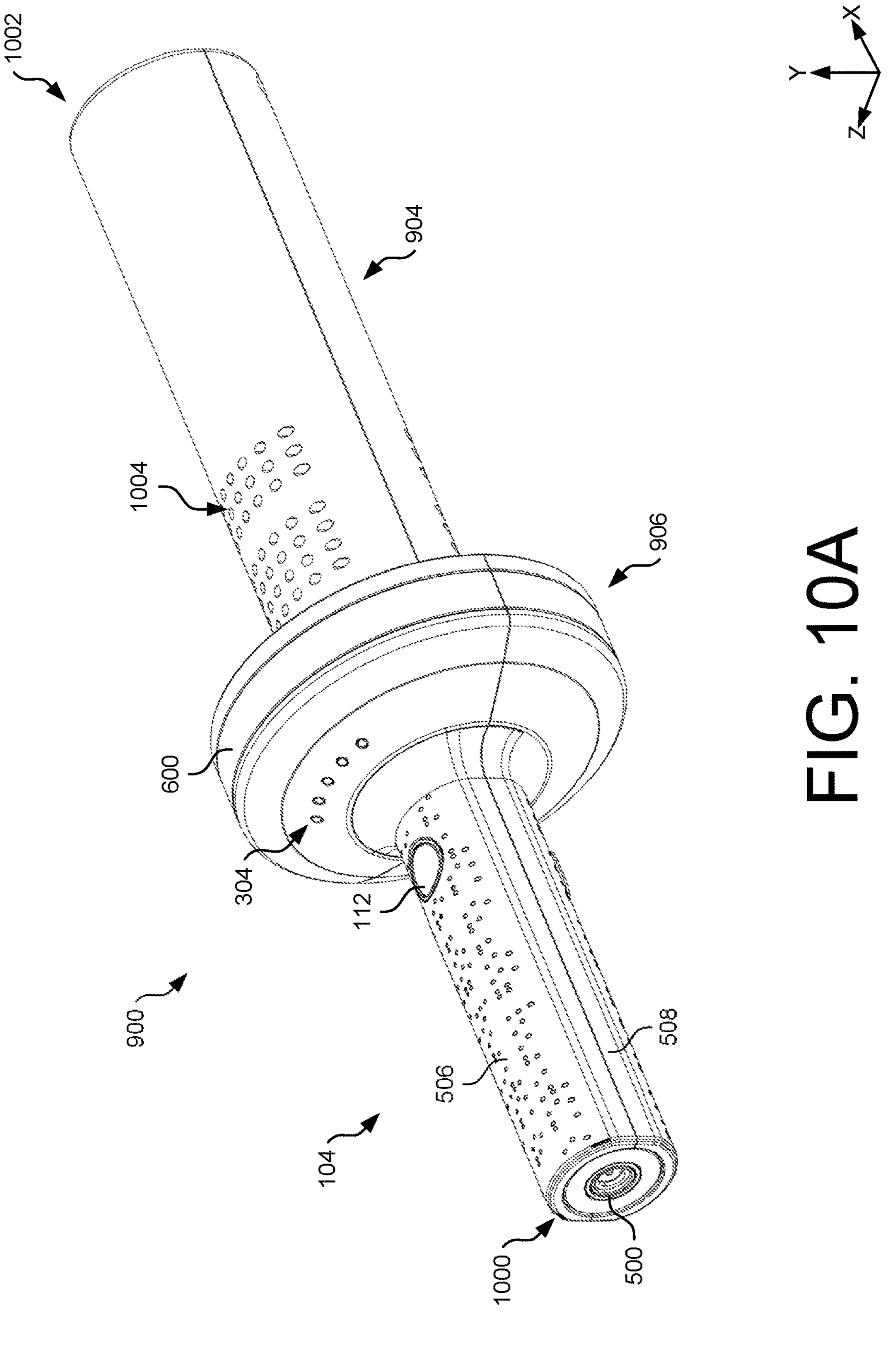
FIGS. 10A and 10B illustrate the first assembly of FIG. 9, according to examples of the present disclosure.
Figure 10B:
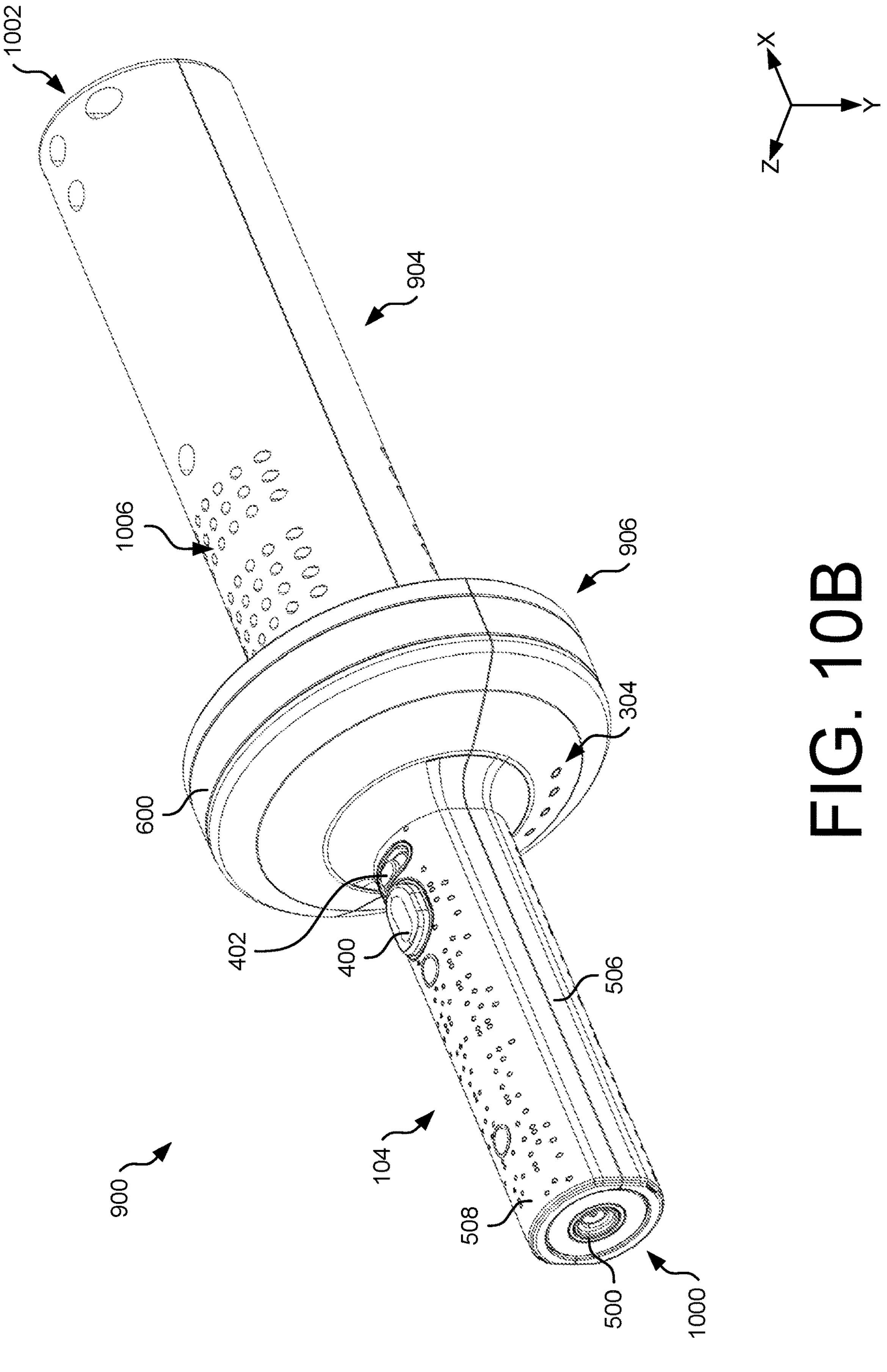

FIGS. 10A and 10B illustrate various views of the first assembly 900, according to examples of the present disclosure. As introduced above, the first assembly 900 may be formed by the first housing 506 and the second housing 508. The first assembly 900 may include a first end 1000 that corresponds to the first end 300 of the device 100, and a second end 1002 spaced apart from the first end 1000 (e.g., in the X-direction). The first handle 104 may be disposed or proximate to the first end 1000, and extend a length towards the second end 1002. The first handle 104 may be formed by the first housing 506 and the second housing 508. The first handle 104, in an embodiment, may include a surface finish or material for increasing a grip of the user.

The first button 112 and the apertures 304 may be disposed through the first housing 506. For example, the first button 112 may be disposed through an opening in the first housing 506. Additionally, as will be explained herein, a light pipe, light guide, light diffuser, etc. may be disposed at least partially through the apertures 304. The second button 400 and the switch 402, meanwhile, may be disposed through respective openings in the second housing 508. In an embodiment, the first housing 506 and/or the second housing 508 may form an opening for accommodating the port 500.

The first assembly 900 may include the first collar 906, which may be formed by corresponding portions of the first housing 506 and the second housing 508. For example, the first housing 506 may form a first half (e.g., half-circle, portion, etc.) of the first collar 906, and the second housing 508 may form a second half (e.g., half-circle, portion, etc.) of the first collar 906. The first covers 600 may be disposed on, about, etc. the first collar 906 for concealing fasteners used to couple the first housing 506 and the second housing 508 together.

In an embodiment, the first housing 506 and the second housing 508 may couple together using fasteners. For example, fasteners may be disposed through the second housing 508 and into the first housing 506 for coupling the first housing 506 and the second housing 508 together. The first housing 506 may include first orifices 1004 for permitting airflow through the first assembly 900 to dissipate heat away from components residing within the first assembly 900, such as the motor 702 and the battery 700. Additionally, the second housing 508 may include second orifices 1006 for permitting airflow through the first assembly 900. The first housing 506 and the second housing 508 may include any number of the first orifices 1004 and the second orifices 1006, respectively.

The first assembly 900 may include the case 904 for receiving the motor 702, the battery 700, the gearbox 704, as well as other components of the device 100. For example, the motor 702, the battery 700, the gearbox 704, as well as other components of the device 100 may be disposed within a portion of the first housing 506 and the second housing 508, respectively, corresponding to the case 904. The case 904 may be disposed internally to the rotatable assembly 108 (or the first frame 716 and the second frame 718) when the device 100 is assembled. As such, the rotatable assembly 108 may be disposed about an exterior surface of the case 904. The first orifices 1004 and the second orifices 1006 may be located through respective portions of the first housing 506 and the second housing 508 that form the case 904.

Figure 11B:
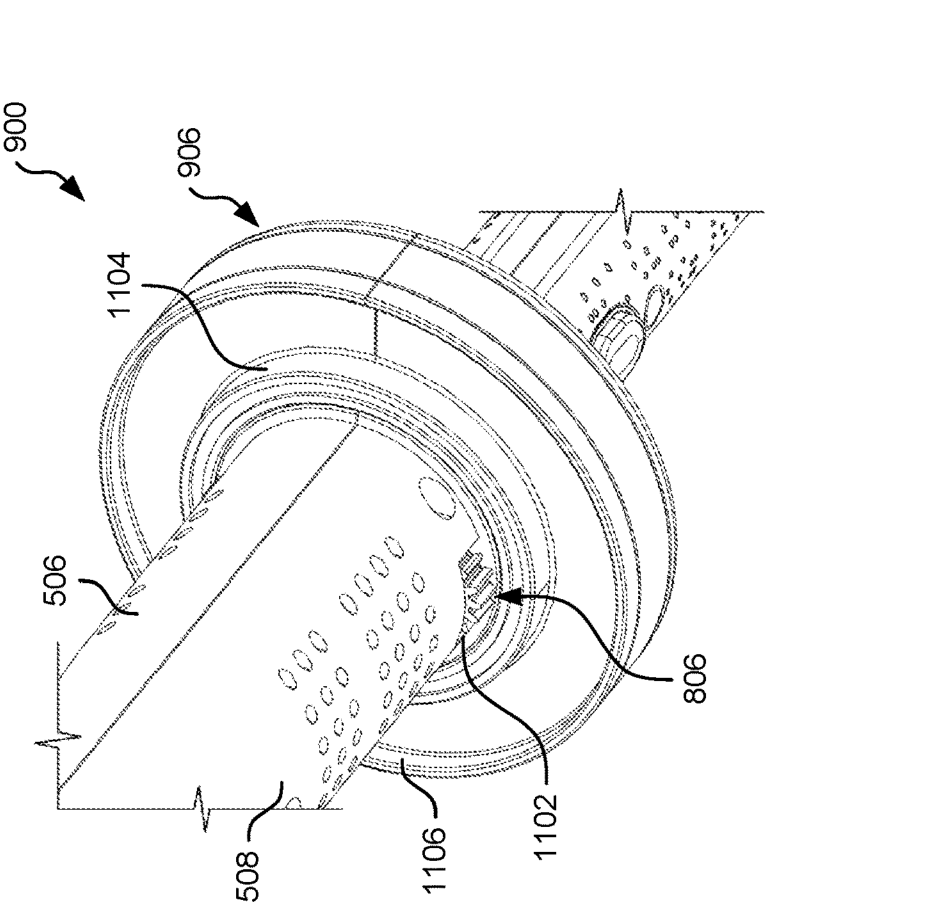
FIGS. 11A and 11B illustrate example gears of the first assembly of FIG. 9, according to examples of the present disclosure.
Figure 11A:
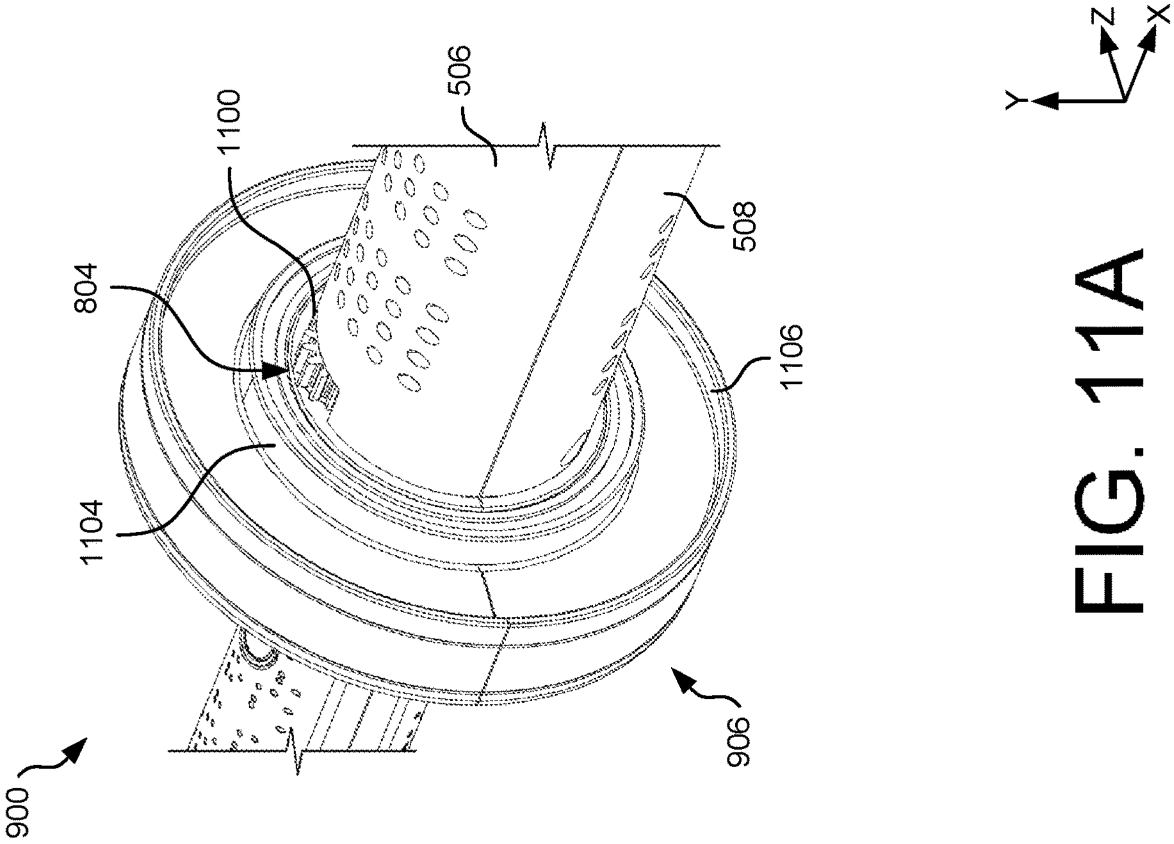

FIGS. 11A and 11B illustrate views of the first assembly 900 showing the second gear 804 and the third gear 806 at least partially protruding or extending through the first housing 506 and the second housing 508, respectively, for engaging with the fourth gear 810, according to examples of the present disclosure.

The case 904 is formed at least in part by the first housing 506 and the second housing 508. The first housing 506 may define a first opening 1100 through which at least a portion of the second gear 804 is disposed. The second housing 508 may define a second opening 1102 through which at least a portion of the third gear 806 is disposed. When the rotatable assembly 108 couples to the first assembly 900, the second gear 804 engages with the fourth gear 810 and the second assembly 902 engages with the fourth gear 810. In an embodiment, the first frame 716, such as the first base 800, may seat on the first assembly 900, or the case 904, about a collar 1104. Additionally, in an embodiment, the first base 800 of the first frame 716 may be disposed at least partially within a first flange 1106 formed by the first housing 506 and the second housing 508. The first flange 1106 may extend from, or be a part of, the first collar 906.

Figure 12A:
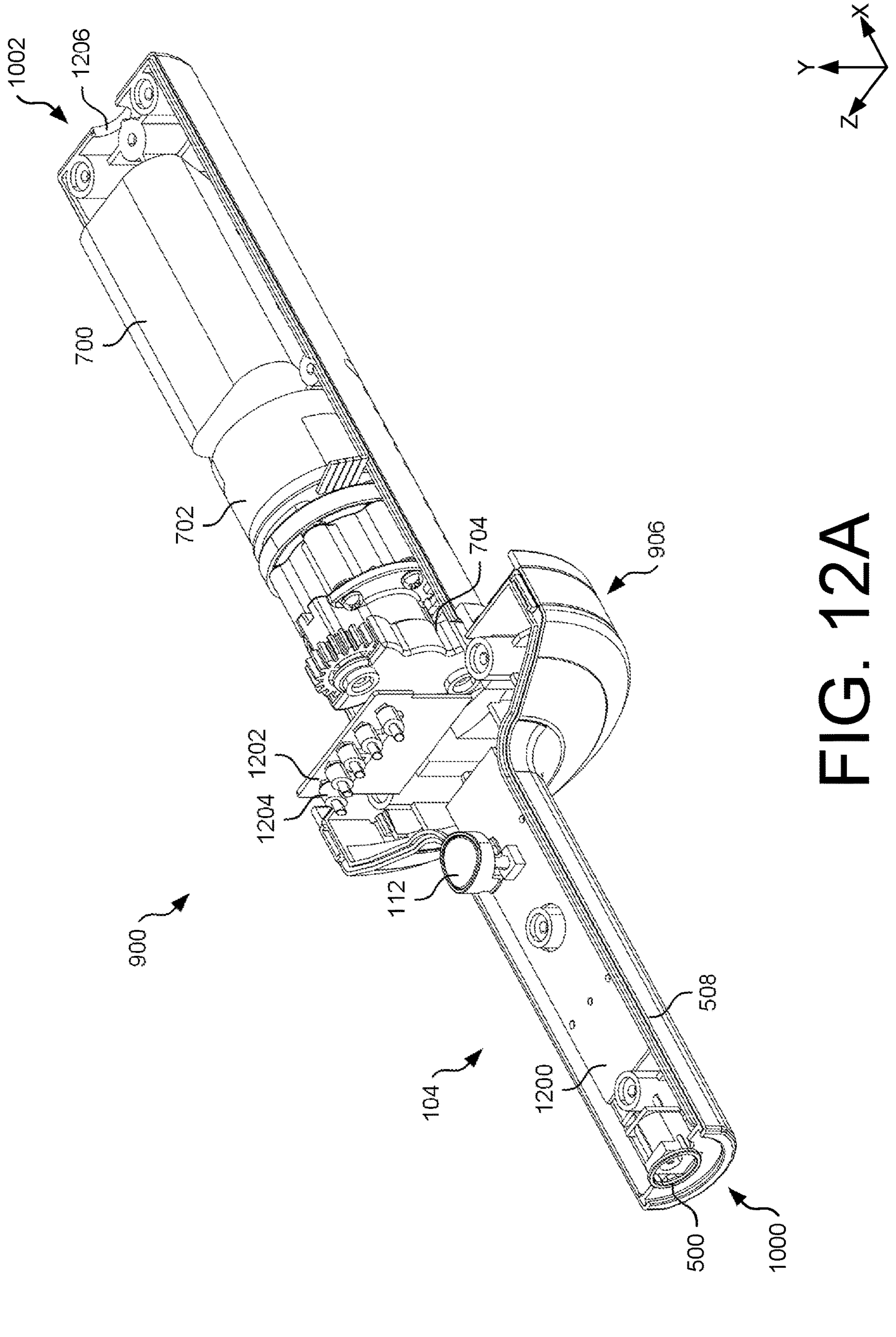
FIGS. 12A-12C illustrate example components disposed within the first assembly of FIG. 9, according to examples of the present disclosure.
Figure 12B:
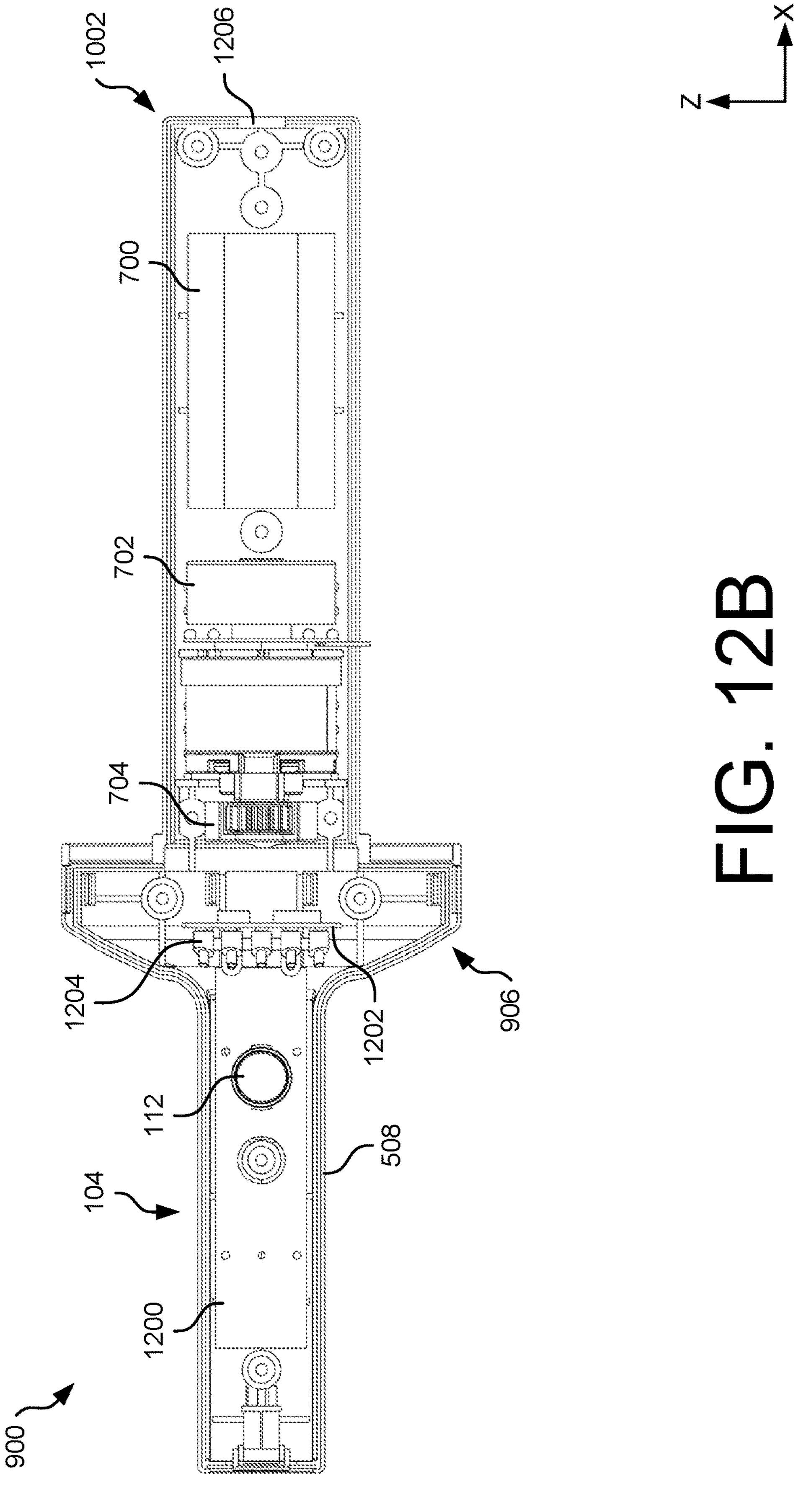
Figure 12C:
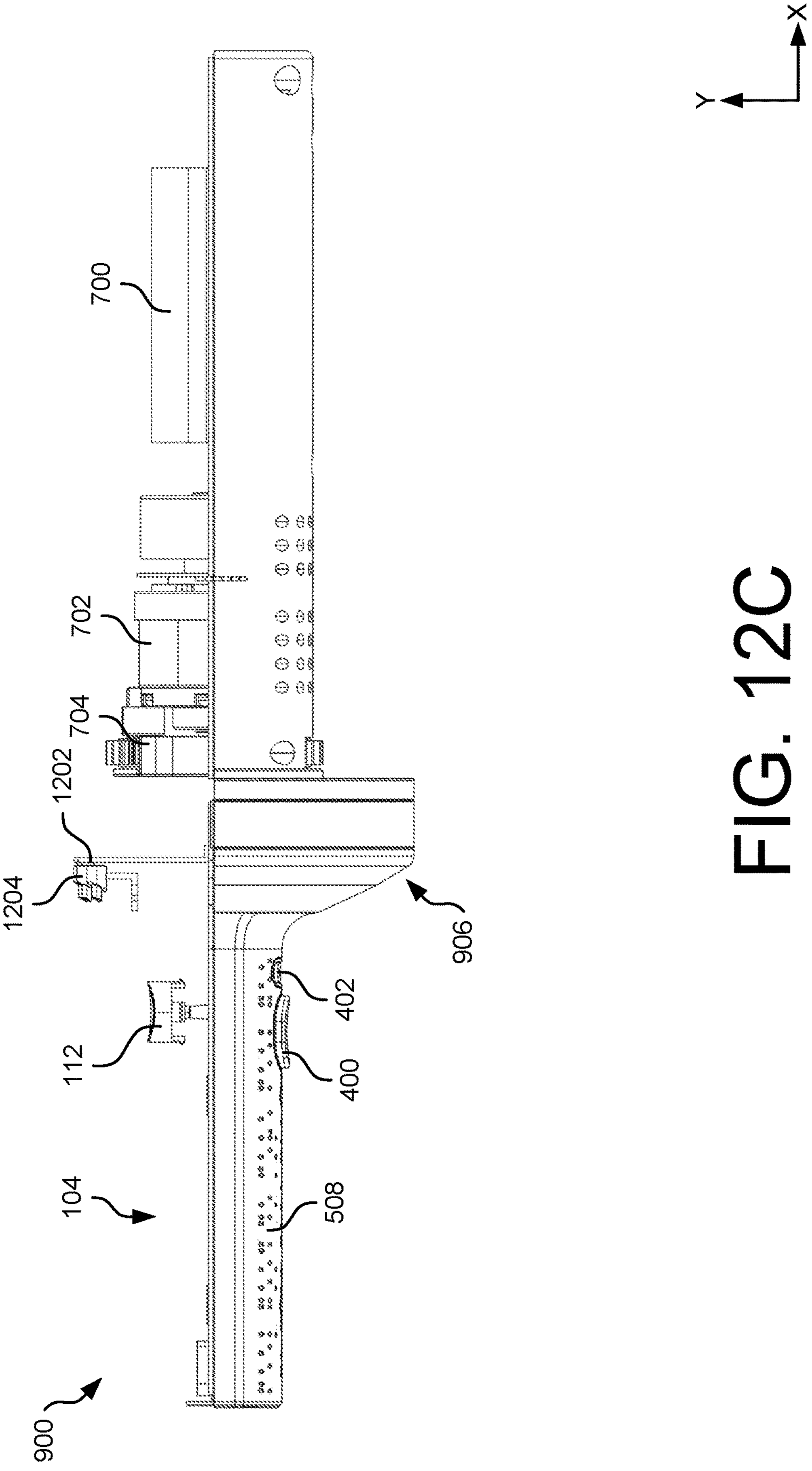

FIGS. 12A-12C illustrate partial views of the first assembly 900, showing example components residing within the first assembly 900, according to examples of the present disclosure. In FIGS. 12A-12C the first housing 506 is shown removed to illustrate the components of the first assembly 900. As introduced above, the battery 700, the motor 702, and the gearbox 704 may be disposed within (or be a component of) the first assembly 900. In an embodiment, the battery 700, the motor 702, and the gearbox 704 may be seated within the second housing 508. In an embodiment, the battery 700 may be located closer to the second end 1002 of the first assembly 900 as compared to the motor 702 and/or the gearbox 704.

The device 100 may include a first PCB 1200 and a second PCB 1202. The first PCB 1200 may be disposed at least partially within the first handle 104 (or a portion of the first housing 506 and the second housing 508 that form the first handle 104). The first button 112, the second button 400, the switch 402, and the port 500 may communicatively couple to, or be disposed on, the first PCB 1200. In an embodiment, the first button 112 is disposed on or coupled to a first side of the first PCB 1200, while the second button 400 and the switch 402 may be disposed on or coupled to a second side of the first PCB 1200 (e.g., opposite the first side). The first housing 506 and the second housing 508 may include various prongs, flanges, mounts, etc. for aligning or otherwise situating the first PCB 1200, and/or the first button 112, the second button 400, the switch 402, and the port 500 within, or to, the first housing 506 and/or the second housing 508.

The second PCB 1202 may be disposed at least partially within the first collar 906 or a portion of the first housing 506 and the second housing 508 that form the first collar 906. The second PCB 1202 may include one or more lighting elements for emitting light through the apertures 304. In an embodiment, the device 100 includes a light guide 1204 for directing light from the lighting elements residing on the second PCB 1202 through the apertures 304. When assembled, at least a portion of the light guide 1204 may be disposed within channels, passages, etc. of the first housing 506. As introduced above, in an embodiment that the motor 702 includes five speeds, the light guide 1204 may include five corresponding features (e.g., prongs, pins, etc.), where respective features may output light from a corresponding lighting element of the lighting elements through the apertures 304. The first housing 506 and the second housing 508 may include various prongs, flanges, mounts, etc. for aligning or otherwise situating the second PCB 1202 and the light guide 1204 within, or to, the first housing 506 and/or the second housing 508.

The first PCB 1200 and the second PCB 1202 may communicatively couple via one or more flex circuits, wires, cables, and so forth. Additionally, the first PCB 1200 and/or the second PCB 1202 may communicatively couple to the battery 700, the motor 702, sensor(s), and/or other components of the device 100, for example. As an example, the port 500 may communicatively couple to the first PCB 1200, and the first PCB 1200 may communicatively couple to the battery 700 for permitting the battery 700 to be charged.

In an embodiment, the first housing 506 and/or the second housing 508 may include grooves or interlocking features around a perimeter of the first housing 506 and/or the second housing 508, respectively. The grooves, for example, may seat the first housing 506 and the second housing 508 together, may prevent debris entering the first assembly 900, may prevent the ingress of liquid into the first assembly 900, and so forth. The first housing 506 and the second housing 508 may also form a channel 1206 through which the rod 706 is disposed.

Figure 13:
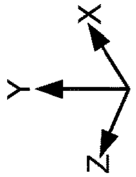
FIG. 13 illustrates an example motor, battery, and gearbox of the device of FIG. 1, according to examples of the present disclosure.
Figure 13:
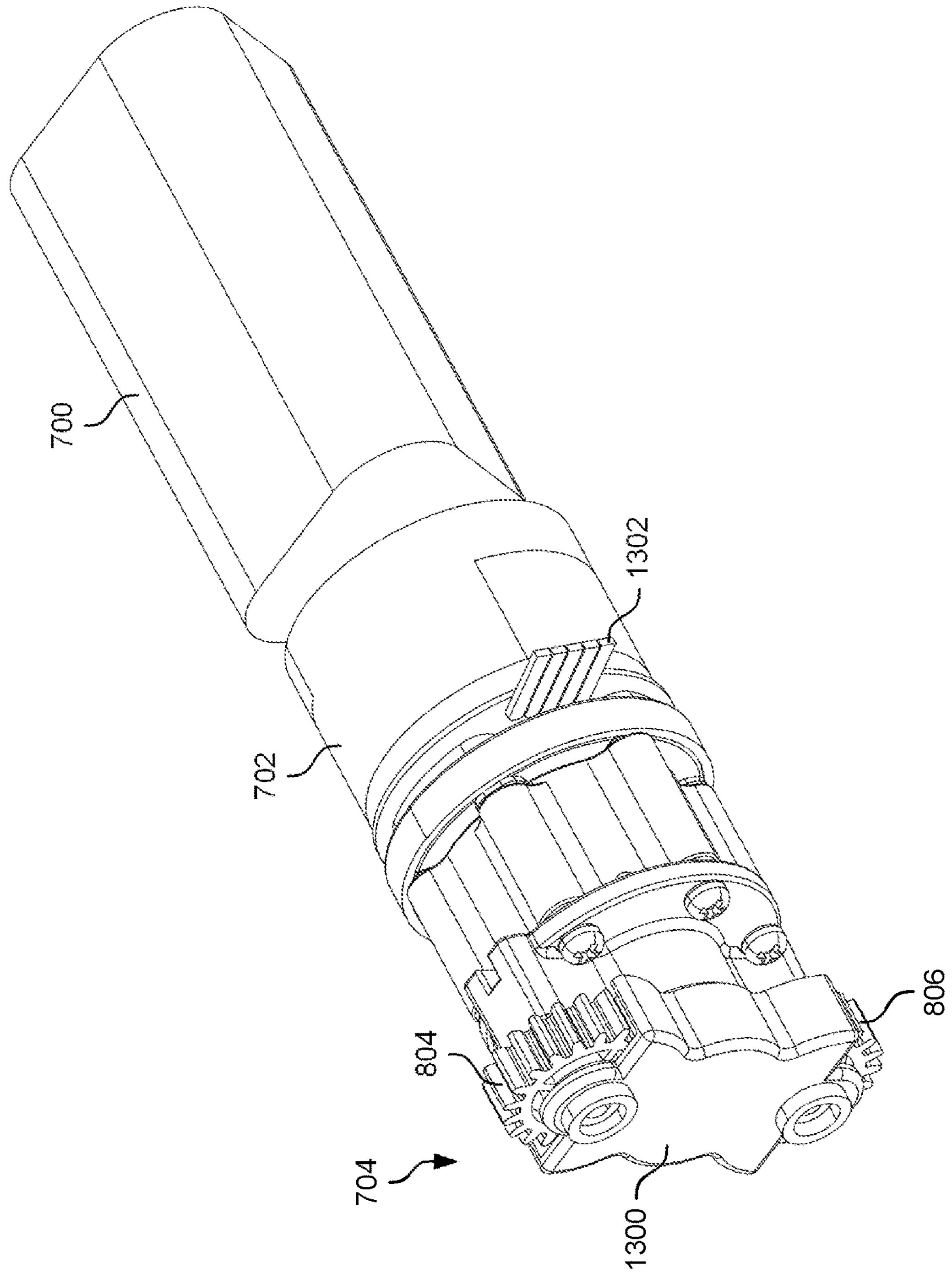

FIG. 13 illustrates the battery 700, the motor 702, and the gearbox 704, according to examples of the present disclosure. The battery 700 may be communicatively coupled to the motor 702 to provide power to the motor 702. The motor 702 may couple to the gearbox 704, such as the first gear 802 within the gearbox 704, via the shaft 808 to drive the first gear 802. Correspondingly, motion may be imparted to the second gear 804 and the third gear 806 to impart rotation to the rotatable assembly 108 via the fourth gear 810. The gearbox 704 may include a housing 1300 through which the second gear 804 and the third gear 806 and the fourth gear 810 are at least partially received. However, the second gear 804 and the third gear 806 may extend at least partially external to the housing 1300 for engaging with the fourth gear 810. One or more flex circuits 1302 may couple between the first PCB 1200, the second PCB 1202, and/or additional PCBs, and the motor 702, for example, to control an operation of the motor 702, such as a speed of the motor 702.

Figure 14A:
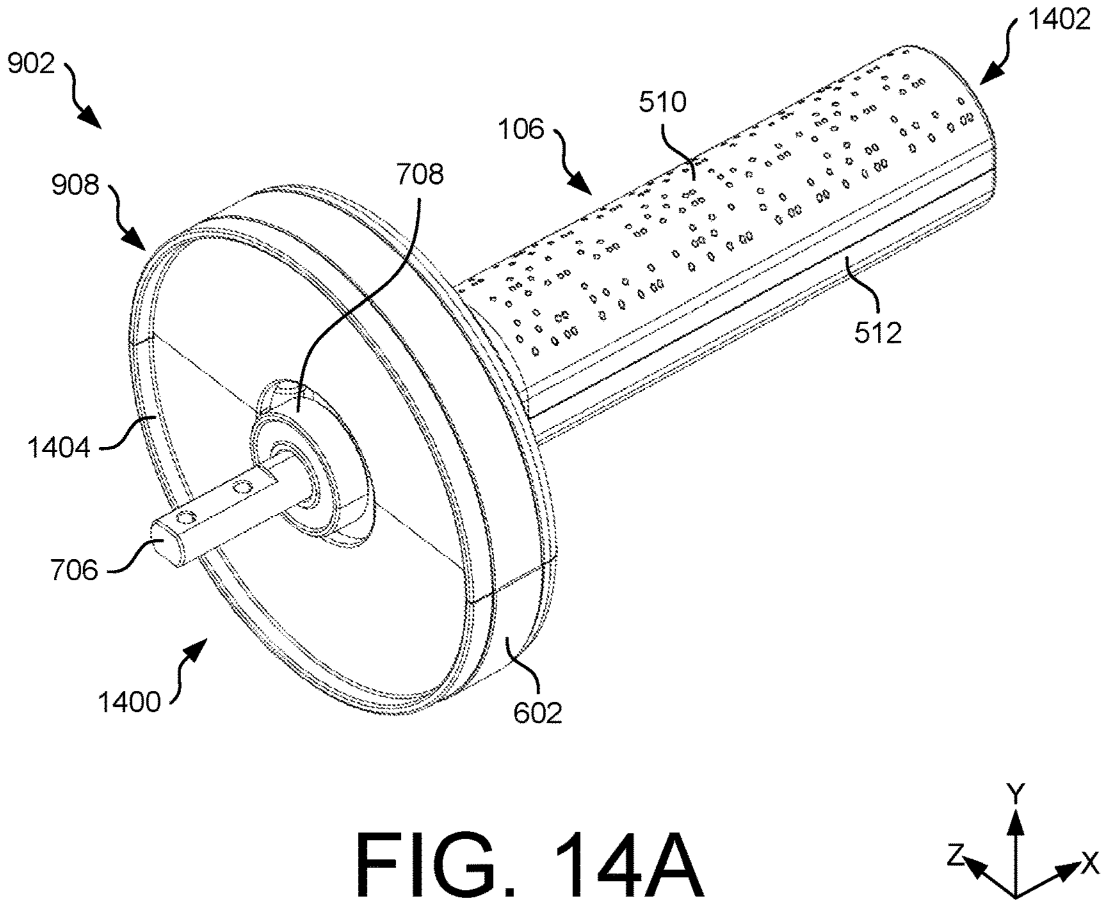
FIGS. 14A and 14B illustrate the second assembly of FIG. 9, according to examples of the present disclosure.
Figure 14B:
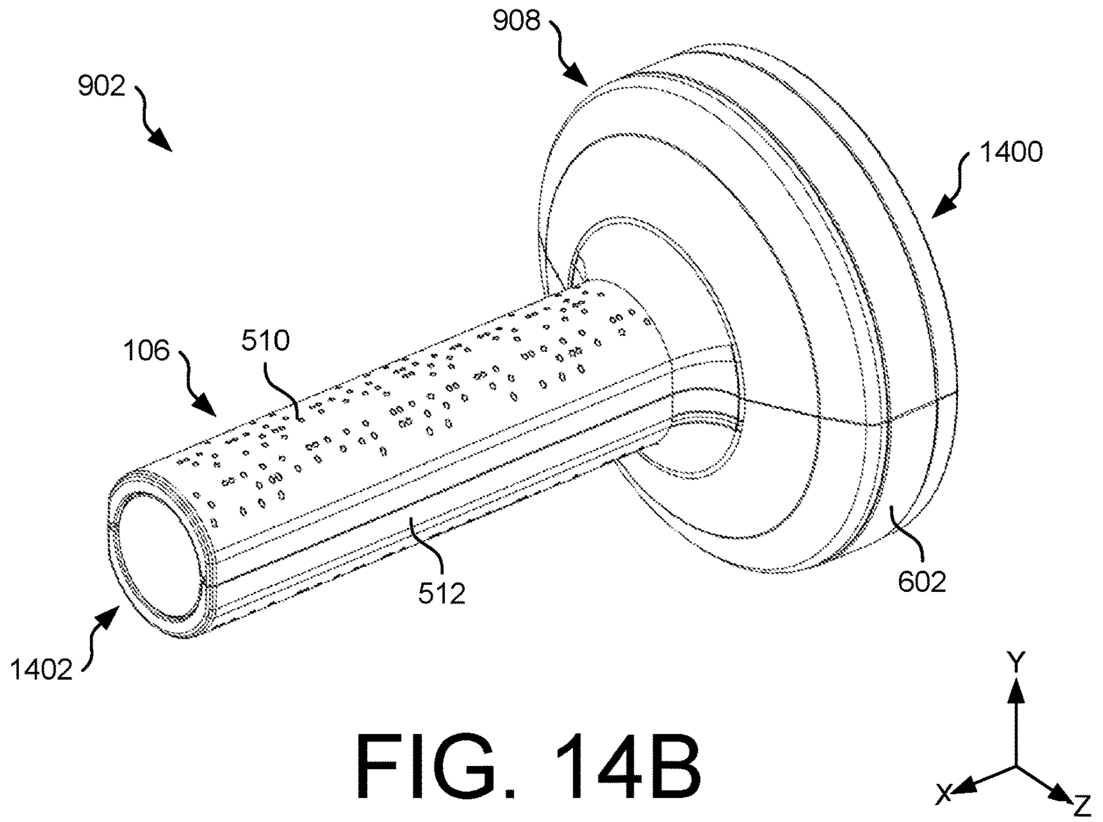

FIGS. 14A and 14B illustrate views of the second assembly 902, according to examples of the present disclosure. As introduced above, the second assembly 902 may be formed by the third housing 510 and the fourth housing 512. The second assembly 902 may include a first end 1400 and a second end 1402 spaced apart from the first end 1400 (e.g., in the X-direction) that corresponds to the second end 302 of the device 100. The second handle 106 may be disposed or proximate to the second end 1402, and extend a length towards the first end 1400. The second handle 106 may be formed by the third housing 510 and the fourth housing 512. The second handle 106, in an embodiment, may include a surface finish or material for increasing a grip of the user.

The rod 706 may extend through or at the first end 1400 of the second assembly 902. For example, the rod 706 may be disposed at least partially into the first assembly 900, via the channel 1206, for coupling to the first housing 506 and/or the second housing 508. Further, the bearing 708 is shown being disposed about the rod 706. In an embodiment, the second frame 718, such as a base thereof, may be situated or seated on the bearing 708.

The second assembly 902 may include the second collar 908, which may be formed by corresponding portions of the third housing 510 and the fourth housing 512. For example, the third housing 510 may form a first half (e.g., half-circle, portion, etc.) of the second collar 908, and the fourth housing 512 may form a second half (e.g., half-circle, portion, etc.) of the second collar 908. The second covers 602 may be disposed on, about, etc. the second collar 908 for concealing fasteners used to couple the third housing 510 and the fourth housing 512 together. In an embodiment, the third housing 510 and the fourth housing 512 may couple together using fasteners. For example, fasteners may be disposed through the fourth housing 512 and into the third housing 510 for coupling the third housing 510 and the fourth housing 512 together. Additionally, in an embodiment, the second frame 718 may be disposed at least partially within a second flange 1404 formed by the third housing 510 and the fourth housing 512. The second flange 1404 may extend from, or be a part of, the second collar 908.

Figure 15A:
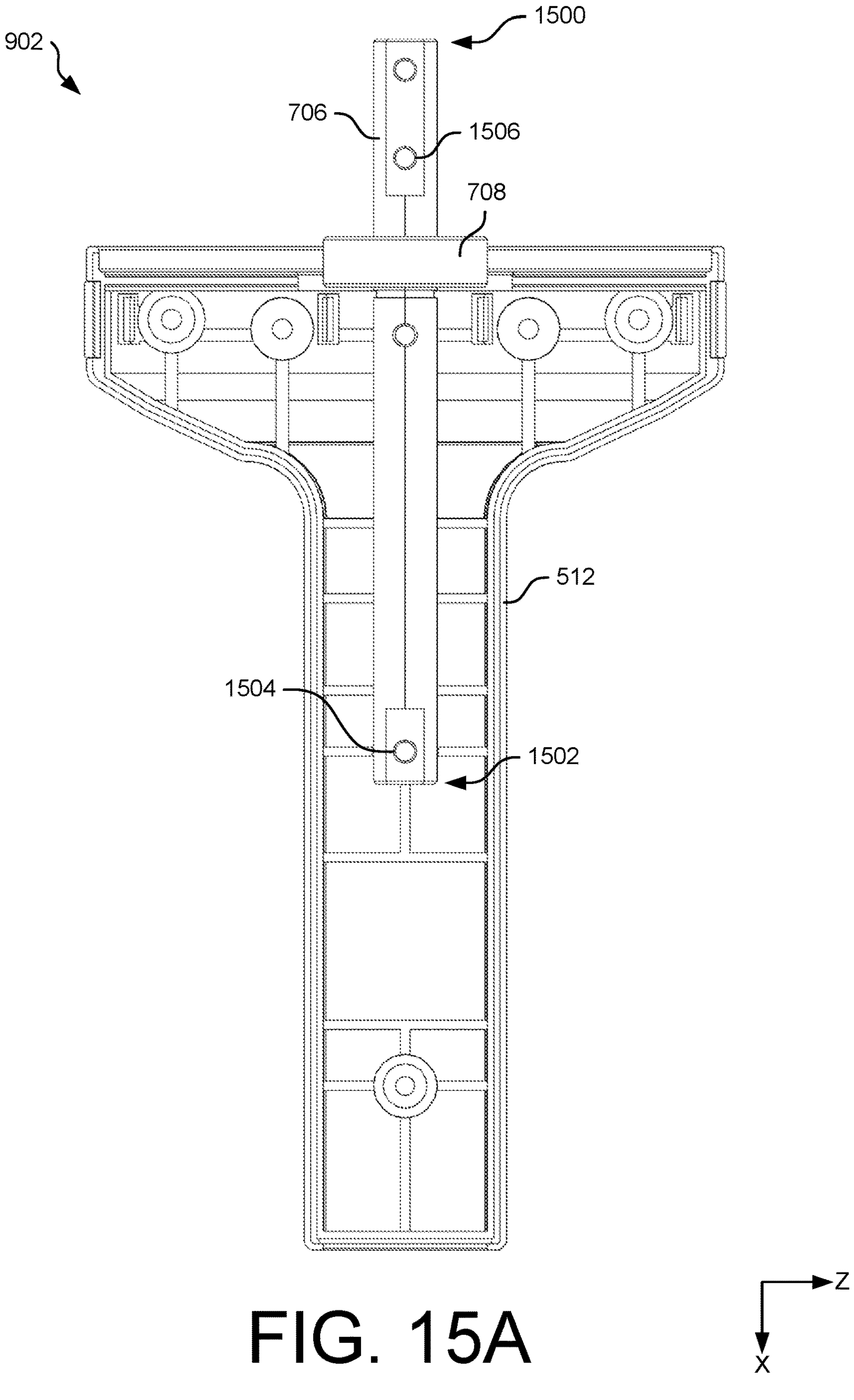
FIGS. 15A-15C illustrate example components disposed within the second assembly of FIG. 9, according to examples of the present disclosure.
Figure 15B:
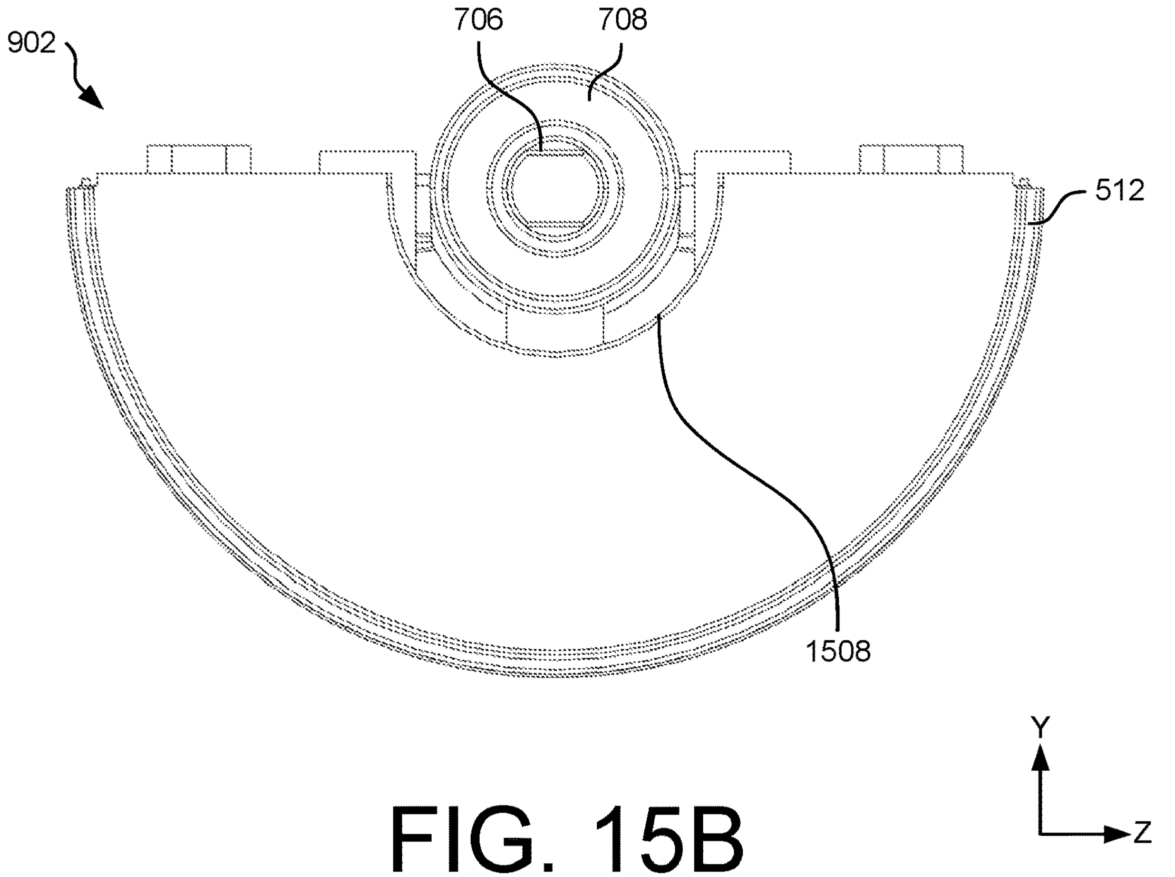
Figure 15C:
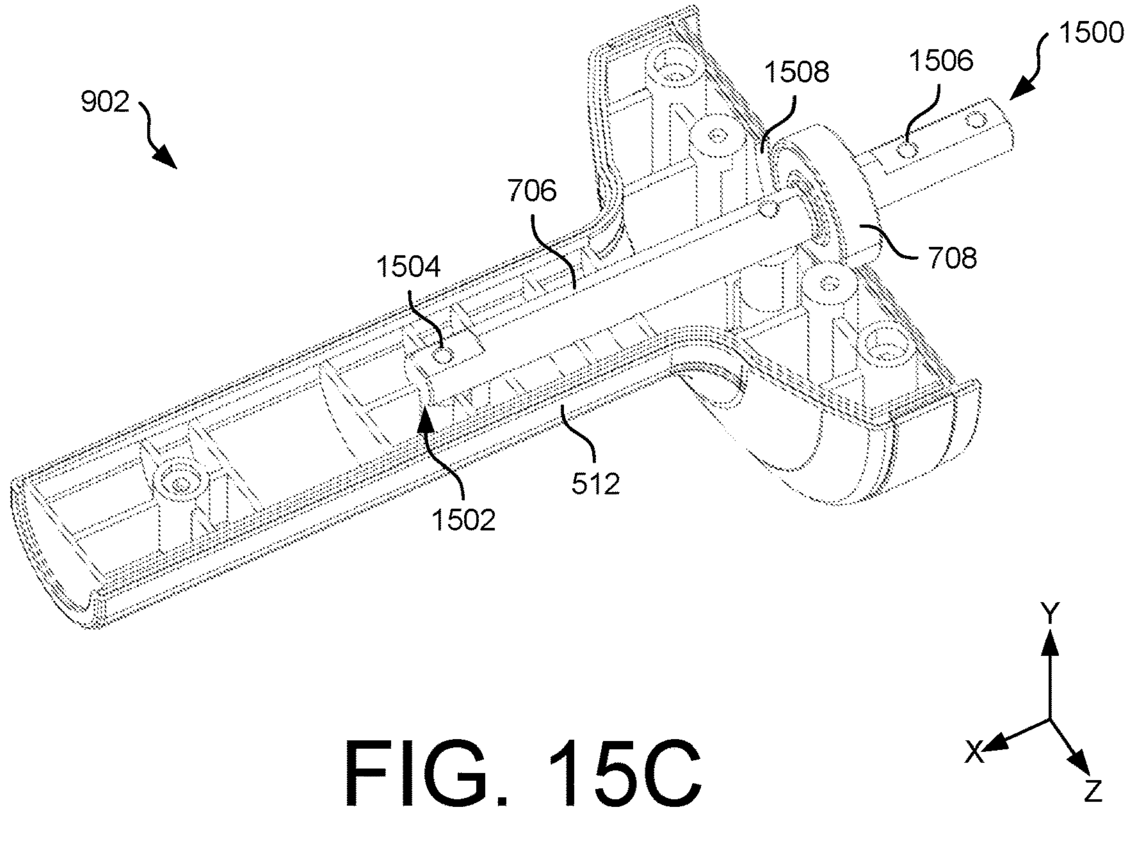

FIGS. 15A-15C illustrate partial views of the second assembly 902, showing example components residing within the second assembly 902, according to examples of the present disclosure. In FIGS. 15A-15C the third housing 510 is shown removed to illustrate the components of the second assembly 902. For example, the rod 706 is shown disposed at least partially external to the third housing 510 and the fourth housing 512 for coupling the first assembly 900 and the second assembly 902 together. More particularly, the rod 706 may include a first end 1500 and a second end 1502 spaced apart from the first end 1500 (e.g., in the X-direction). The first end 1500 may be disposed external to the third housing 510 and the fourth housing 512, while the second end 1502 may be disposed internal to the third housing 510 and the fourth housing 512. When the device 100 is assembled, a portion of the length of the rod 706 proximate to the first end 1400 may be disposed within the first housing 506 and the second housing 508 (or the first assembly 900).

The third housing 510 and/or the fourth housing 512 may include one or more grooves, channels, brackets, etc. for receiving the rod 706 and for situating the rod 706 therein. The rod 706 may also include first passages 1504 through which fasteners may be disposed for coupling the rod 706 to the third housing 510 and/or the fourth housing 512. Additionally, the rod 706 may include second passages 1506 through which fasteners may be disposed for coupling the rod 706 to the first housing 506 and/or the second housing 508. The bearing 708 may be disposed about the rod 706, at a location between the first end 1500 and the second end 1502. In an embodiment, the bearing 708 may be located closer to the first end 1500 as compared to the second end 1502. The third housing 510 and the fourth housing 512 may also include a channel 1508 within which the rod 706 and the bearing 708 are disposed such that the first end 1500 extends external to the third housing 510 and the fourth housing 512 for coupling to the first housing 506 and/or the second housing 508.

In an embodiment, the third housing 510 and/or the fourth housing 512 may include grooves or interlocking features around a perimeter of the third housing 510 and/or the fourth housing 512, respectively. The grooves, for example, may seat the third housing 510 and the fourth housing 512 together, may prevent debris entering the second assembly 902, may prevent the ingress of liquid into the second assembly 902, and so forth.

Figure 16:
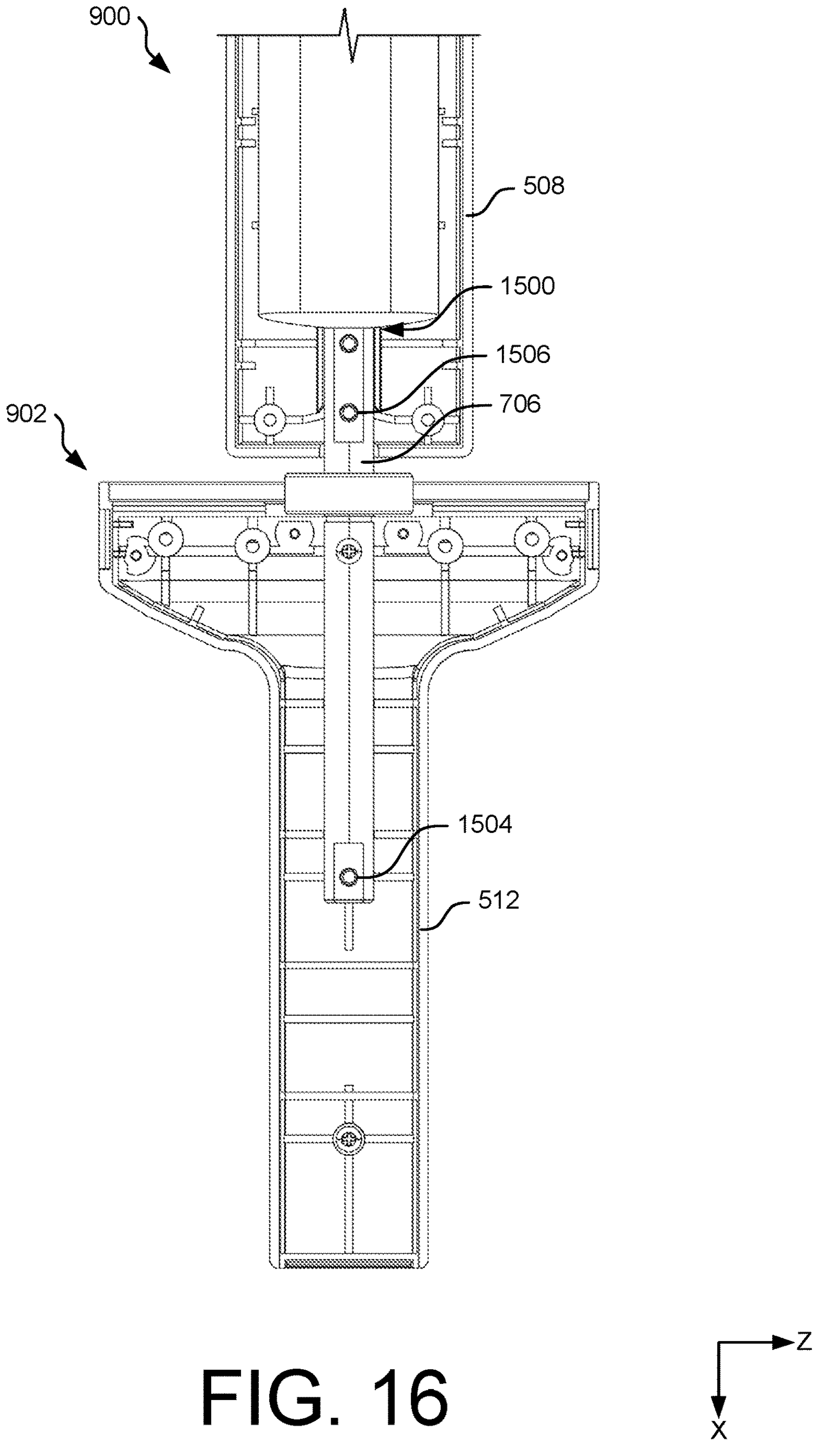
FIG. 16 illustrates an example coupling of the first assembly and the second assembly of FIG. 9, according to examples of the present disclosure.

FIG. 16 illustrates a coupling of the first assembly 900 and the second assembly 902, according to examples of the present disclosure. As shown the first end 1500 of the rod 706 may be disposed within first housing 506 and the second housing 508, via the channel 1206, while the second end 1502 may be disposed within the third housing 510 and the fourth housing 512, via the channel 1508. Moreover, the rod 706 may be coupled to the first housing 506 and/or the second housing 508 via fasteners disposed through the second passages 1506, while the rod 706 may be coupled the third housing 510 and/or the fourth housing 512 via fasteners disposed through the first passages 1504. The bearing 708 may also seat within the channel 1508 for permitting free rotation of the second handle 106 while the motor 702 is actuated.

Figure 17A:
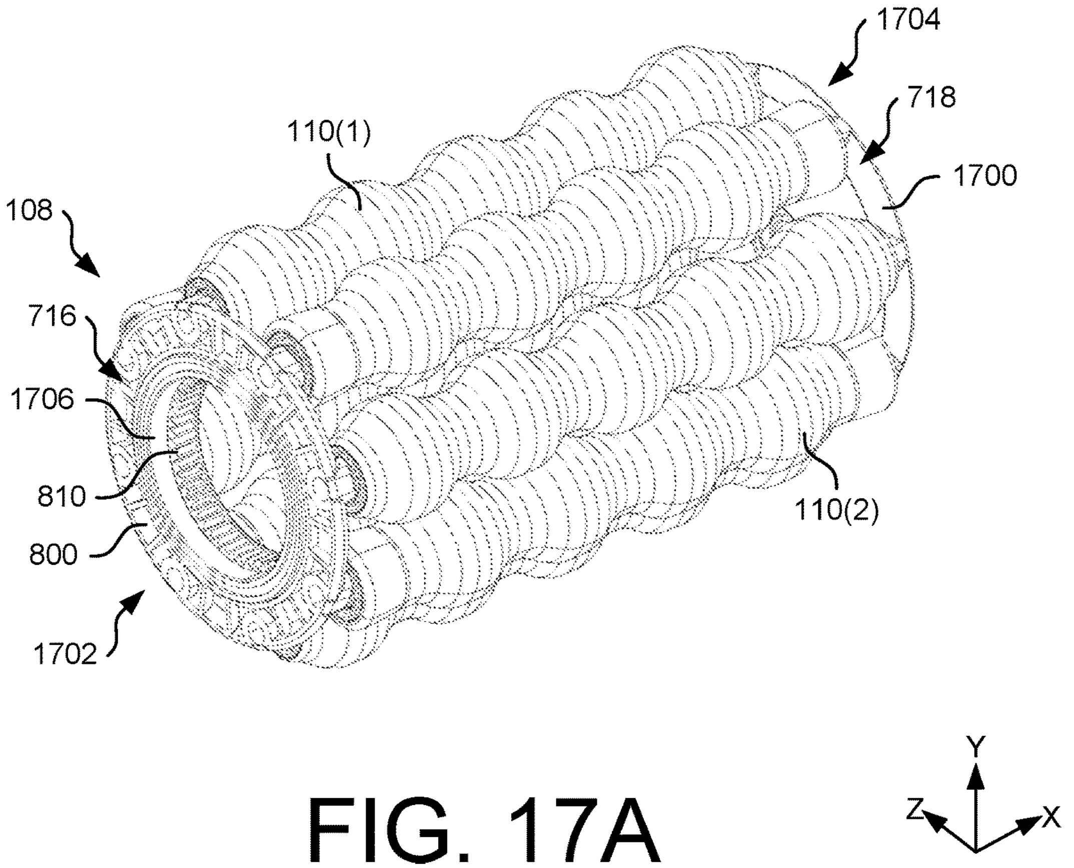
FIGS. 17A and 17B illustrate an example rotatable assembly of the device of FIG. 1, according to examples of the present disclosure.
Figure 17B:
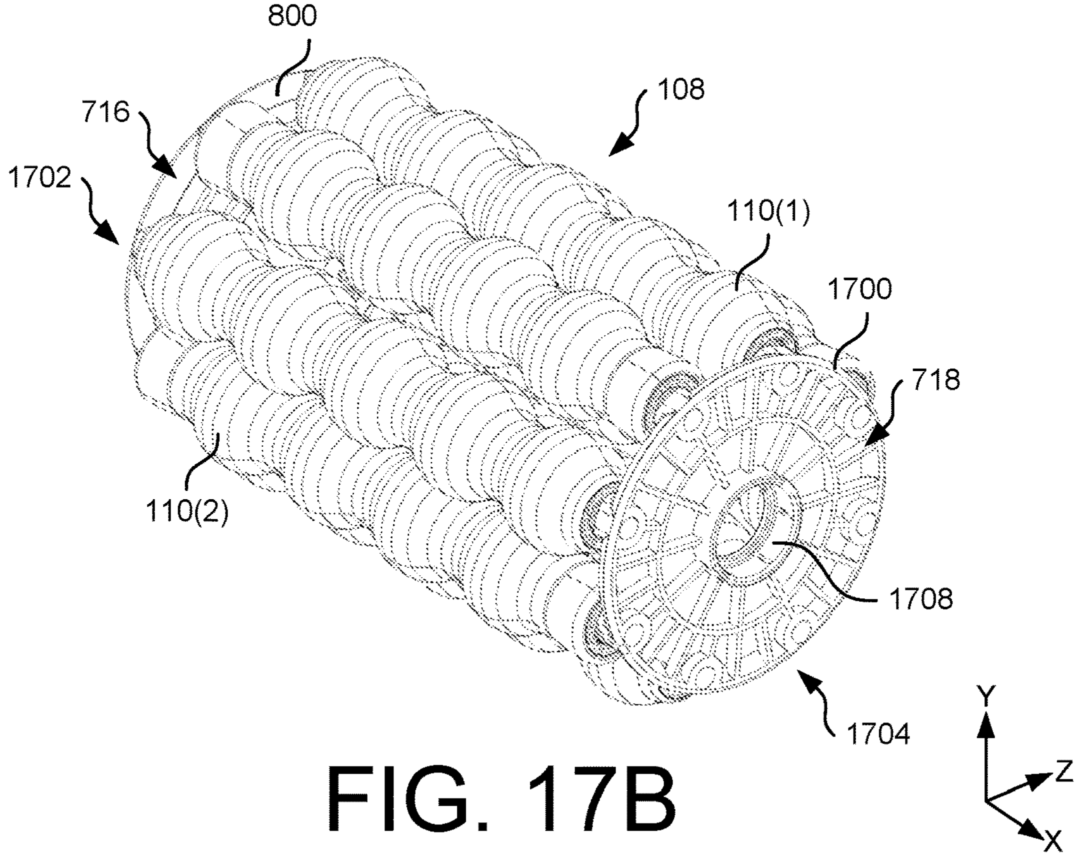

FIGS. 17A and 17B illustrate perspective views of the rotatable assembly 108, according to examples of the present disclosure. The rotatable assembly 108, as will be explained herein, may be formed via, or include, the first frame 716, the second frame 718, the first rotatable elements 110(1), and the second rotatable elements 110(2). The views in FIGS. 17A and 17B illustrate the rotatable assembly 108 being assembled. In such instances, the first rotatable elements 110(1) and the second rotatable elements 110 are disposed about the shafts 710 formed by the first posts 712 and the second posts 714. The first posts 712 may extend from the first base 800 of the first frame 716, while the second posts 714 may extend from a second base 1700 of the second frame 718. The first base 800 may be configured to be at least partially disposed within the first flange 1106, adjacent to the first collar 906, while the second base 1700 may be configured to be at least partially disposed within the second flange 1404 adjacent to the second collar 908. In an embodiment, the first base 800 may be disposed adjacent to a first end 1702 of the rotatable assembly 108, and the second base 1700 may be disposed adjacent to a second end 1704 of the rotatable assembly 108 spaced apart from the first end 1702 (e.g., in the X-direction).

The first base 800 is shown including or defining the fourth gear 810 for engaging with the second gear 804 and the third gear 806. Additionally, the first base 800 may define a first race 1706 that is disposed over the collar 1104. During actuation of the rotatable assembly 108, the first race 1706 may rotate around the collar 1104 (e.g., about the X-axis). The second base 1700 may define a second race 1708 that receives the bearing 708.

In an embodiment, the rotatable assembly 108 may be interchangeable with other rotatable assemblies 108. For example, each rotatable assembly have a certain contour or shape of the rotatable elements 110, and interchanging the rotatable assemblies 108 may provide for rotatable elements 110 with different contours and shapes. In an embodiment, a size of the rotatable assembly 108 may vary. In an embodiment, the rotatable assembly 108 may be slide onto or off of the first assembly 900. In an embodiment quick-disconnect features (e.g., latches, levers, etc.) may be used to interchange the rotatable assembly 108. Additionally, instead of replacing the rotatable assembly 108, the rotatable elements 110 may be interchangeable with one another.

Figure 18A:
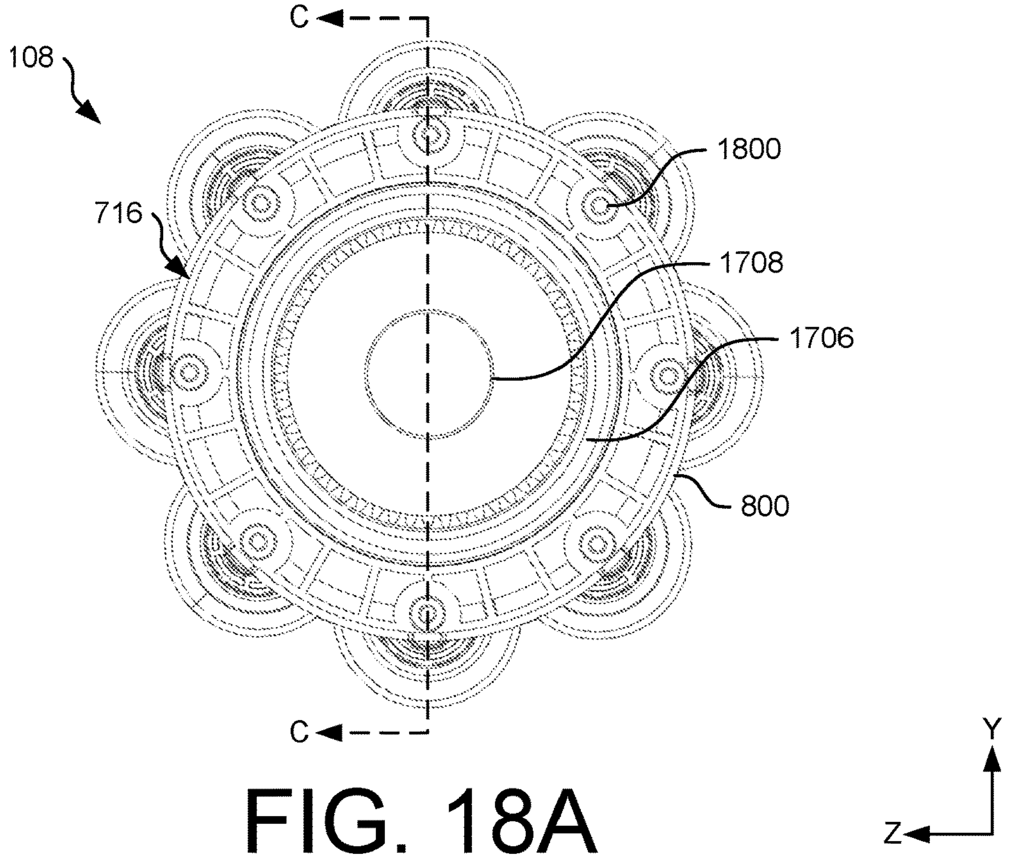
FIGS. 18A and 18B illustrate end views of the rotatable assembly of FIGS. 17A and 17B, according to examples of the present disclosure.
Figure 18B:
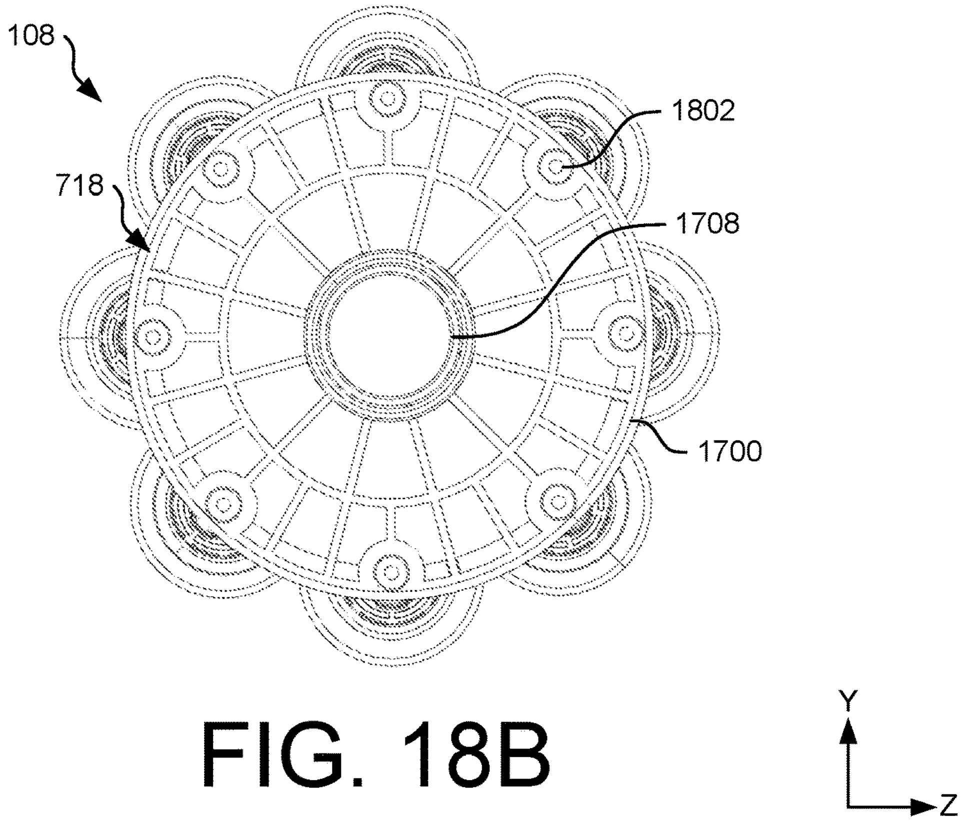

FIGS. 18A and 18B illustrate end views of the rotatable assembly 108, according to examples of the present disclosure. FIG. 18A illustrates the first end 1702 of the rotatable assembly 108 and FIG. 18B illustrates the second end 1704 of the rotatable assembly 108. The first frame 716 includes the first base 800 from which the first posts 712 extend, where the first posts 712 extend in a directions towards the second frame 718 (or the second base 1700). Similarly, the second frame 718 includes the second base 1700 from which the second posts 714 extend, where the second posts 714 extend in a directions towards the first frame 716 (or the first base 800). The first posts 712 and/or the second posts 714 may be hollow for permitting fastener(s) to be inserted into the second posts 714 for coupling the second posts 714 to the first posts 712. In an embodiment, the fasteners may be inserted into first openings 1800 of the first base 800 for inserting the fasteners into the first posts 712 to couple to the second posts 714. Alternatively, the second posts 714 may include second openings 1802 for inserting the fasteners into the first posts 712. The fasteners may couple the first frame 716 and the second frame 718 together.

The first base 800 forms the first race 1706 for being disposed over the collar 1104, while the second base 1700 forms the second race 1708 for receiving the bearing 708. As shown, the first race 1706 may be larger in size (e.g., cross-sectional dimension) than the second race 1708. In some embodiment, the first race 1706 receives a bearing. However, other sizes of the first race 1706 and/or the second race 1708 may include different sizes than described.

Figure 19:
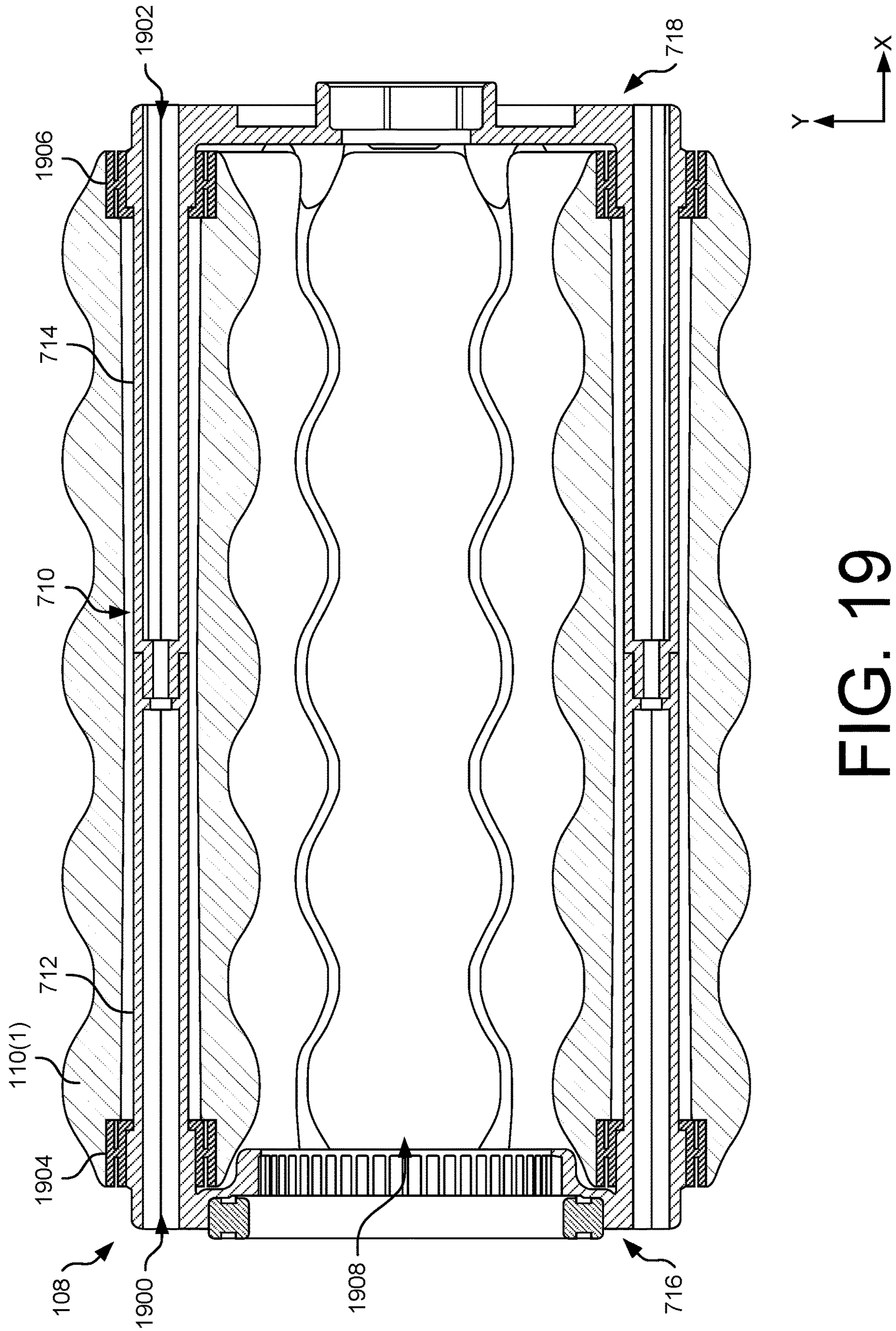
FIG. 19 illustrates a cross-sectional view of the rotatable assembly of FIGS. 17A and 17B, taken along line C-C of FIG. 18A, according to examples of the present disclosure.

FIG. 19 illustrates a cross-sectional view of the rotatable assembly 108, taken along line C-C of FIG. 18A, according to examples of the present disclosure. The first frame 716 and the second frame 718 may couple together for forming the shafts 710 about which the rotatable elements 110 are disposed, for example. As introduced above, the shafts 710 may be formed via the first posts 712 of the first frame 716 and the second posts 714 of the second frame 718. In an embodiment, the first posts 712 include a first channel 1900 and the second posts 714 include a second channel 1902. Fasteners may be disposed within the first channel 1900 and/or the second channel 1902 for coupling the first frame 716 and the second frame 718. For example, in an embodiment, fasteners may be placed into the first channel 1900, and fastened into the second posts 714. Alternatively, fasteners may be placed into the second channel 1902, and fastened into the first posts 712. The first channel 1900 and the second channel 1902 may be different or similar in their cross-sectional thickness, dimensions, etc. However, although described as coupling together via fasteners, the first frame 716 and the second frame 718 may couple via press-fit, snap-fit, pressure-fit, and so forth.

In an embodiment, the rotatable elements 110 may be disposed about bushings on the first frame 716 and/or the second frame 718. For example, a first end of the first rotatable element 110(1) and/or the first end of the second rotatable element 110(2) may be disposed about first bushings 1904 at or on the first frame 716 (e.g., the first base 800). The second end of the first rotatable element 110(1) and/or the second end of the second rotatable element 110(2) may be disposed about second bushings 1906 at or on the second frame 718 (e.g., the second base 1700). In an embodiment, the first bushings 1904 and/or the second bushings 1906 may secure the first rotatable element 110(1) and the second rotatable element 110(2) to the first frame 716 and the second frame 718. Additionally, or alternatively, the first bushings 1904 and/or the second bushings 1906 may provide rotational movement to the first rotatable element 110(1) and the second rotatable element 110(2) (e.g., such that the first rotatable element 110(1) and the second rotatable element 110(2) may rotate about the shafts 710).

As further shown, the rotatable assembly 108 includes a central cavity 1908 for being disposed about the case 904. The case 904 may at least partially extend into the central cavity 1908 for being disposed between the rotatable elements 110, and such that the second end 1002 of the first assembly 900 is permitted to couple to the rod 706 of the second assembly 902.

Figure 20:
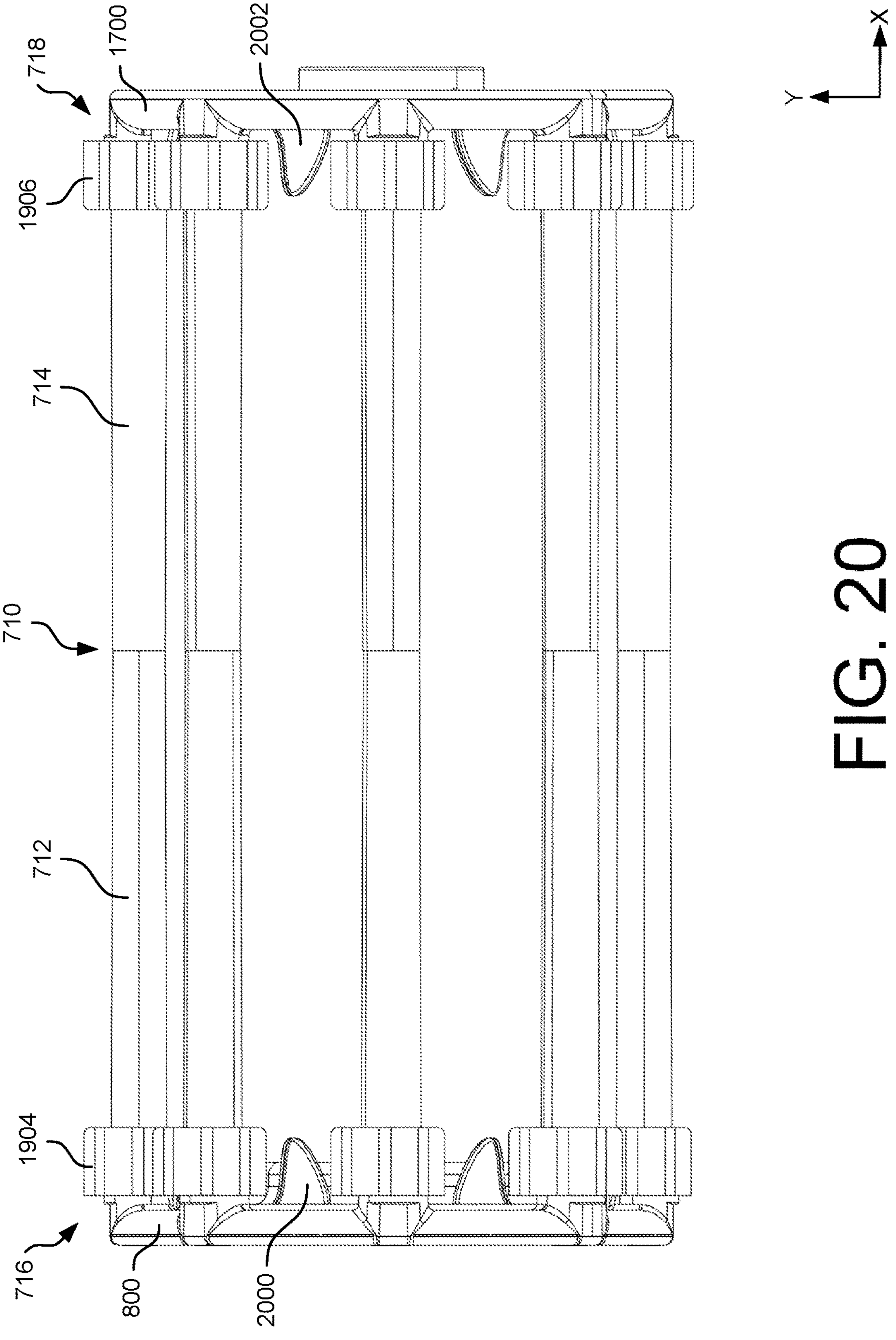
FIG. 20 illustrates an example first frame and an example second frame of the rotatable assembly of FIGS. 17A and 17B coupled together, according to examples of the present disclosure.
Figure 21A:
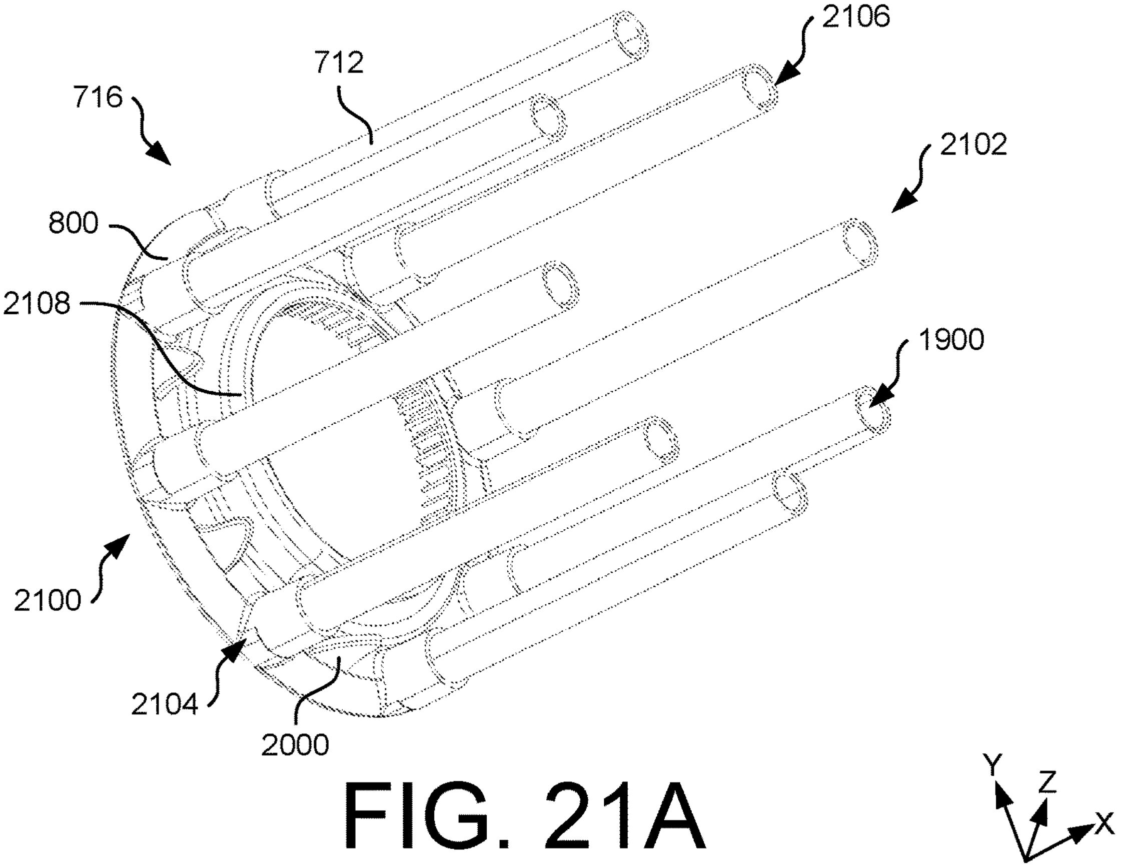
FIGS. 21A-21D illustrate the first frame of the rotatable assembly of FIG. 20, according to examples of the present disclosure.
Figure 21B:
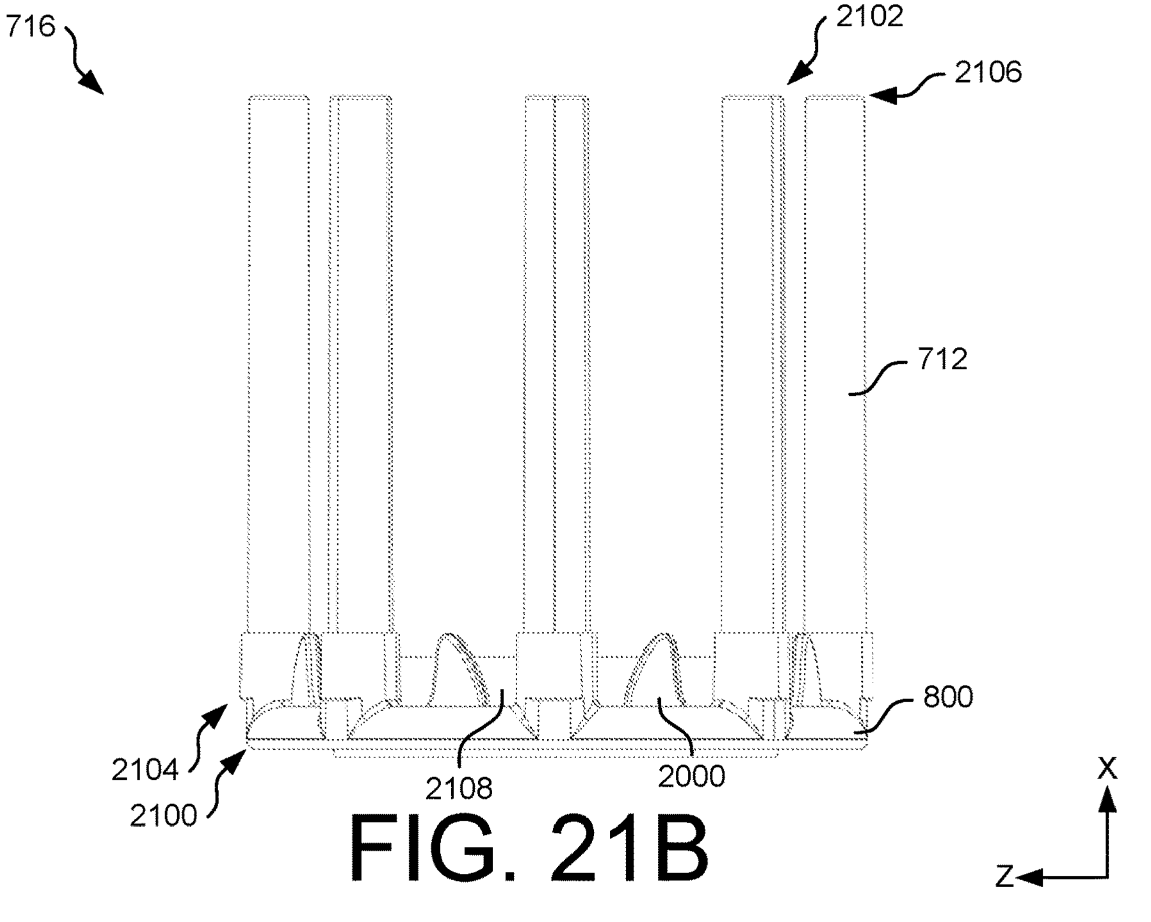
Figure 21C:
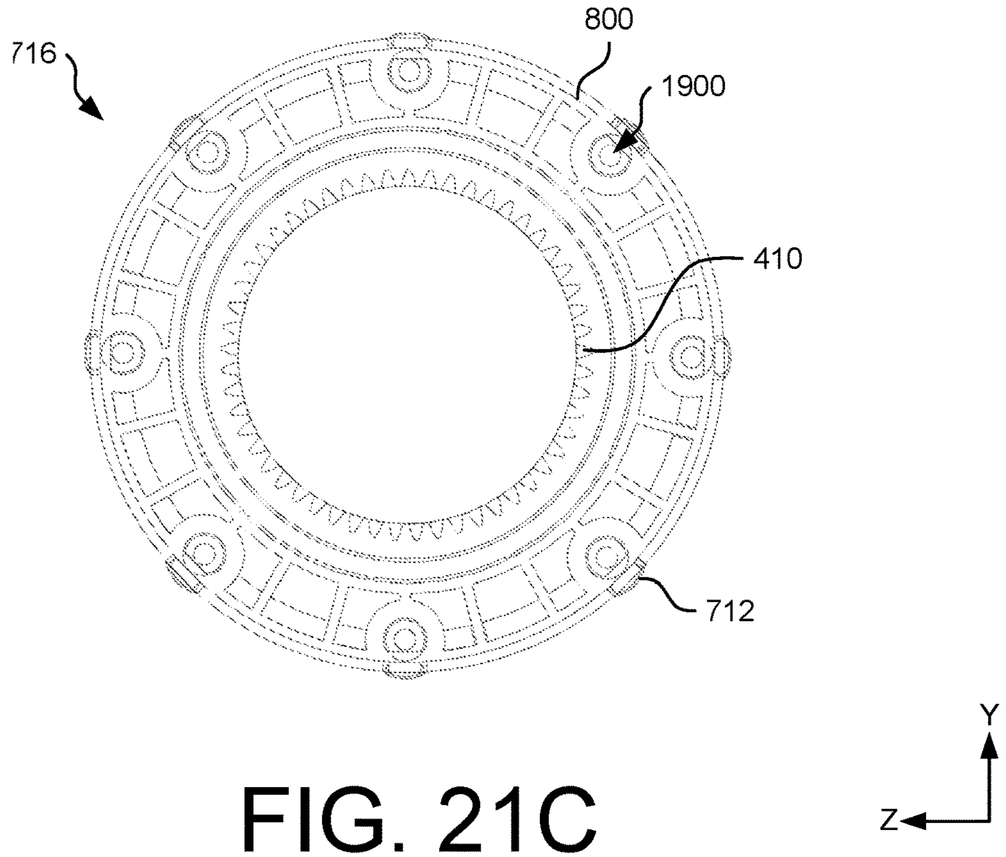
Figure 21D:
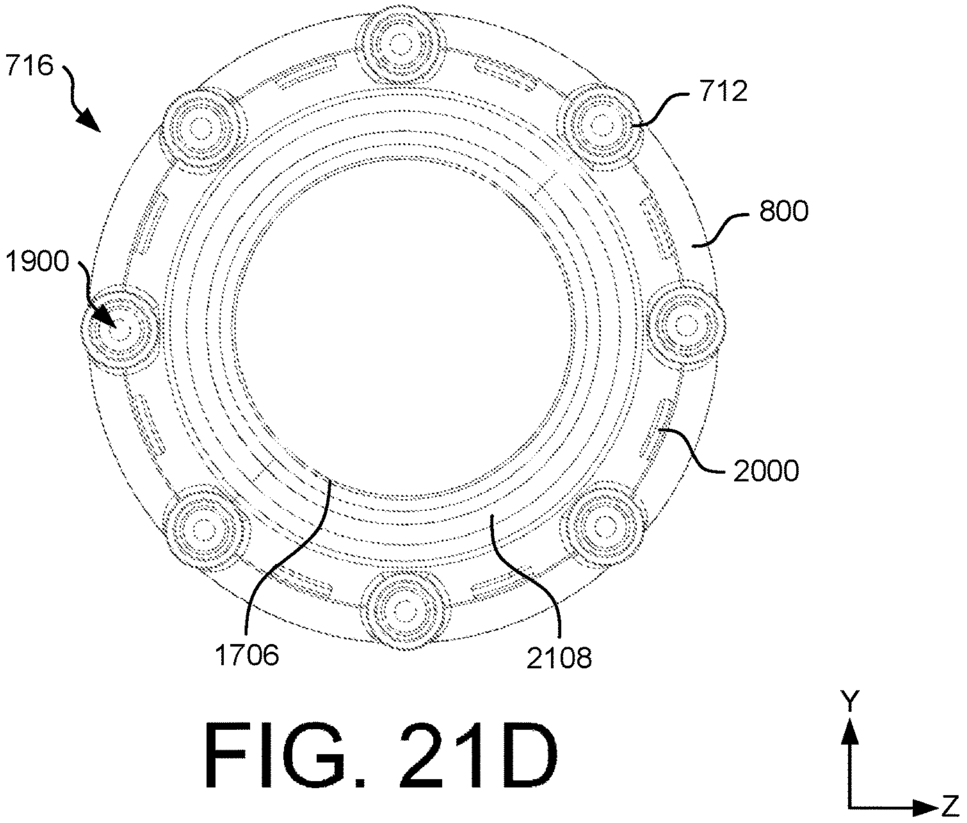
Figure 22A:
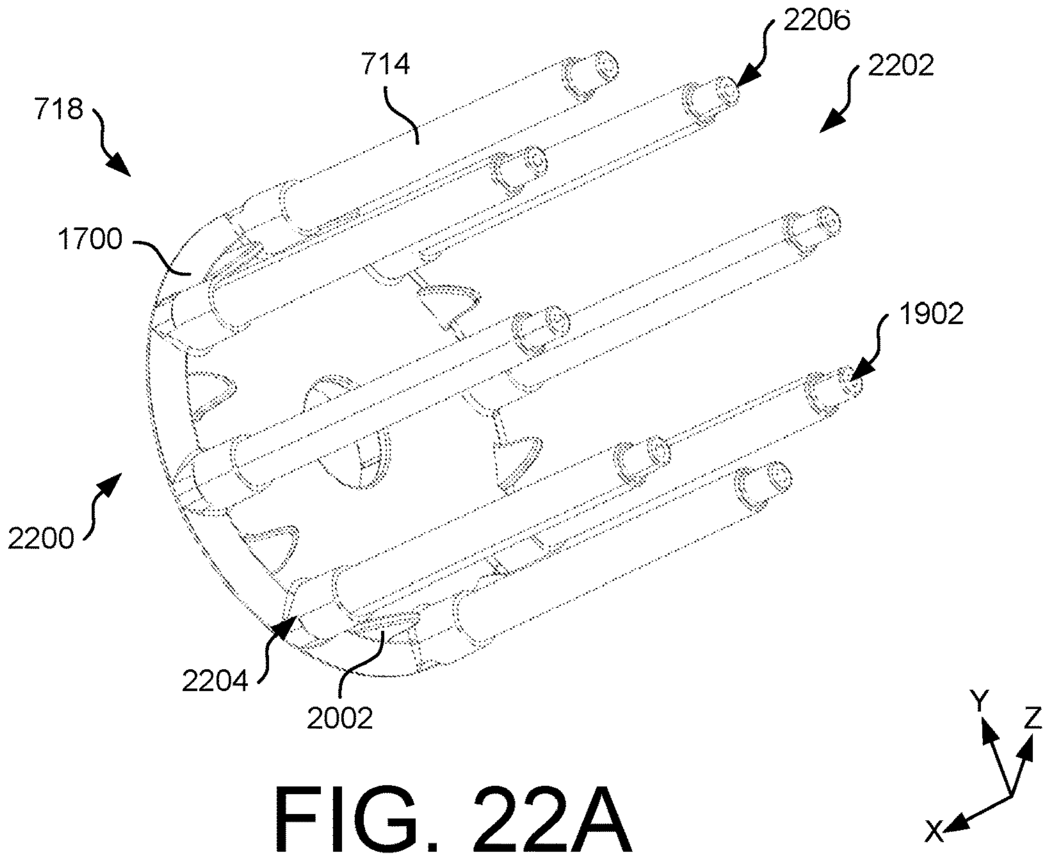
FIGS. 22A-22D illustrate the second frame of the rotatable assembly of FIG. 20, according to examples of the present disclosure.
Figure 22B:
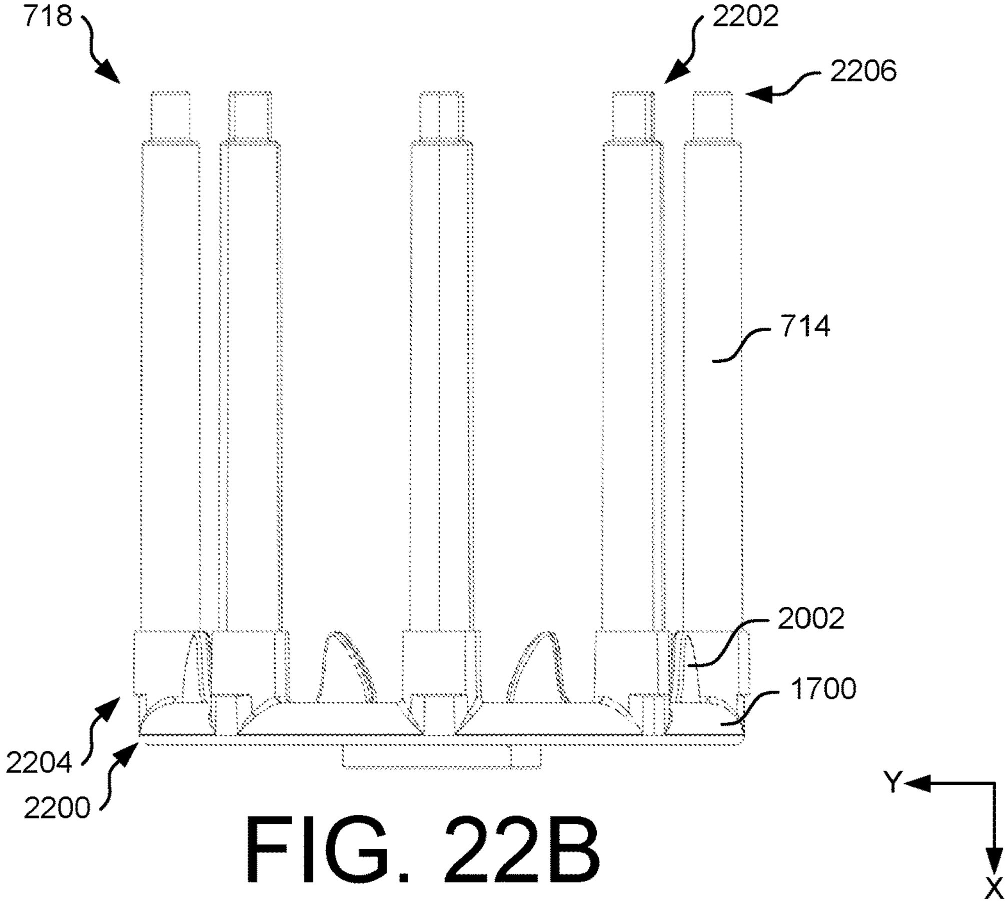
Figure 22C:
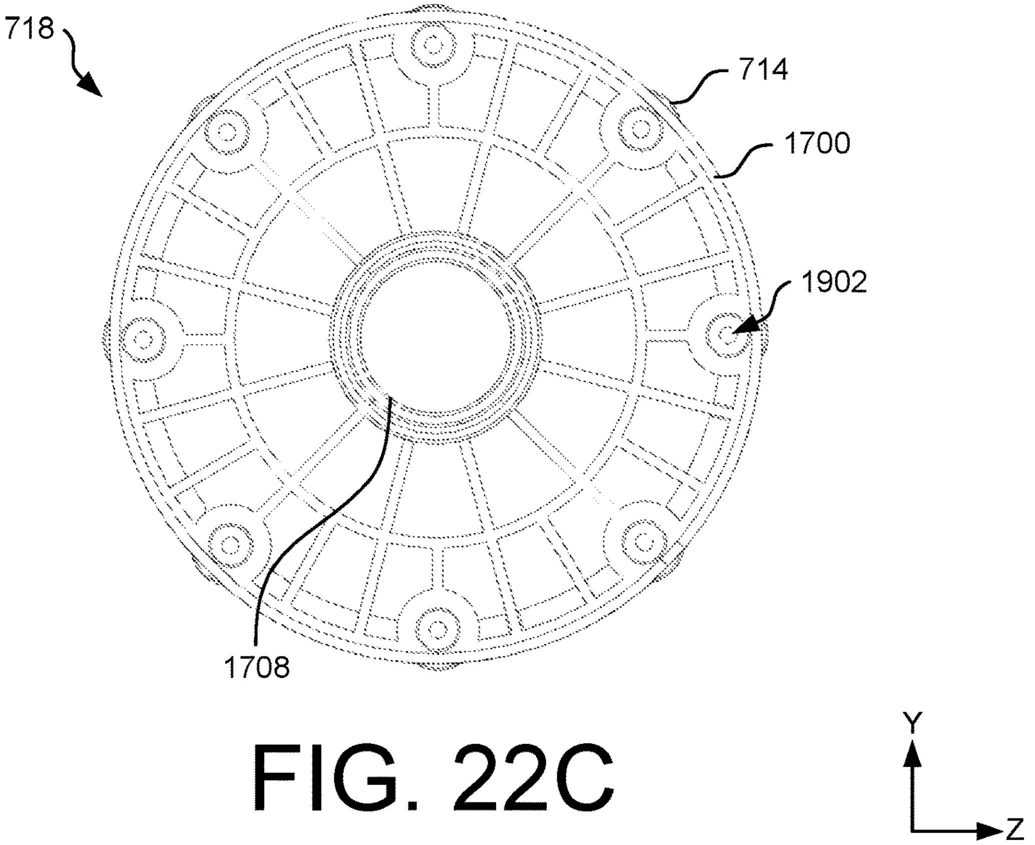
Figure 22D:
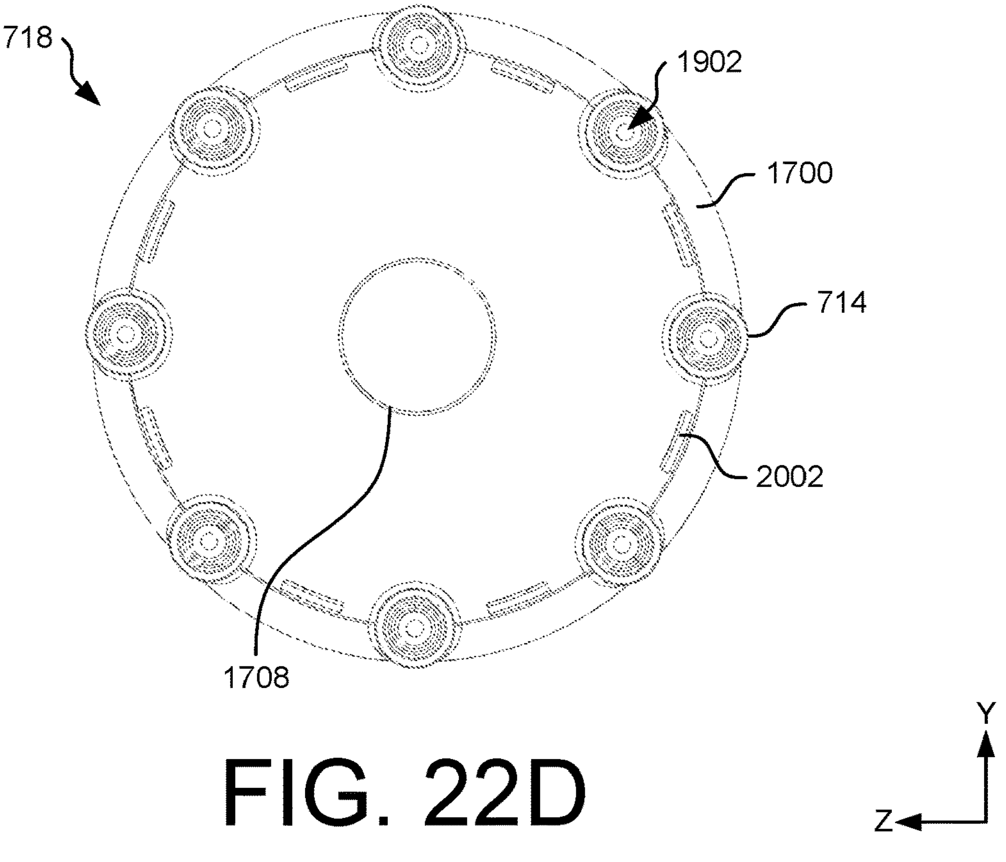

FIG. 20 illustrates a side view of the rotatable assembly 108, showing the rotatable elements 110 removed, according to examples of the present disclosure. The first frame 716 and the second frame 718 are shown being coupled together to form the shafts 710. As illustrated, the first posts 712 may extend from the first base 800, while the second posts 714 may extend from the second base 1700. When coupled together, the first posts 712 and the second posts 714 may align to form the shafts 710. In an embodiment, and as noted above, fasteners may be disposed in the first channel 1900 and/or the second channel 1902 for coupling the first frame 716 and the second frame 718 together. In an embodiment, before coupling the first frame 716 and the second frame 718 together, the rotatable elements 110 may be placed about the first posts 712 and/or the second posts 714.

The first bushings 1904 are shown being disposed about the first posts 712, proximate to the first base 800, while the second bushings 1906 are shown being disposed about the second posts 714, proximate to the second base 1700. The first bushings 1904 and the second bushings 1906 may have a cross-sectional dimension that is greater than the cross-sectional dimension of the shafts 710 (or the first posts 712 and the second posts 714).

The first base 800 may include one or more first fins 2000 and the second base 1700 may include one or more second fins 2002. As shown, the first fins 2000 may extend from the first base 800, in a direction towards the second base 1700, while the second fins 2002 may extend from the second base 1700 in a direction towards the first base 800. The first fins 2000 and/or the second fins 2002 may include a triangular shape, various curves and/or arcs, tapers, and so forth. As will be explained herein, the first fins 2000 and the second fins 2002 may fill voids between adjacent rotatable elements 110 proximate to the first base 800 and the second base 1700. This may, for example, prevent portions of the user (e.g., finger) or clothing becoming tangled, pinched, or drawn in during operation of the device 100. As shown, the first fins 2000 may be disposed in between adjacent first posts 712, and the second fins 2002 may be disposed in between adjacent second posts 714.

FIGS. 21A-21D illustrate various views of the first frame 716, according to examples of the present disclosure. The first frame 716 includes the first base 800 disposed at a first end 2100 of the first frame 716. The first frame 716 may include a second end 2102 spaced apart from the first end 2100 (e.g., in the X-direction). The first posts 712 may extend from the first base 800 to the second end 2102. In an embodiment, the first posts 712 include a proximal end 2104 extending from, or disposed at, the first base 800, and a distal end 2106 disposed at the second end 2102. A length of the first posts 712 may extend between the proximal end 2104 and the distal end 2106 (e.g., in the X-direction).

In an embodiment, the first posts 712 may include different cross-sectional dimensions. For example, at the proximal end 2104, the first posts 712 may include a first cross-sectional dimension that is larger than a second cross-sectional dimension at the distal end 2106. The first cross-sectional dimension may receive the first bushings 1904 such that the first bushings 1904 may extend or be disposed over the first cross-sectional dimension of the first posts 712.

As shown, the first frame 716 may include eight of the first posts 712. However, in an embodiment, the first frame 716 may include more than or less than eight of the first posts 712. In an embodiment, the first posts 712 may be equidistantly spaced about the first base 800. As will be explained herein, the second base 1700 may include a corresponding number of the second posts 714 to adjoin, couple, and align with the first posts 712. The first posts 712 may also include the first channel 1900, which may be open at the proximal end 2104 and/or the distal end 2106. For example, fasteners may be inserted into the proximal end 2104 via the first channels 1900 (or at the first end 2100 of the first frame 716) for coupling to the second posts 714. The first channel 1900 may also be open at the distal end 2106 of the first posts 712 for receiving fasteners (e.g., from fasteners disposed in the second channel 1902), or such that the fasteners may be disposed from the first posts 712 to the second posts 714.

The first frame 716 may also include a flange 2108 that extends from the first base 800, in a direction towards the second end 2102. In an embodiment, the fourth gear 810 may be disposed within the flange 2108. The first fins 2000 are shown extending from the first base 800, in a direction towards the second end 2102. The first fins 2000 may be disposed radially between the fourth gear 810 (or the flange 2108) and a perimeter of the first base 800. The first fins 2000 may extend from the first base 800 by various lengths, and the first fins 2000 may include a width (e.g., in a direction between adjacent first posts 712). As shown, the first frame 716 may include eight of the first fins 2000 for being disposed between the adjacent first posts 712.

FIGS. 22A-22D illustrate various views of the second frame 718, according to examples of the present disclosure. The second frame 718 includes the second base 1700 disposed at a first end 2200 of the second frame 718. The second frame 718 may include a second end 2202 spaced apart from the first end 2200 (e.g., in the X-direction). The second posts 714 may extend from the second base 1700 to the second end 2202. In an embodiment, the second posts 714 include a proximal end 2204 extending from, or disposed at, the second base 1700, and a distal end 2206 disposed at the second end 2202. A length of the second posts 714 may extend between the proximal end 2204 and the distal end 2206 (e.g., in the X-direction).

In an embodiment, the second posts 714 may include different cross-sectional dimensions. For example, at the proximal end 2204, the second posts 714 may include a first cross-sectional dimension that is larger than a second cross-sectional dimension at the distal end 2206. The first cross-sectional dimension may receive the second bushings 1906 such that the second bushings 1906 may extend or be disposed over the first cross-sectional dimension of the second posts 714. The second cross-sectional dimension at the distal end 2206 may be smaller than the second cross-sectional dimension of the first posts 712 at the distal end 2106 such that the distal end 2206 of the second posts 714 may be inserted into the distal end 2106 of the first posts 712. This engagement (i.e., the distal end 2206 residing at least partially within the distal end 2106) may help to secure and align the first posts 712 and the second posts 714.

The second posts 714 may also include a third cross-sectional dimension between the proximal end 2104 and the distal end 2106. The third cross-sectional dimension may be less than the first cross-sectional dimension of the second posts 714 at the proximal end 2204, but may be greater than the second cross-sectional dimension of the second posts 714 at the distal end 2206. In other words, the distal end 2206 of the second posts 714 may be at least partially disposed within the distal end 2106 of the first posts 712. For example, the distal end 2206 may include a projection that is disposed within a pocket at distal end 2106.

As shown, the second frame 718 may include eight of the second posts 714. However, in an embodiment, the second frame 718 may include more than or less than eight of the second posts 714. In an embodiment, the second posts 714 may be equidistantly spaced about the second base 1700. The second base 1700 may include a corresponding number of the second posts 714 to adjoin, couple, and align with the first posts 712. The second posts 714 may also include the second channel 1902, which may be open at the proximal end 2204 and/or the distal end 2206. For example, fasteners may be inserted into the proximal end 2204 of the second channels 1902 (or at the first end 2200 of the second frame 718) for coupling to the first posts 712. The second channel 1902 may also be open at the distal end 2206 of the second posts 714 for receiving fasteners (e.g., from fasteners disposed in the first channel 1900), or such that the fasteners may be disposed from the second posts 714 to the first posts 712.

The second fins 2002 are shown extending from the second base 1700, in a direction wards the distal end 2206 of the second posts 714. The second fins 2002 may be disposed radially between the second race 1708 and a perimeter of the second base 1700. The second fins 2002 may extend from the second base 1700 by various lengths, and the second fins 2002 may include a width (e.g., in a direction between adjacent second posts 714). As shown, the second frame 718 may include eight of the second fins 2002 for being disposed between the adjacent second posts 714.

Figure 23:
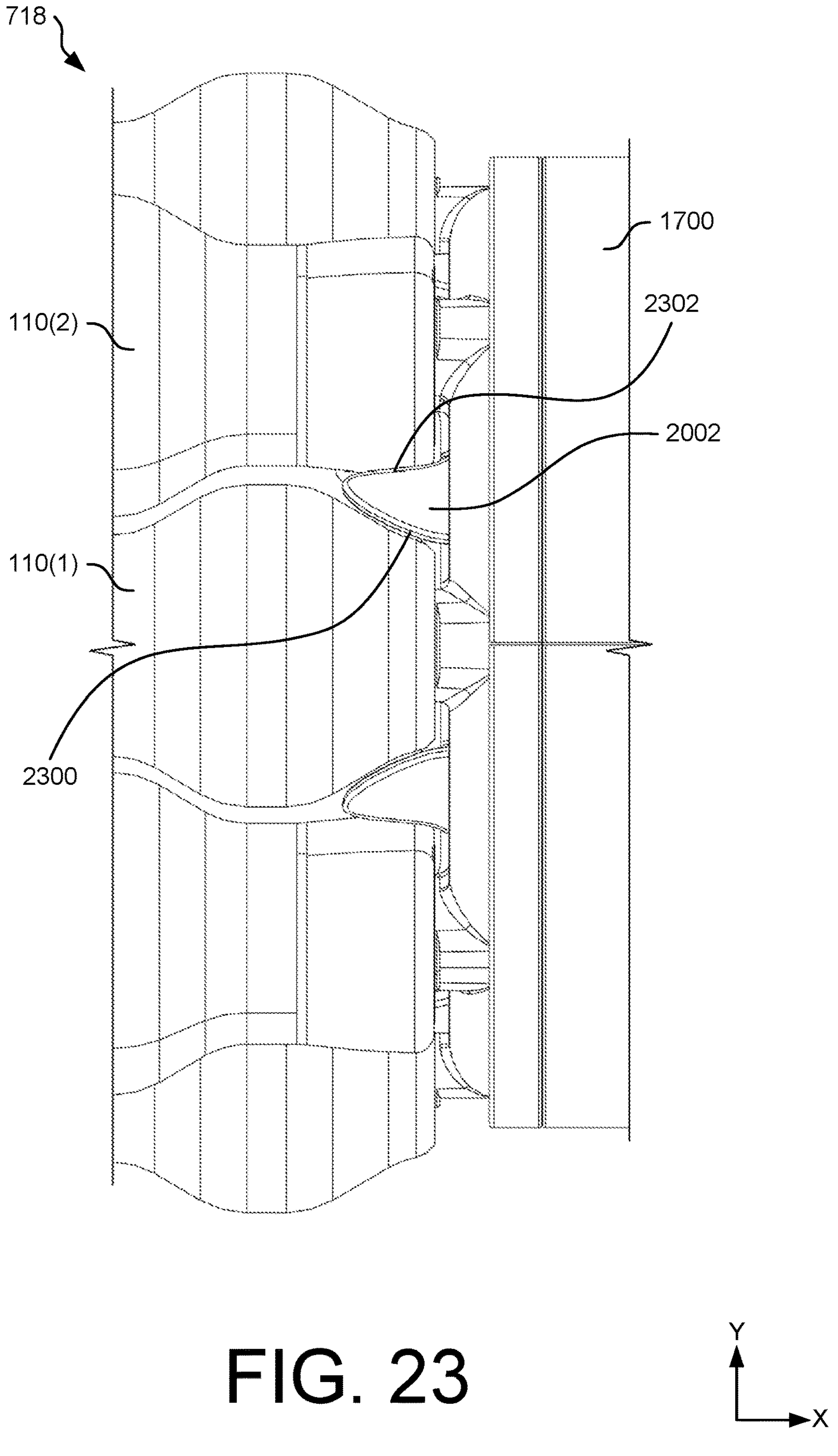
FIG. 23 illustrates a partial view of the rotatable assembly of FIGS. 17A and 17B, showing rotatable elements of the rotatable assembly, according to examples of the present disclosure.

FIG. 23 illustrates the second fins 2002 being disposed between adjacent rotatable elements 110, according to examples of the present disclosure. As shown, the second fins 2002 may extend from the second base 1700 for being disposed between the second end of the first rotatable element 110(1) and the second end of the second rotatable element 110(2). In an embodiment, the second fins 2002 may include a first side 2300 (e.g., surface, face, edge, etc.) that faces (e.g., oriented towards) the second end of the of the first rotatable element 110(1), for example, and a second side 2302 (e.g., surface, face, edge, etc.) that faces (e.g., oriented towards) the second end of the of the second rotatable element 110(2), for example. In an embodiment, the first side 2300 and the second side 2302 include different shapes, contours, etc. For example, the first side 2300 may extend substantially planar from the second base 1700, while the second side 2302 may include a curve. The different shapes of the first side 2300 and the second side 2302 may be complimentary to the shapes, contours, surfaces of the second end of the first rotatable element 110(1) and the second end of the second rotatable element 110(2), respectively. Given the arrangement of the first rotatable elements 110(1) and the second rotatable elements 110(1) on the first frame 716 and the second frame 718, adjacent first sides 2300 of the second fins 2002 may be oriented towards one another, and likewise, adjacent second sides 2302 of the second fins 2002 may be oriented towards one another.

Although the discussion is with regard to the second fins 2002 being disposed between the second end 2102 of the first rotatable element 110(1) and the second end 2202 of the second rotatable element 110(2), the first fins 2000 may similarly be disposed between the first end 2100 of the first rotatable element 110(1) and the first end 2200 of the second rotatable element 110(2).

Figures 24A, 24B, 24C:
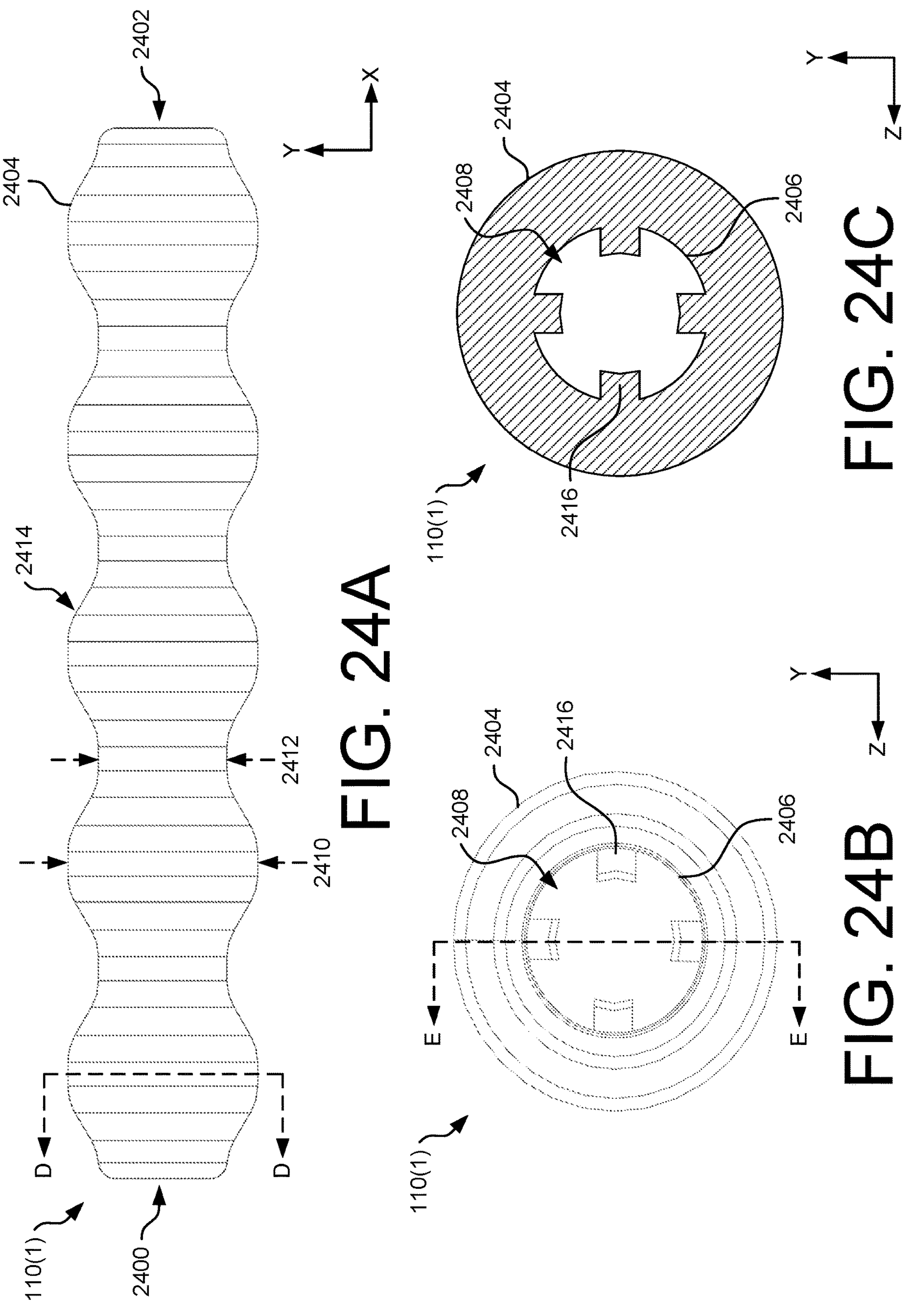
FIGS. 24A-24D illustrate a first example rotatable element of the rotatable assembly of FIGS. 17A and 17B, according to examples of the present disclosure.
Figure 24D:
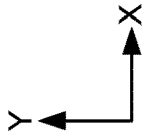
Figure 24D:
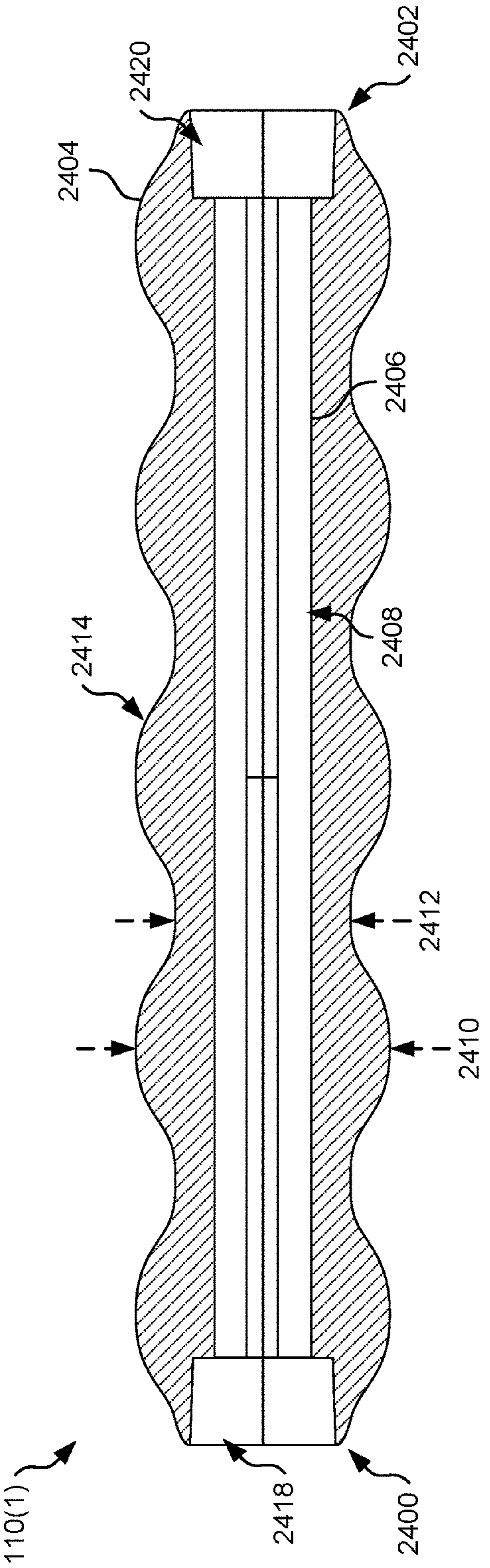

FIGS. 24A-24D illustrate various views of the first rotatable element 110(1), according to examples of the present disclosure. FIG. 24A illustrates a side view of the first rotatable element 110(1), FIG. 24B illustrates an end view of the first rotatable element 110(1), FIG. 24C illustrates a first cross-sectional view of the first rotatable element 110(1), taken along line D-D of FIG. 24A, and FIG. 24D illustrates a second cross-sectional view of the first rotatable element 110(1), taken along line E-E of FIG. 24B.

The first rotatable element 110(1) may include a first end 2400 and a second end 2402 spaced apart from the first end 2400 (e.g., in the X-direction). The first rotatable element 110(1) may include an exterior surface 2404 and an interior surface 2406 formed within, or by, a channel 2408 that extends through the first rotatable element 110(1), between the first end 2400 and the second end 2402. As shown, the exterior surface 2404 may undulate in a lengthwise direction of the first rotatable element 110(1), between the first end 2400 and the second end 2402. For example, the first rotatable element 110(1) may include a first thickness 2410 at certain locations along the length of the first rotatable element 110(1) and a second thickness 2412 at certain locations along the length of the first rotatable element 110(1). The first thickness 2410 may be disposed at peaks of the exterior surface 2404 (or the undulating surface), while the second thickness 2412 may be disposed at valleys of the exterior surface 2404 (or the undulating surface). The peaks may be disposed between adjacent valleys, and the valleys may be disposed between adjacent peaks.

In an embodiment, the peaks of the exterior surface 2404 correspond to first myofascial features 2414 of the device 100 that provide myofascial relief. For example, the first myofascial features 2414 may include bulbous shaped, triangular shaped, circular shaped, etc. knobs, projections, etc. for providing myofascial relief. The first myofascial features 2414 may be disposed at the first thickness 2410 of the first rotatable element 110(1). In an embodiment, the first rotatable element 110(1) may include five of the first myofascial features 2414, however, more than or less than five of the first myofascial features 2414 may be included.

In an embodiment, the first thickness 2410 is disposed at a first distance from the first end 2400, and the second thickness 2412 is disposed at a second distance from the first end 2400. The second distance may be greater than the first distance. In an embodiment, the first thickness 2410 is disposed at the first end 2400 and/or the second end 2402. Further, in an embodiment, adjacent portions of the first rotatable element 110(1) that include the second thickness 2412 are spaced apart from one another by a third distance.

The first rotatable element 110(1) may include one or more ribs 2416 that extend from the interior surface 2406, within the channel 2408. In an embodiment, the ribs 2416 engage with the shafts 710, such as the first posts 712 and the second posts 714. For example, when the first rotatable element 110(1) slides onto the first posts 712, the ribs 2416 may engage with the first posts 712. A fourth distance may separate ends of adjacent ribs of the ribs 2416, and the fourth distance may be less than a cross-sectional dimension of the channel 2408 without the ribs 2416. In doing so, portions of the interior surface 2406 that do not include the ribs 2416 may not engage with the shafts 710. Such gap (e.g., between the interior surface 2406 and the shafts 710) may permit portions of the first rotatable element 110(1) to flex, bend, or deform during use. Although the first rotatable element 110(1) is shown including four of the ribs 2416, the first rotatable element 110(1) may include more than or less than four of the ribs 2416. Further, although shown as being equidistantly disposed around the interior surface 2406, the ribs 2416 may be disposed on the interior surface 2406 differently than shown.

In an embodiment, the first rotatable element 110(1) may include a first pocket 2418 at the first end 2400, and a second pocket 2420 at the second end 2402. The first pocket 2418 and/or the second pocket 2420 may be disposed about the first bushings 1904 and/or the second bushings 1906 of the first frame 716 and the second frame 718, respectively. In an embodiment, a cross-sectional dimension of the channel 2408 may be greater at an area of the channel 2408 corresponding to the first pocket 2418 and the second pocket 2420, as compared to an area of the channel 2408 that includes the ribs 2416. As such, the ribs 2416 may not be disposed within the first pocket 2418 and the second pocket 2420.

Although the first rotatable element 110(1) is shown as being a single continuous piece of material, other variations are envisioned. For example, the first rotatable element 110(1) may include separate and distinct pieces of material that are disposed along the first posts 712 and the second posts 714, or over the shafts 710. In such embodiments, these different pieces may be slide onto the shafts 710, for example, and rotate independently.

Figure 25A:
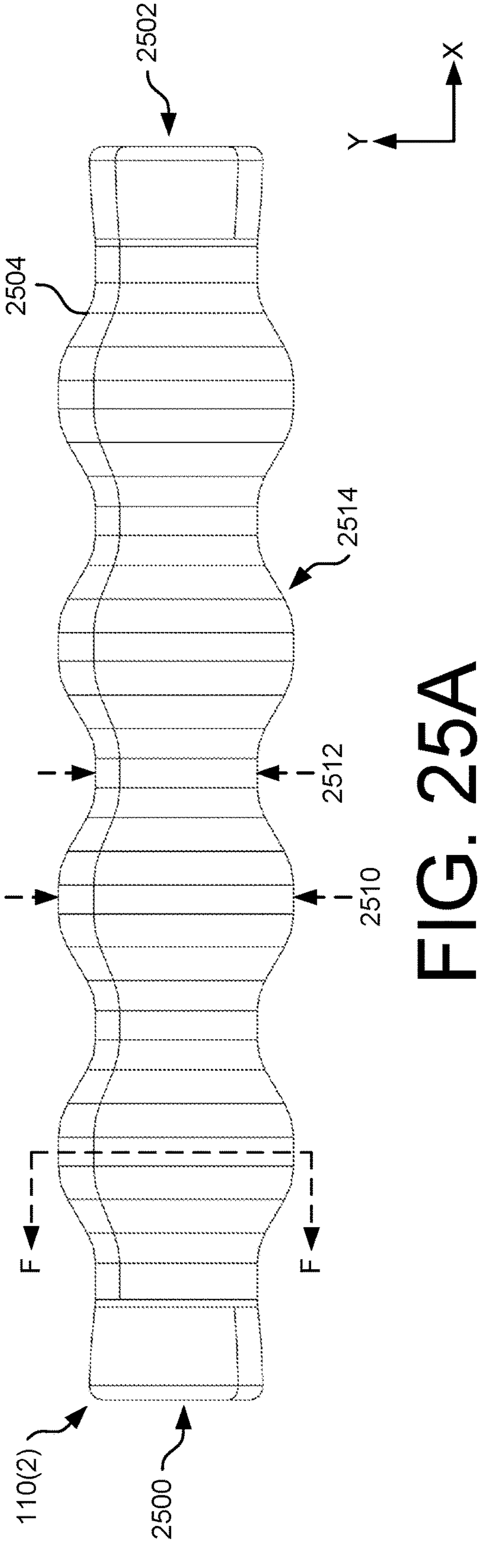
FIGS. 25A-25D illustrate a second example rotatable element of the rotatable assembly of FIGS. 17A and 17B, according to examples of the present disclosure.
Figure 25C:
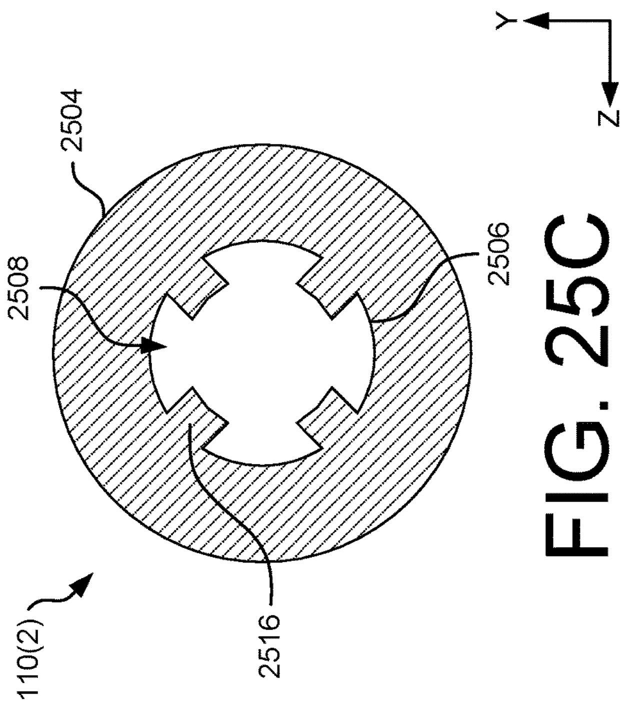
Figure 25B:
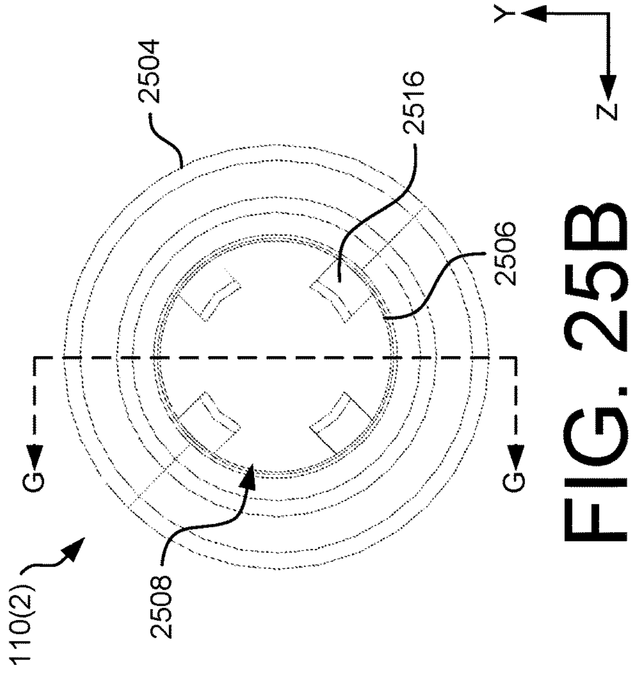
Figure 25D:
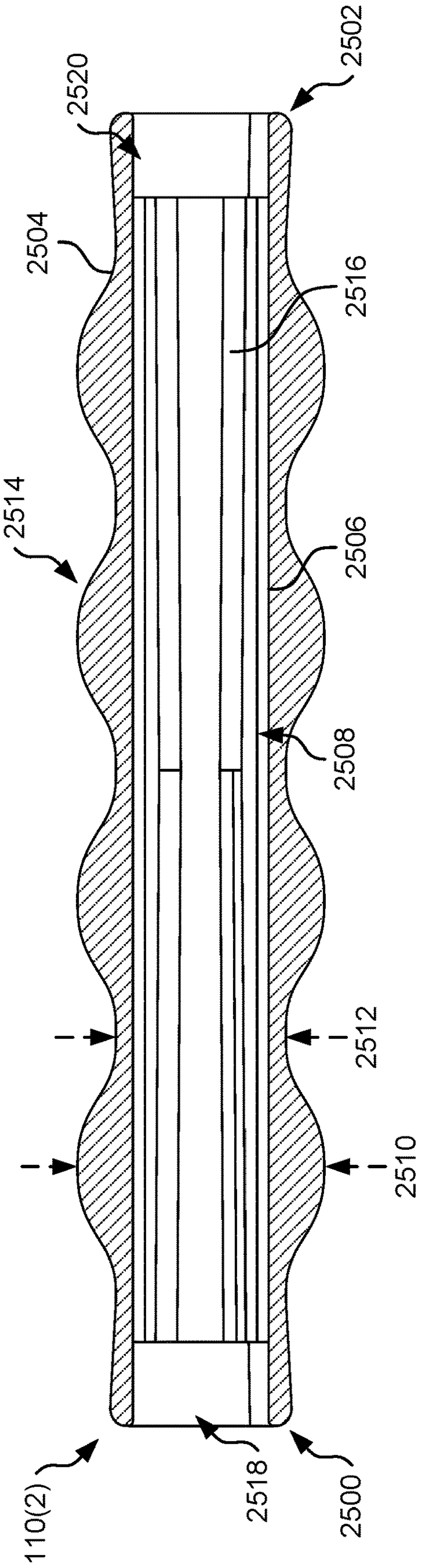
Figure 25D:
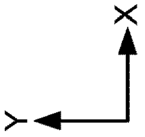

FIGS. 25A-25D illustrate various views of the second rotatable element 110(2), according to examples of the present disclosure. FIG. 25A illustrates a side view of the second rotatable element 110(2), FIG. 25B illustrates an end view of the second rotatable element 110(2), FIG. 25C illustrates a first cross-sectional view of the second rotatable element 110(2), taken along line F-F of FIG. 25A, and FIG. 25D illustrates a second cross-sectional view of the second rotatable element 110(2), taken along line G-G of FIG. 25B.

The second rotatable element 110(2) may include a first end 2500 and a second end 2502 spaced apart from the first end 2500 (e.g., in the X-direction). The second rotatable element 110(2) may include an exterior surface 2504 and an interior surface 2506 formed within, or by, a channel 2508 that extends through the second rotatable element 110(2), between the first end 2500 and the second end 2502. As shown, the exterior surface 2504 may undulate in a lengthwise direction of the second rotatable element 110(2), between the first end 2500 and the second end 2502. For example, the second rotatable element 110(2) may include a first thickness 2510 at certain locations along the length of the second rotatable element 110(2) and a second thickness 2512 at certain locations along the length of the second rotatable element 110(2). The first thickness 2510 may be disposed at peaks of the exterior surface 2504 (or the undulating surface), while the second thickness 2512 may be disposed at valleys of the exterior surface 2504 (or the undulating surface). The peaks may be disposed between adjacent valleys, and the valleys may be disposed between adjacent peaks.

In an embodiment, the peaks of the exterior surface 2504 correspond to second myofascial features 2514 of the device 100 that provide myofascial relief. For example, the second myofascial features 2514 may include bulbous shaped, triangular shaped, circular shaped, etc. knobs, projections, etc. for providing myofascial relief. The second myofascial features 2514 may be disposed at the first thickness 2510 of the second rotatable element 110(2). In an embodiment, the second rotatable element 110(2) may include four of the second myofascial features 2514, however, more than or less than four of the second myofascial features 2514 may be included. In an embodiment, the second myofascial features 2514 may be different or similar to the first myofascial features 2414.

In an embodiment, the first thickness 2510 is disposed at a first distance from the first end 2500, and the second thickness 2512 is disposed at a second distance from the first end 2500. The second distance may be greater than the first distance. In an embodiment, the first thickness 2510 is disposed at the first end 2500 and/or the second end 2502. Further, in an embodiment, adjacent portions of the second rotatable element 110(2) that include the second thickness 2512 are spaced apart from one another by a third distance.

The second rotatable element 110(2) may include one or more ribs 2516 that extend from the interior surface 2506, within the channel 2508. In an embodiment, the ribs 2516 engage with the shafts 710, such as the first posts 712 and the second posts 714. For example, when the second rotatable element 110(2) slides onto the first posts 712, the ribs 2516 may engage with the first posts 712. A fourth distance may separate ends of adjacent ribs of the ribs 2516, and the fourth distance may be less than a cross-sectional dimension of the channel 2508 without the ribs 2516. In doing so, portions of the interior surface 2506 that do not include the ribs 2516 may not engage with the shafts 710. Such gap (e.g., between the interior surface 2506 and the shafts 710) may permit portions of the second rotatable element 110(2) to flex, bend, or deform during use. Although the second rotatable element 110(2) is shown including four of the ribs 2516, the second rotatable element 110(2) may include more than or less than four of the ribs 2516. Further, although shown as being equidistantly disposed around the interior surface 2506, the ribs 2516 may be disposed on the interior surface 2506 differently than shown.

In an embodiment, the second rotatable element 110(2) may include a first pocket 2518 at the first end 2500, and a second pocket 2520 at the second end 2502. The first pocket 2518 and/or the second pocket 2520 may be disposed about the first bushings 1904 and/or the second bushings 1906 of the first frame 716 and the second frame 718, respectively. In an embodiment, a cross-sectional dimension of the channel 2508 may the same at an area of the channel 2508 corresponding to the first pocket 2518 and the second pocket 2520, as compared to an area of the channel 2508 that includes the ribs 2516. In an embodiment, the ribs 2516 may not be disposed within the first pocket 2518 and the second pocket 2520.

Although the second rotatable element 110(2) is shown as being a single continuous piece of material, other variations are envisioned. For example, the second rotatable element 110(2) may include separate and distinct pieces of material that are disposed along the first posts 712 and the second posts 714, or over the shafts 710. In such embodiments, these different pieces may be slide onto the shafts 710, for example, and rotate independently.

Figure 26A:
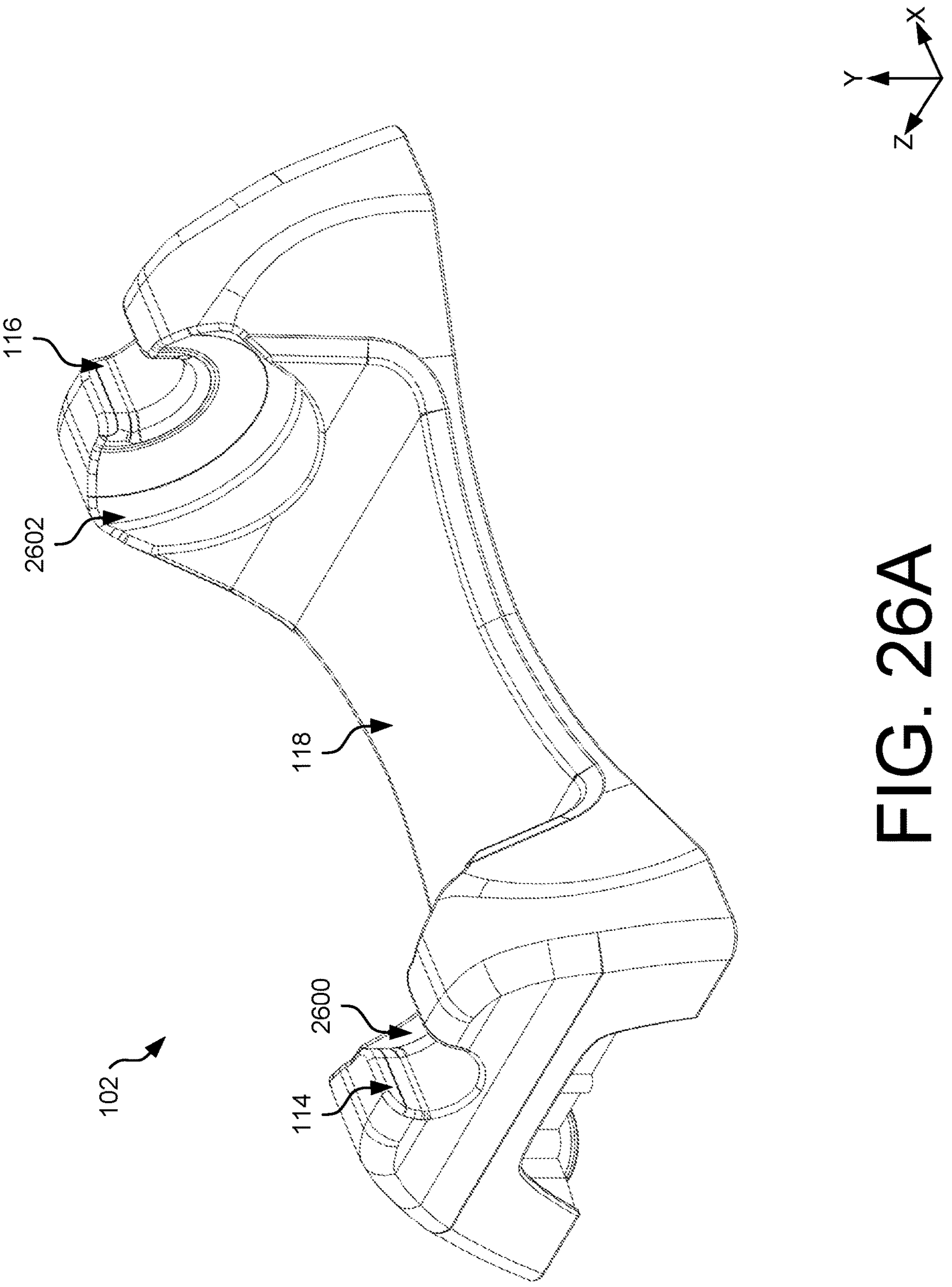
FIGS. 26A-26C illustrate the example stand of FIG. 1, according to examples of the present disclosure.
Figure 26B:
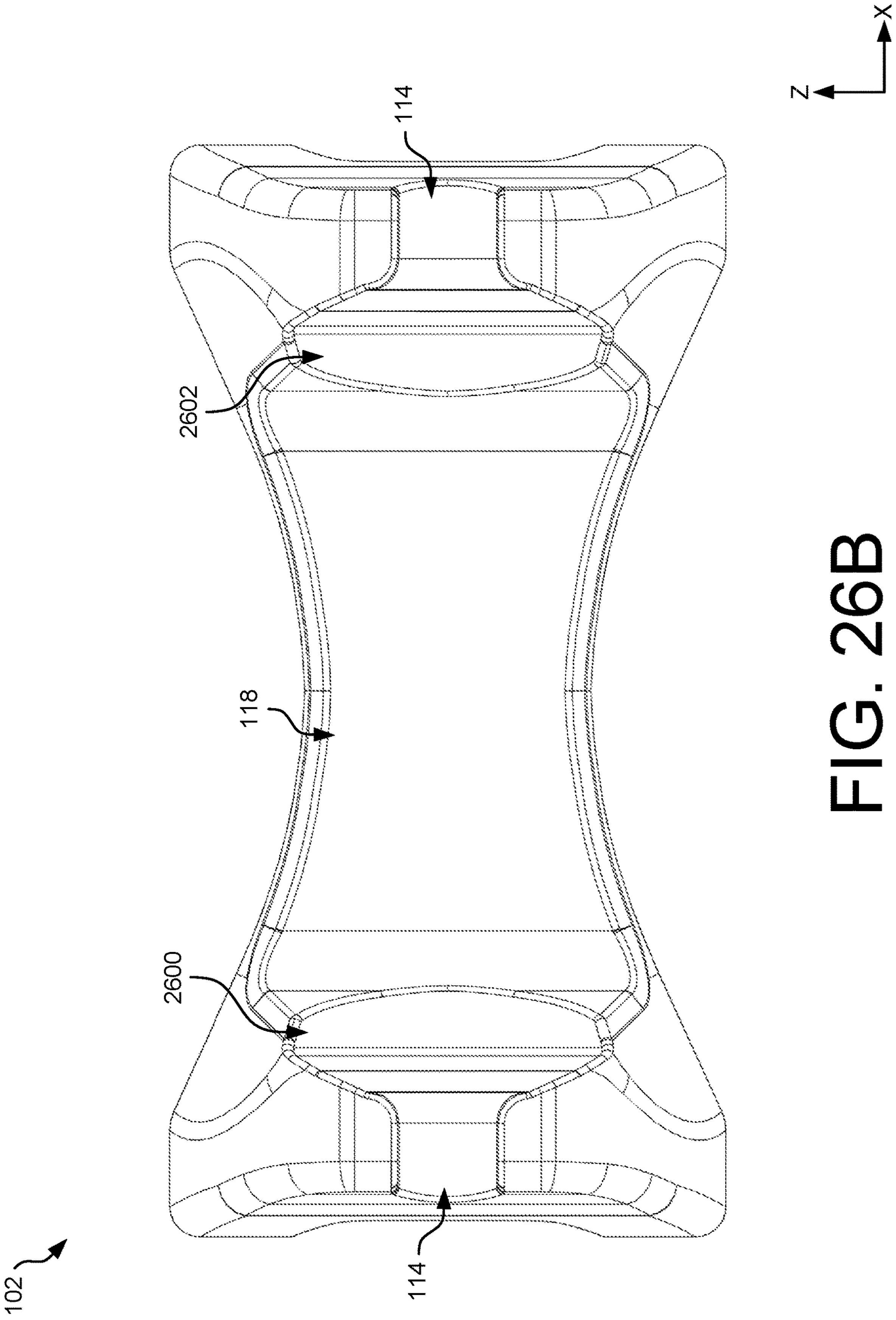
Figure 26C:
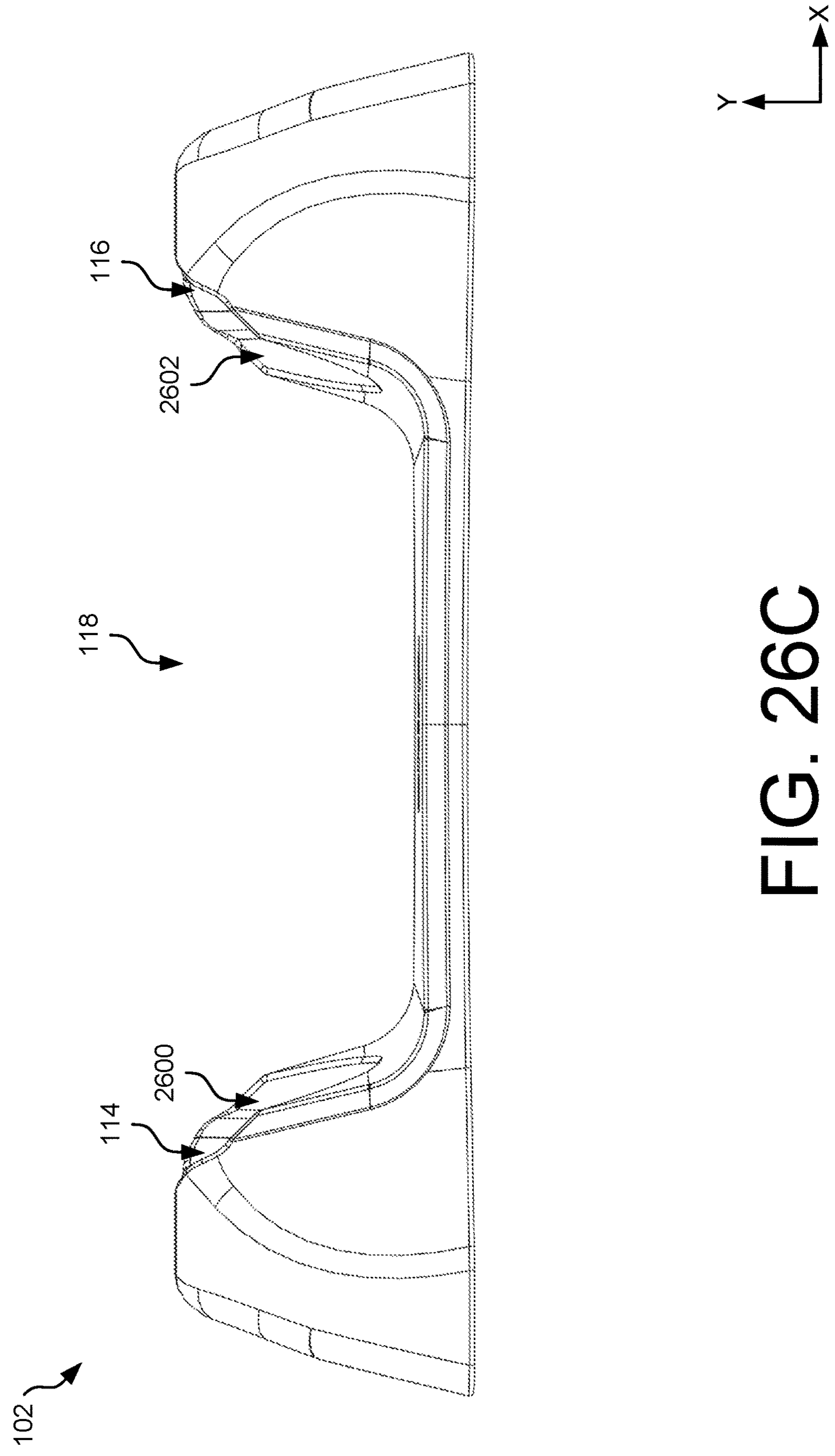

FIGS. 26A-26C illustrate the stand 102, according to examples of the present disclosure. As introduced above in FIG. 1, the stand 102 may be configured to receive the device 100. For example, the user may place the device 100 into the stand 102 for storage or for use (e.g., rolling certain portions of their body over the rotatable elements 110). The stand 102 includes the first receptacle 114 for receiving a portion of the first handle 104, and the second receptacle 116 for receiving a portion of the second handle 106. The trough 118 is located between the first receptacle 114 and the second receptacle 116 for receiving the rotatable assembly 108. When the first handle 104 is placed into the first receptacle 114, the second button 400 may be depressed (e.g., via an engagement with a bottom surface of the first receptacle 114) such that the user may operate the device 100.

The stand 102 also includes a third receptacle 2600 and a fourth receptacle 2602 for receiving at least a portion of the first collar 906 and the second collar 908, respectively. The third receptacle 2600 may be disposed between the first receptacle 114 and the trough 118, while the fourth receptacle 2602 may be disposed between the second receptacle 116 and the trough 118. The engagement between the first receptacle 114 with the first handle 104, the second receptacle 116 with the second handle 106, the third receptacle 2600 with the first collar 906, and the fourth receptacle 2602 with the second collar 908 may seat, position, and/or secure the device 100 within the stand 102. Additionally, the engagement between the device 100 and the stand 102 may prevent portions of the device 100, except for the rotatable assembly 108, from rotating during use. As shown, the first receptacle 114, the second receptacle 116, the third receptacle 2600, and/or the fourth receptacle 2602 may be half-circular shaped.

Figure 27A:
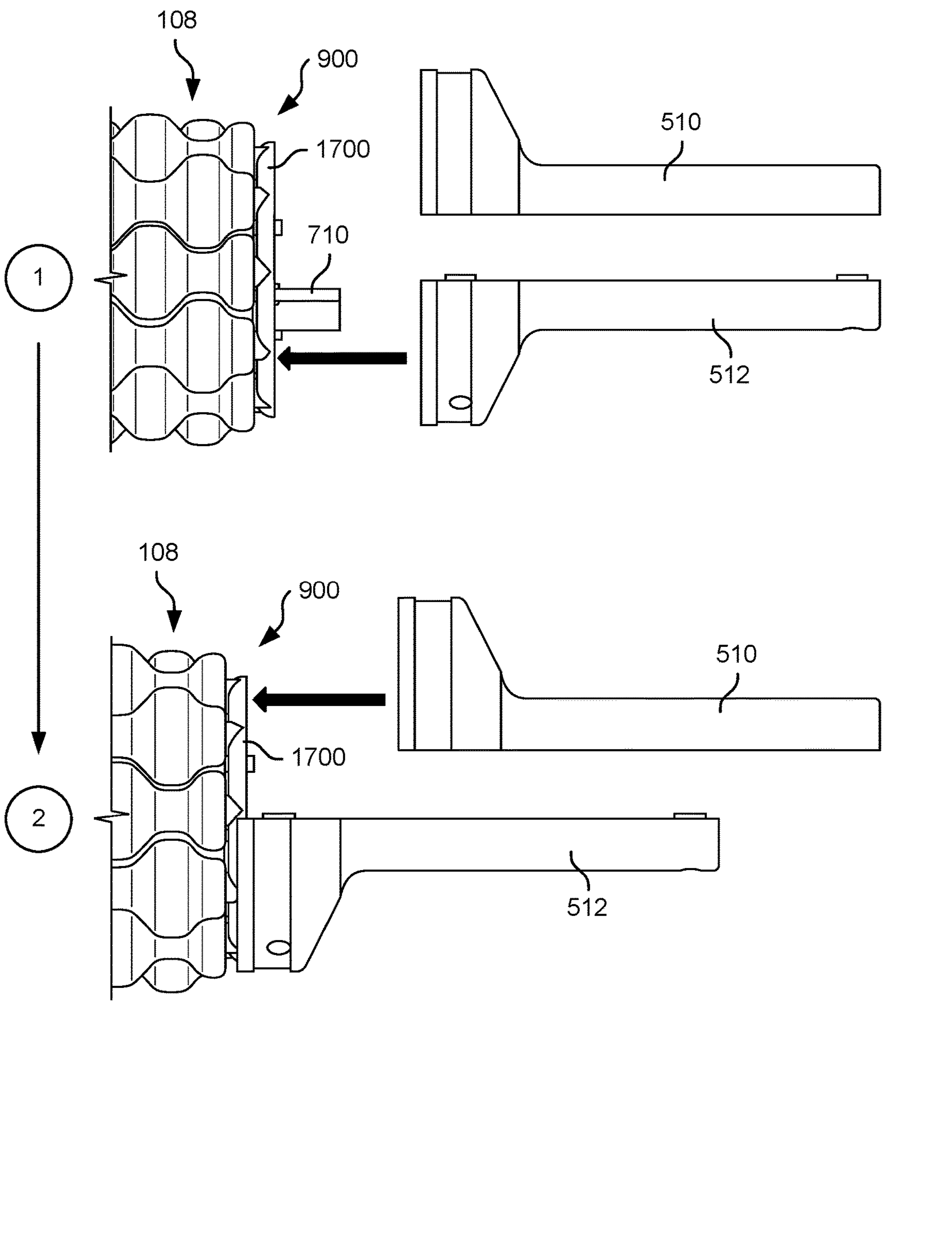
FIGS. 27A and 27B illustrate an example assembly of the device of FIG. 1, according to examples of the present disclosure.
Figure 27B:
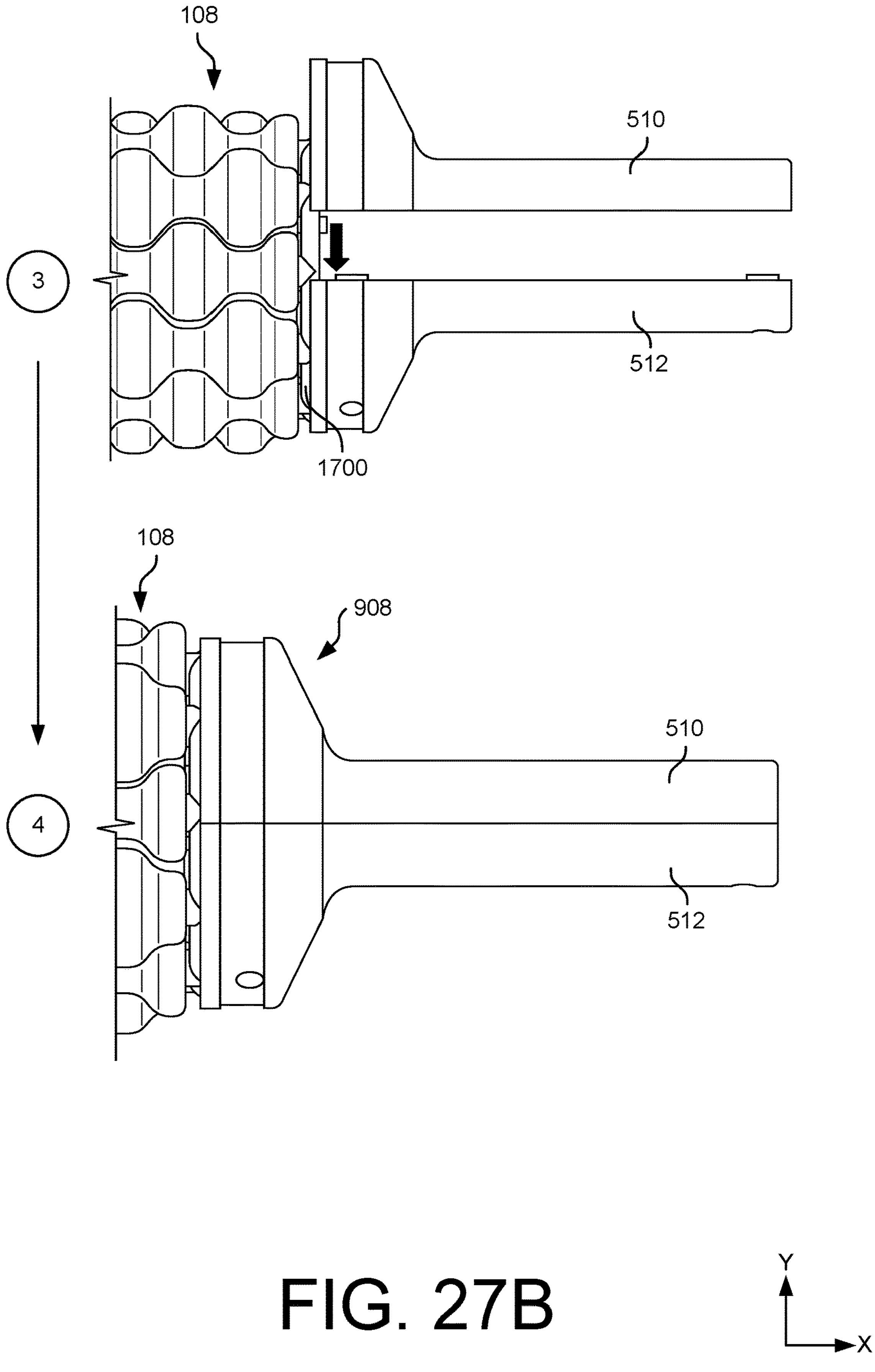

FIGS. 27A and 27B illustrate an example assembly of the device 100, according to examples of the present disclosure. More particularly, FIGS. 27A and 27B illustrate coupling the second assembly 902 to the first assembly 900. Initially, components (e.g., the battery 700, the motor 702, etc.) may be installed within first housing 506 and the second housing 508 of the first assembly 900. The rotatable assembly 108 may then be assembled by installing the rotatable elements 110 over the first posts 712, for example, and then placing the second posts 714 at least partially through the rotatable elements 110. Therein, the first frame 716 and the second frame 718 may be secured together via fasteners disposed within the first channel 1900 and the second channel 1902, thereby coupling the first posts 712 and the second posts 714 together. After sliding the rotatable assembly 108 over the case 904, at "1" in FIG. 27A, the fourth housing 512 may be coupled to the rod 706. For example, the rod 706 may be disposed through the channel 1206 in the fourth housing 512, and then coupled to the fourth housing 512 via fasteners disposed through the first passages 1504 in the rod 706. Once coupled, the second base 1700 may be at least partially disposed within the second flange 1404.

At "2" in FIG. 27A, the third housing 510 may be moved towards the second base 1700 in order to be disposed vertically above the fourth housing 512 (e.g., in the X-direction). Therein, at "3" in FIG. 27B, the third housing 510 may be moved towards the fourth housing 512 (e.g., in the Y-direction). The portion of the third housing 510 corresponding to the second flange 1404 may be at least partially disposed over the second base 1700. At "4" in FIG. 27B, the third housing 510 and the fourth housing 512 may be coupled together using fasteners. For example, the fasteners may be disposed into/through the third housing 510 and the fourth housing 512 at a location within the second collar 908. Therein, the second covers 602 may be placed around the second collar 908, for example, to conceal the fasteners.

Figure 28:
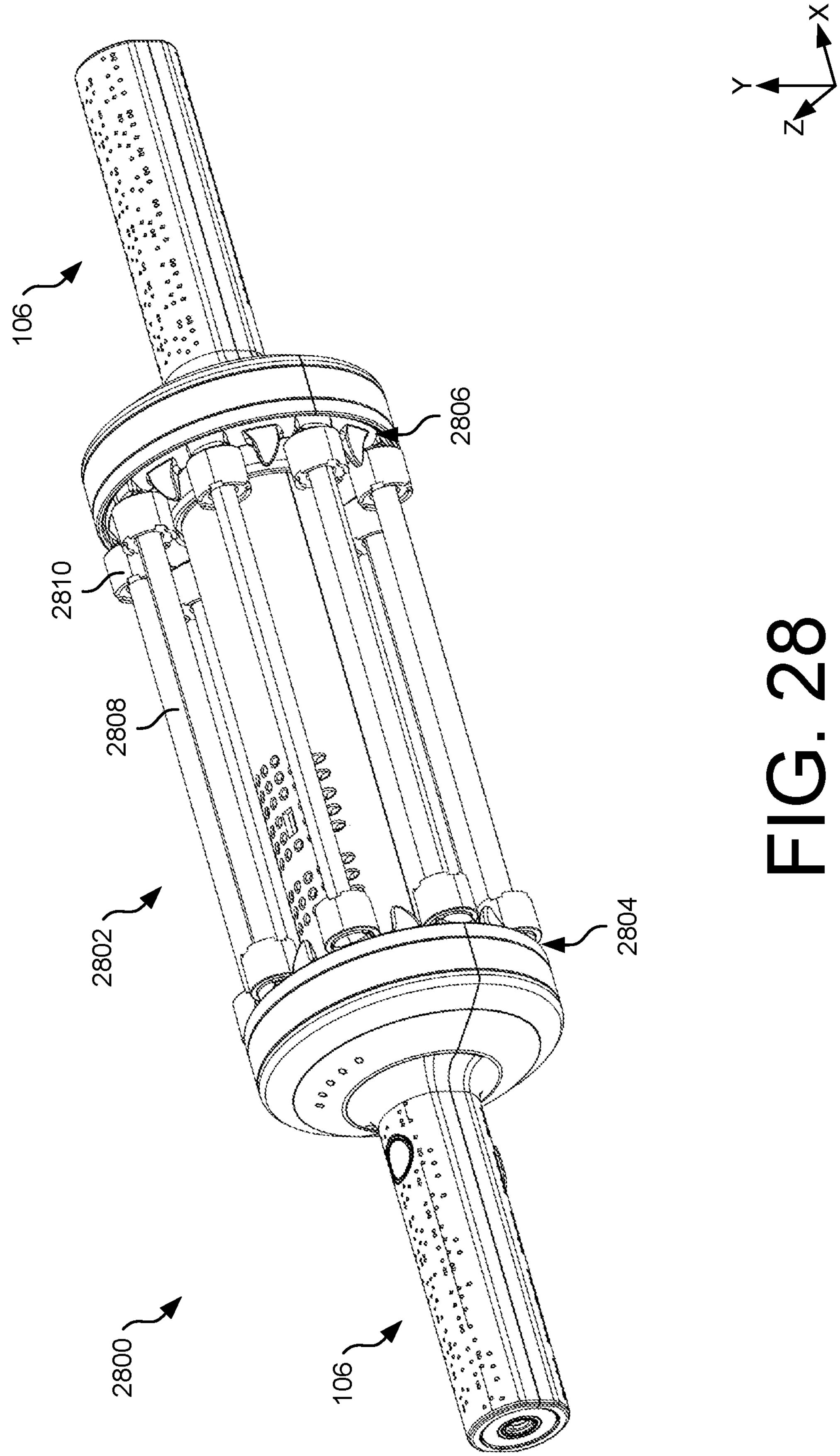
FIG. 28 illustrates an alternative example of a device, according to examples of the present disclosure.

FIG. 28 illustrates an alternative device 2800, according to examples of the present disclosure. In an embodiment, the device 2800 may be similar to the device 100. For example, the device 2800 may include the first handle 104 and the second handle 106. However, the device 2800 may include a different rotatable assembly 2802 as compared to the rotatable assembly 108 of the device 100.

More particularly, as described above with regard to the device 100, the rotatable assembly 108 may include the first frame 716 and the second frame 718 that have the first posts 712 and the second posts 714, respectively, where the first posts 712 and the second posts 714 form the shafts 710 about which the rotatable element 110 are disposed. Comparatively, the rotatable assembly 2802 may include a first frame 2804 and a second frame 2806, and shafts 2808 that extend between the first frame 2804 and the second frame 2806. The shafts 2808, however, may not extend from a base (e.g., be integrated with) of the first frame 2804 or the second frame 2806. Instead, the shafts 2808 may be a separate component, and in an embodiment, include a first end that couples to the first frame 2804, and a second end that couples to the second frame 2806. For example, fasteners may be disposed at least partially through the first frame 2804 and the second frame 2806, and into the shafts 2808. The rotatable elements 110 are configured to be disposed about the shafts 2808. The rotatable elements 110 may be disposed about the shafts 2808 prior to the shafts 2808 being coupled to the first frame 2804 and/or the second frame 2806 Further, in some instances, bushings 2810 may be disposed at least partially over, or around, the first frame 2804 and/or the second frame 2806, and the rotatable elements 110 may be disposed about the bushings 2810.

Figure 29:
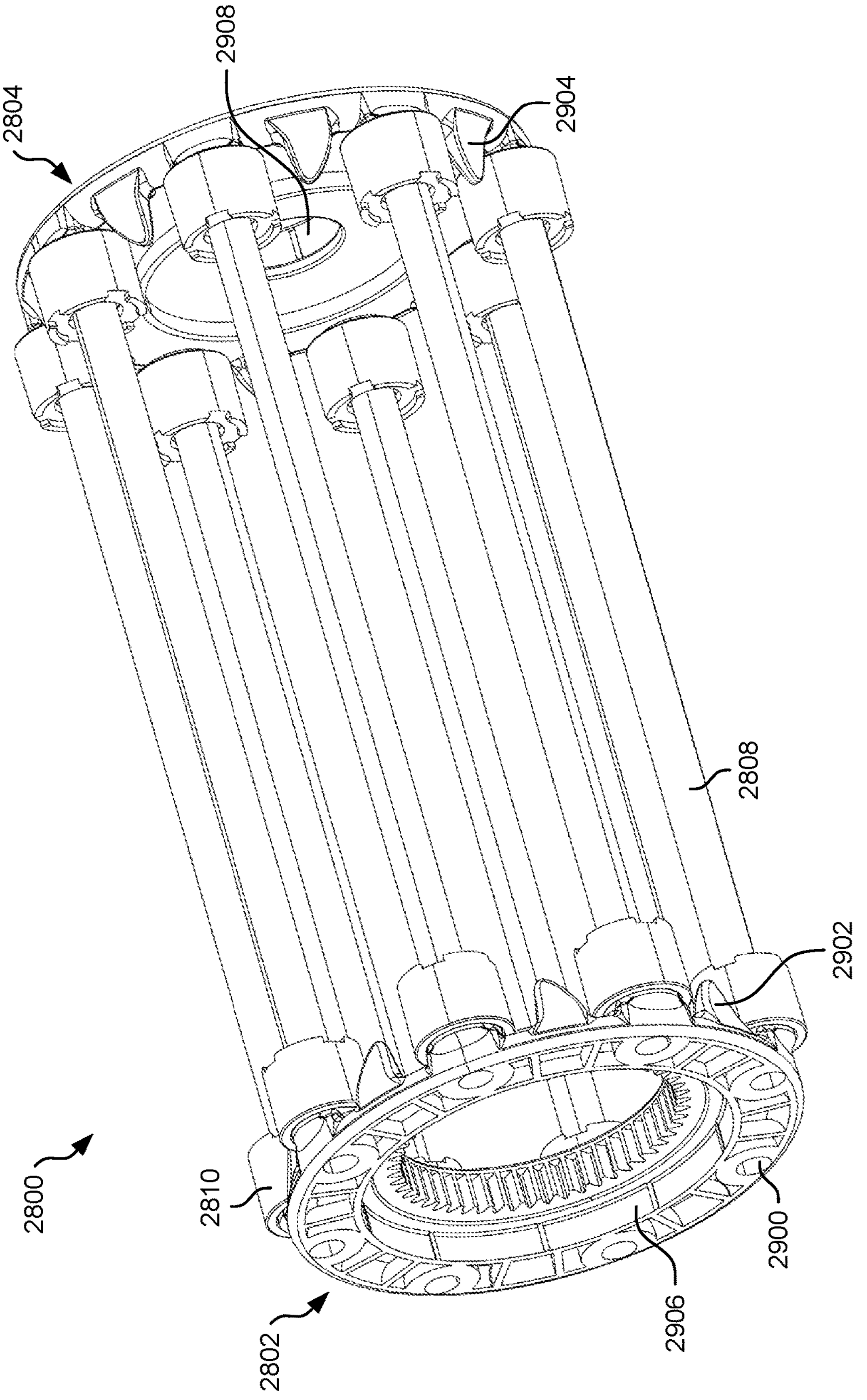
FIG. 29 illustrates an example rotatable assembly of the device of FIG. 28, according to examples of the present disclosure.
Figure 29:
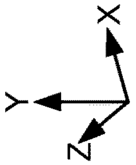

FIG. 29 illustrates the rotatable assembly 2802, according to examples of the present disclosure. The first frame 2804 may include, or define, passages 2900 into which fasteners are disposed for coupling to an end of the shafts 2808. The second frame 2806, along not shown in the view in FIG. 29, may similarly include passages into which fasteners are disposed for coupling to an opposite end of the shafts 2808. As discussed above, the rotatable elements 110 may be disposed about the shafts 2808 and/or the bushings 2810, prior to the fasteners coupling the first frame 2804 and the second frame 2806 to the shafts 2808. The first frame 2804 may also include first fins 2902, and the second frame 2806 may include second fins 2904.

The first frame 2804 may define a first race 2906 within which a bearing is disposed for rotationally coupling the rotatable assembly 2802 to or about the first handle 104, while the second frame 2806 may define a second race 2908 within which a bearing is disposed for rotationally coupling the rotatable assembly 2802 to or about the second handle 106.

Figure 30:
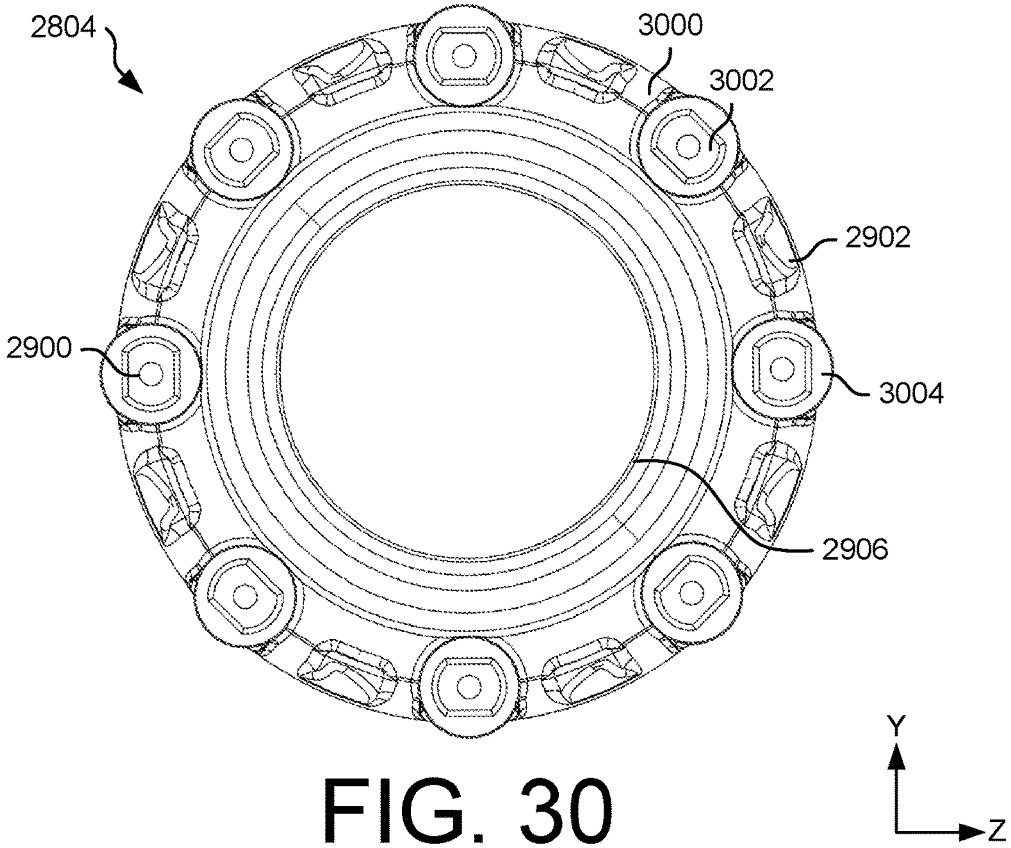
FIG. 30 illustrates an example frame of the rotatable assembly of FIG. 29, according to examples of the present disclosure.

FIG. 30 illustrates the first frame 2804, according to examples of the present disclosure. In an embodiment, the first frame 2804 may include a first base 3000 from which the first fins 2902 extend, or which defines the first fins 2902.

In addition, the first frame 2804 may include the first race 2906 that receives a bearing. The first frame 2804, or the first base 3000, includes first receptacles 3002 (e.g., pockets, grooves, holes, etc.) into which the shafts 2808 are at least partially disposed. For example, an end of the shafts 2808 may be placed into the first receptacles 3002. In an embodiment, the first receptacles 3002 are disposed within first columns 3004 that extend from the first base 3000. The bushings 2810 may be disposed about the first columns 3004. Furthermore, the passages 2900 may extend into the first receptacles 3002 for coupling to the shafts 2808.

Figure 31:
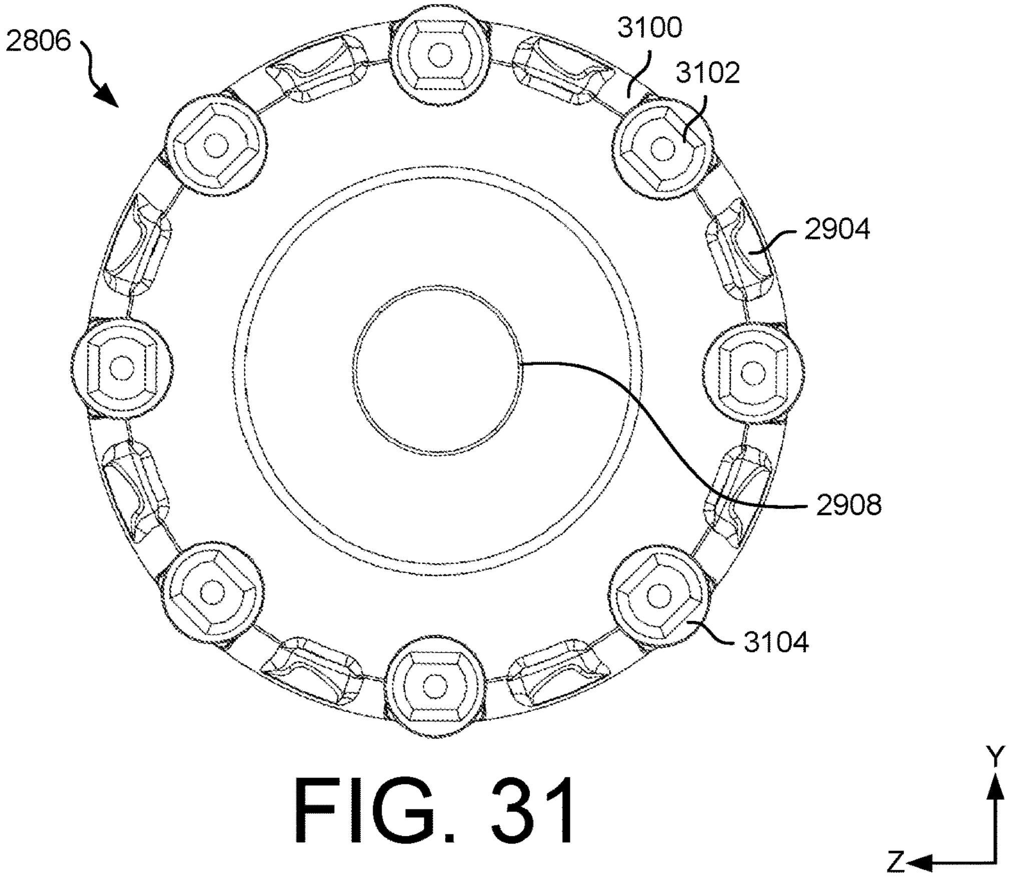
FIG. 31 illustrates an example frame of the rotatable assembly of FIG. 29, according to examples of the present disclosure.

FIG. 31 illustrates the second frame 2806, according to examples of the present disclosure. In an embodiment, the second frame 2806 may include a second base 3100 from which the second fins 2904 extend, or which defines the second fins 2904. In addition, the second frame 2806 may include the second race 2908 that receives a bearing. The second frame 2806, or the second base 3100, includes second receptacles 3102 (e.g., pockets, grooves, holes, etc.) into which the shafts 2808 are at least partially disposed. For example, an end of the shafts 2808 may be placed into the second receptacles 3102. In an embodiment, the second receptacles 3102 are disposed within second columns 3104 that extend from the second base 3100. The bushings 2810 may be disposed about the second columns 3104.

Figure 32:
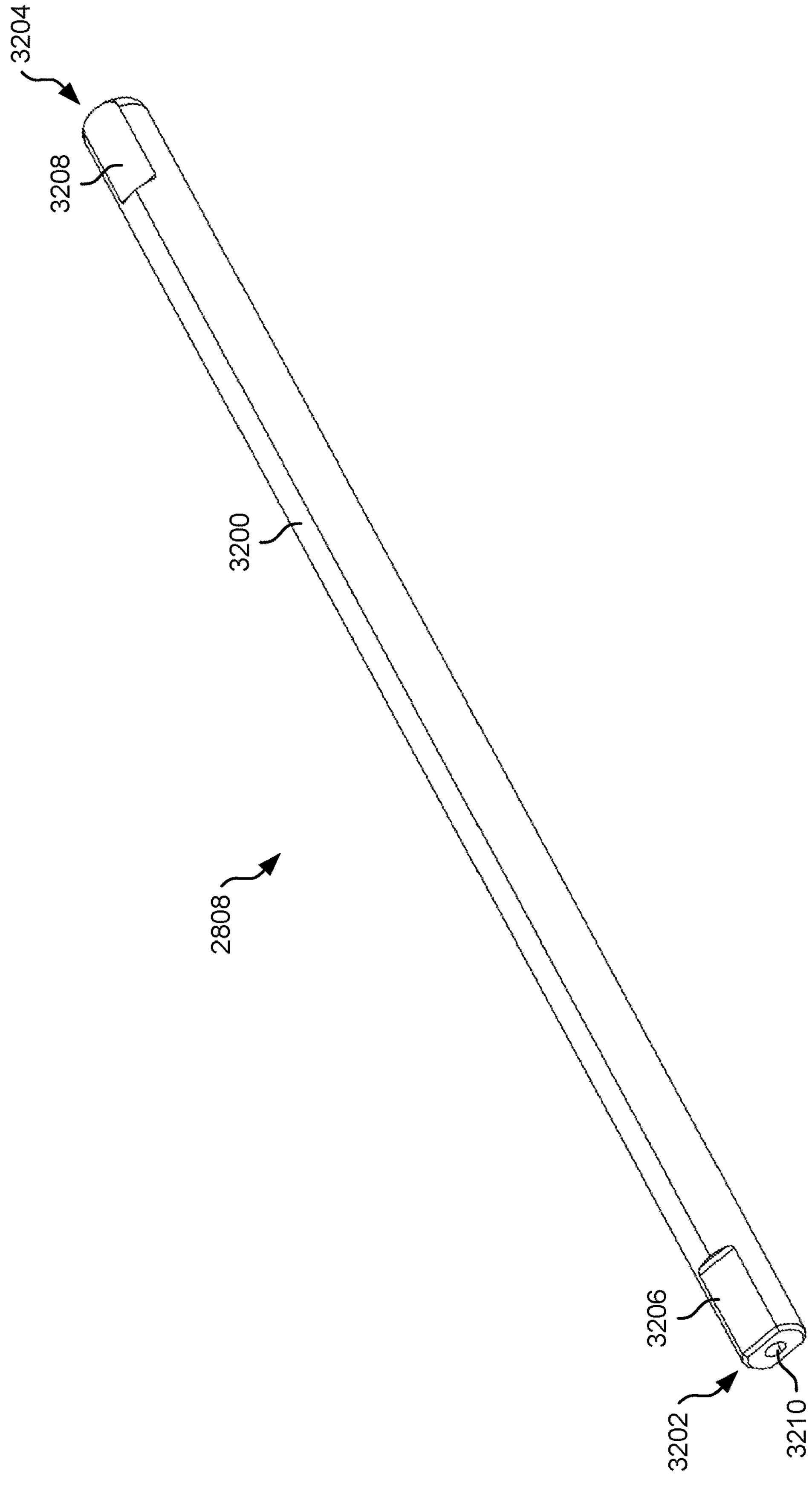
FIG. 32 illustrates an example shaft of the rotatable assembly of FIG. 29, according to examples of the present disclosure.
Figure 32:
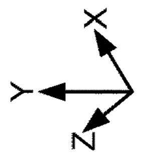

FIG. 32 illustrates the shaft 2808, according to examples of the present disclosure. The shafts 2808 may include a body 3200 that extends between a first end 3202 and a second end 3204 (e.g., spaced apart from the first end 3202 in the X-direction). A length of the shaft 2808 extends between the first end 3202 and the second end 3204. The first end 3202 includes a first notch 3206 (e.g., indent, keyway, etc.) that is disposed within the first receptacle 3002. The first end 3202 also includes a first opening 3210 that aligns with the passages 2900 in the first frame 2804 for receiving the fasteners and in order to couple the shaft 2808 to the first frame 2804. The second end 3204 includes a second notch 3208 (e.g., indent, keyway, etc.) that is disposed within the second receptacle 3102. The second end 3204 also includes a second opening that aligns with the passages for receiving the fasteners and in order to couple the shaft 2808 to the second frame 2806.

Figure 33:
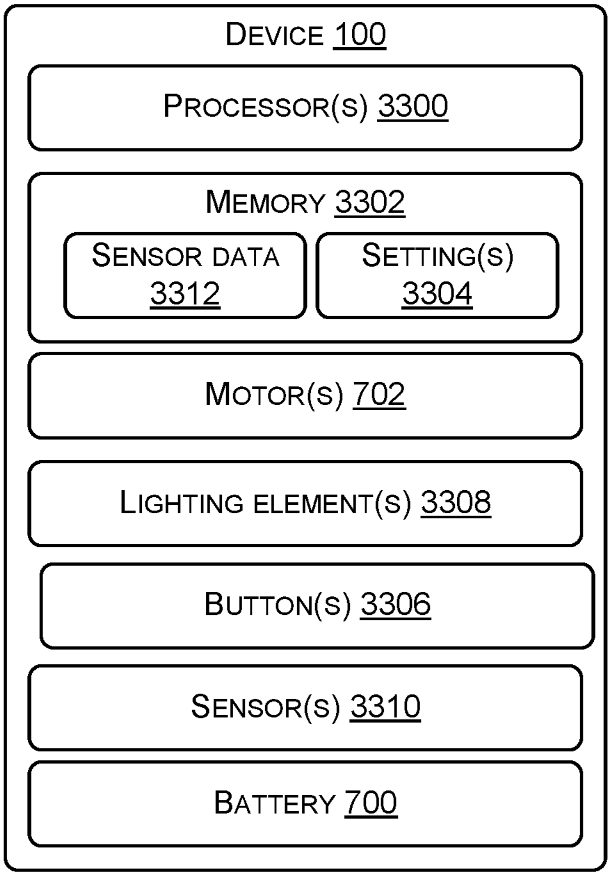
FIG. 33 illustrates example components of the device of FIG. 1, according to examples of the present disclosure.

FIG. 33 illustrates select components of the device 100, according to examples of the present disclosure. Although described as being components of the device 100, the device 2800 may include similar or different components.

The device 100 is shown including processor(s) 3300 and memory 3302, where the processor(s) 3300 may cause the device 100 to perform various functions and operations associated with providing or treating muscular pain, myofascial pain, trigger points, and the like, and the memory 3302 may store instructions executable by the processor(s) 3300 to perform the operations described herein.

The device 100 may operate according to certain setting(s) 3304. In an embodiment, the setting(s) 3304 indicate the speed of the motor(s) 702 for rotating the rotatable assembly 108. For example, the setting(s) 3304 may indicate revolutions per minute (RPMs) that the motor(s) 702 is to operate. In an embodiment, the motor(s) 702 may have different RPMs according to the speed desired of the user. In an embodiment, the motor(s) 702 may operate at five different speeds, however, the motor(s) 702 may have the ability to operate at less than five or more than five speeds. In an embodiment, the speed of the motor 702 may be received via one or more button(s) 3306 of the device 100. For example, the user may provide input to the button(s) 3306 (e.g., the first button 112) to indicate the desired speed of the motor(s) 702. The user may provide the setting(s) 3304 via the button(s) 3306 or other input components (e.g., levers, dials, etc.).

The button(s) 3306 may also include the second button 400 which, in an embodiment, corresponds to a safety button. For example, in order to adjust or set the speed of the motor(s) 702, the second button 400 may first be depressed. In other words, pressing the first button 112, without pressing the second button 400, may restrict operation of the device 100. However, pressing the second button 400, and continuing to press the second button 400 while the first button 112 is pressed, may permit operation of the device 100. After the first button 112 is depressed (with the second button 400 depressed) the second button 400 may be released in order to operate the device 100 without continuing to depress the second button 400. However, in an embodiment, the second button 400 may be depressed continuously to operate the device 100. When placed within the stand 102, the second button 400 may be depressed (e.g., in the Y-direction) via the stand 102.

In an embodiment, the speed of the motor(s) 702 may set via pressing and holding for different periods of time. For example, pressing and holding the first button 112 for a first period of time (e.g., one second) may cause the motor(s) 702 to operate at a first speed, pressing and holding the button for a second period of time, (e.g., two seconds) may cause the motor(s) 702 to operate at a second speed that is different than the first speed, and so forth. Additionally, rather than providing different inputs for different periods of time, the first button 112 may be depressed a certain number of times for changing the speed. For example, pressing the first button 112 once may cause the motor(s) 702 to operate at the first speed, pressing the first button 112 twice (e.g., consecutively) may cause the motor(s) 702 to operate at the second speed, and so forth.

The device 100 may include lighting element(s) 3308 that may output an indication of the setting(s) 3304 of the device 100, an operational state/status of the device 100, and so forth. For example, the lighting element(s) 3308 may output light to indicate whether the device 100 is powered on. The lighting element(s) 3308 may output light according to the determining speed of the motor(s) 702. For example, the lighting element(s) 3308 may output light to indicate the speed of the motor(s) 702. This may provide visual feedback to the user as to the selected speed of the motor(s) 702. In an embodiment, the lighting element(s) 3308 may output light through the light guide 1204, where each portion (e.g., section, prong, etc.) of the light guide 1204 may be capable of being individually illuminated to indicate the speed of the motor(s) 702.

The setting(s) 3304 may include other operational characteristics of the device 100 other than the speed of the motor(s) 702. For example, the setting(s) 3304 may be associated with a vibrational motor imparting vibration to the device 100, heat being generated by heater(s) of the device 100, a timing of cycle of when the motor(s) 702 turn on/off, change speed, change rotational direction, etc., and so forth. As such, it is to be understood that the user, or rather the device 100, may operate according to the setting(s) 3304 to provide or treat muscular pain, myofascial pain, trigger points, and the like.

Although the device 100 is shown including certain components, the device 100 may include additional or alternative components other than those described. For example, the device 100 may include speaker(s) for outputting sound (e.g., sound associated with the setting(s) 3304, sound associated with a training/therapy session for the user, etc.), microphone(s) for capturing sound (e.g., user speech, voice commands, etc.), vibrational motors, heaters for generating heat, network interface(s) for communicating with one or more device(s) (e.g., mobile phone), and so forth.

The device 100 further includes the battery 700 for providing the device 100, and components therein, with power. For example, the battery 700 may be coupled to the motor(s) 702. In an embodiment, the motor 702 may represent a brushless motor. The battery 700 may also be recharged (e.g., via the port) and/or replaceable.

The device 100 may also include sensor(s) 3310 that generate sensor data 3312. The sensor(s) 3310 may include temperature sensor(s), ammeter sensor(s), voltage sensor(s), etc. In an embodiment, the sensor(s) 3310 may measure a current (e.g., draw) on the motor(s) 702, where the sensor data 3312 indicates the current supplied to the motor(s) 702. The sensor data 3312 may be used to dynamically adjust the setting(s) 3304 of the device 100, for example, based on the resistance to the motor(s) 702. If the user changes an amount of force by which the device 100 (e.g., the rotatable assembly 108) is pressed against their body (e.g., legs, arms, etc.), the speed of the motor(s) 702 and therefore the rotatable assembly 108, may reduce. The sensor(s) 3310 may measure the draw on the motor(s) 702, and if the draw is greater than a certain threshold for a certain period of time, the motor(s) 702 may dynamically increase in speed to account for the increased resistance.

To illustrate, suppose that the user selects the fourth setting (e.g., speed) of the motor(s) 702. At this setting, the motor(s) 702 may rotate the rotatable assembly 108 at a certain speed. During use, if the user presses the rotatable assembly 108 against their body with a certain amount of force, the rotatable assembly 108 may be rotated at a slower speed than desired (e.g., less than. That is, the force may provide resistance to the motor(s) 702, and as a result, the rotatable assembly 108 may not rotate according to the desired speed. If the resistance on the motor(s) 702 is greater than a threshold for a threshold period of time, the device 100 may cause an increased current to be supplied to the motor(s) 702 for rotating at the desired speed. In doing so, the user may be capable of applying the device 100 to their body at a given force without sacrificing the speed at which the rotatable assembly 108 rotates. Upon removal of the device 100, less resistance is provided to the motor(s) 702 and consequently, the motor(s) 702 may rotate the rotatable assembly 108 at higher speeds. However, if the draw on the motor(s) 702 is less than the threshold for the threshold period of time, the device 100 may cause a decreased current to be supplied to the motor(s) 702 to decrease its speed.

As used herein, a processor, such as the processor(s) 3300, may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 3302, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s). The memory 3302 are examples of non-transitory computer-readable media. The memory 3302 may store an operating system and one or more software applications, instructions, programs, and/or data to implement the methods described herein and the functions attributed to the various systems.

Figure 34:
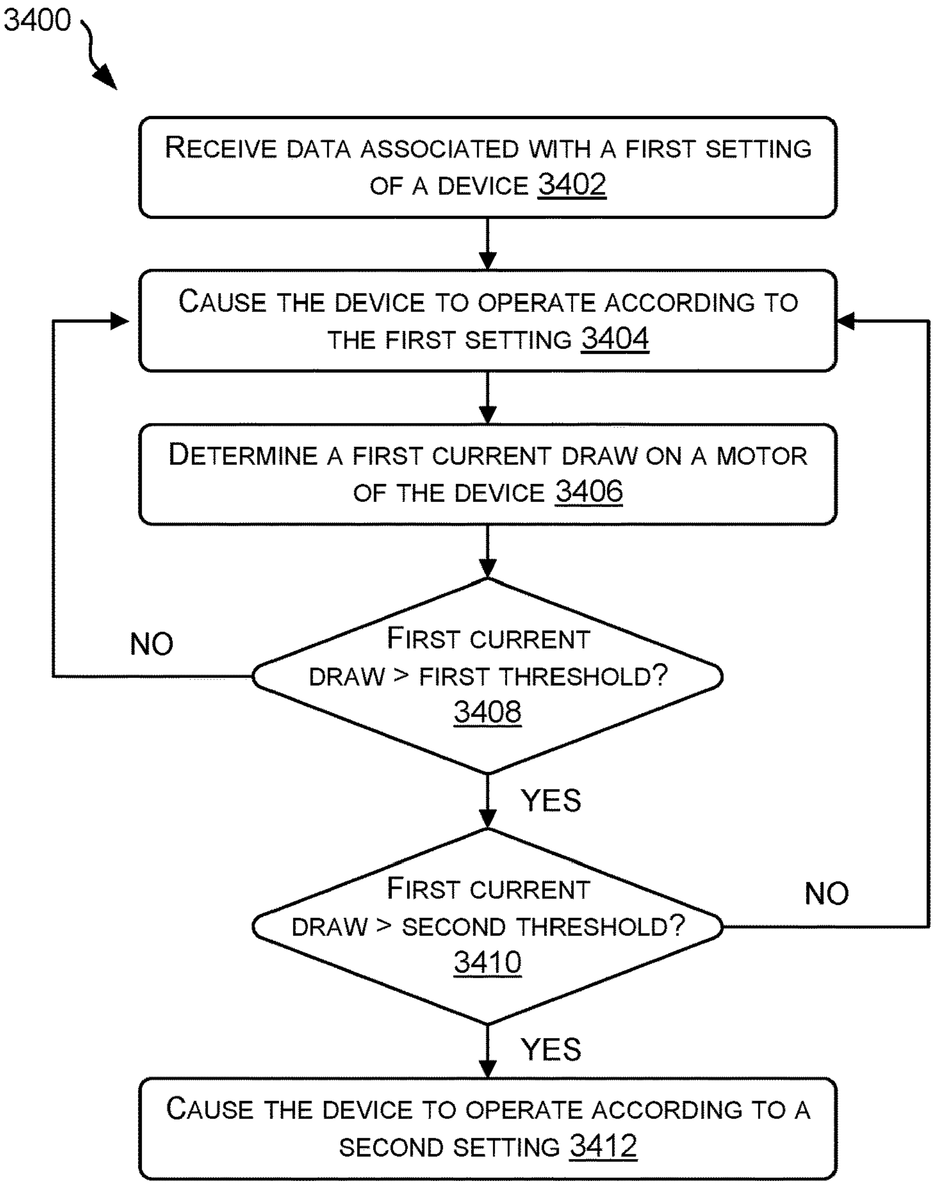
FIG. 34 illustrates an example process carried out at least in part by the device of FIG. 1 or the device of FIG. 28, according to examples of the present disclosure.

FIG. 34 illustrates an example process 3400 for at least partially controlling an operation of the device 100 and/or the device 2800, according to examples of the present disclosure. The process 3400 described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the process 3400 is described with reference to the environments, architectures, devices, and systems described in the examples herein, such as, for example those described with respect to FIGS. 1-33, although the process 3400 may be implemented in a wide variety of other environments, architectures, devices, and systems.

At 3402, the process 3400 may include receiving data associated with a first setting of a device. For example, the processor(s) 3300 may detect an input to one or more button(s) of the device 100 for at least partially controlling the device 100. In an embodiment, the setting of the device 100 is associated with a speed of the motor(s) 702 that rotates the rotatable assembly 108. Accordingly, the setting of the device 100 may corresponding to a speed at which the rotatable assembly 108 rotates, via the motor(s) 702. The user, for example, may have the ability to control the setting such that the rotatable assembly 108 rotates at different speeds.

At 3404, the process 3400 may include causing the device to operate according to the first setting. For example, after receiving the first data or as part of receiving the first data, the processor(s) 3300 may cause the motor(s) 702 to power on or otherwise rotate the rotatable assembly 108 according to the desired setting. In an embodiment, causing the device 100 to operate according to the desired setting may include causing a first amount of current to be supplied to the motor(s) 702 for rotating the rotatable assembly 108 at the selected speed.

At 3406, the process 3400 may include determining a current draw on a motor of the device. For example, while operating at the setting, the processor(s) 3300 may determine a current draw on the motor(s) 702. The current draw may correspond to an amount of current supplied to the motor(s) 702 to rotate the rotatable assembly 108 at the selected setting (e.g., speed). Sensor(s), for example, may measure the current draw.

At 3408, the process 3400 may include determining whether the current draw is greater than a first threshold. For example, using the current draw on the motor(s) 702, from 3406, the process 3400 may determine whether the current draw is greater than a first threshold. In an embodiment, the first threshold may be based at least in part on the current supplied to the motor(s) 702 to operate the device 100 at the desired setting. That is, to rotate the rotatable assembly 108 at the desired speed, the motor(s) 702 may be supplied a certain current (e.g., 3 Amps). The first threshold may be determined based on the current supplied to rotate the rotatable assembly 108 at the desired speed. So, the first threshold may be 4 Amps. Comparatively, if a different speed is selected, such as a faster speed, the current to rotate the rotatable assembly 108 at the desired speed may be 5 Amps. For that setting, the threshold may be 6 Amps. In an embodiment, the current draw may be an average current over a certain window of time (e.g., five seconds). Accordingly, the first threshold by which to compare the current draw may be based at least in part on the baseline current for rotating the rotatable assembly 108 at the selected speed.

If at 3408 the process 3400 determines that the current draw is not greater than the threshold, the process 3400 may follow the "NO" route and loop to 3404 to continue operating the device 100 at the first setting. Comparatively, if at 3408 the process 3400 determines that the current draw is greater than the first threshold, the process 3400 may follow the "YES" route and proceed to 3410.

At 3410, the process 3400 may include determining whether the current draw is greater than a second threshold. In an embodiment, the second threshold may be associated with a threshold period of time. For example, the process 340 may determine whether the current draw is greater than the threshold current draw (e.g., the first threshold) for a threshold period of time (e.g., the second threshold). In an embodiment, the threshold period of time may be one second, two seconds, five seconds, etc. Determining whether the current draw is greater than the threshold current draw for the threshold period of time may avoid inadvertently changing the first setting of the device 100. If at 3410 the process 3400 determines that the current draw is not greater than the first threshold for the second threshold (e.g., the threshold period of time), the process 3400 may follow the "NO" route and loop to 3404 to continue operating the device 100 at the first setting. Comparatively, if the process 3400 determines that the current draw is greater than the first threshold for the second threshold, the process 3400 may follow the "YES" route and proceed to 3412.

At 3412, the process 3400 may include causing the device to operate according to a second setting. For example, although the first setting was selected to rotate the rotatable assembly 108 at a certain speed, the user may be suppling sufficient force to the device 100 (and therefore, to the rotatable assembly 108) to cause the rotatable assembly 108 to rotate at a speed that is less than the selected speed (e.g., given the resistance imparted to the motor(s) 702). In this scenario, the device 100 may cause an increased current to be supplied to the motor(s) 702 such that, at the resistance at which user presses the rotatable assembly 108 into/other their body, the rotatable assembly 108 rotates at the selected speed. This real-time adjustment therefore adapts to the use of the device 100 by the user for operating at the selected speed.

Upon removal of the device 100, less resistance is provided to the motor(s) 702 and consequently, the motor(s) 702 may rotate the rotatable assembly 108 at higher speeds than desired. Here, the current draw on the motor(s) 702 may be determined, and if the current draw on the motor(s) 702 is less than the threshold for the threshold period of time, the device 100 may cause a decreased current to be supplied to the motor(s) 702 to decrease its speed.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A device comprising:

a first assembly including:
- a first handle,
- a battery,
- a motor, and
- a gearbox coupled to the motor;

a second assembly coupled to the first assembly, the second assembly including a second handle; and a rotatable assembly rotatably coupled to the first assembly and the second assembly, the rotatable assembly including:
- a gear engaged by the gearbox,
- a first base,
- a second base,
- shafts disposed between the first base and the second base,
- first rotatable elements disposed and configured to rotate about a first portion of the shafts,
- second rotatable elements disposed and configured to rotate about a second portion of the shafts,
- first tabs disposed on the first base, wherein individual first tabs of the first tabs are disposed in between individual first rotatable elements of the first rotatable elements and individual second rotatable elements of the second rotatable elements, and second tabs disposed on the second base, wherein individual second tabs of the second tabs are disposed in between the individual first rotatable elements and the individual second rotatable elements.

2. The device of claim 1, wherein the first assembly further includes:

a first button disposed on a first side of the first handle;

a second button disposed on a second side of the first handle; and a switch disposed on the second side of the first handle.

3. The device of claim 1, wherein the first assembly further includes one or more lighting elements configured to illuminate according to a setting of the motor.

4. The device of claim 1, wherein:

the first assembly is formed at least in part by a first housing and a second housing;

the gearbox includes a second gear and a third gear;

the second gear is disposed at least partially through a first opening in the first housing for engaging with the gear; and the third gear is disposed at least partially through a second opening in the second housing for engaging with the gear.

5. The device of claim 1, wherein:

the first rotatable elements include first myofascial features; and the second rotatable elements include second myofascial features that are different than the first myofascial features.

6. The device of claim 1, wherein:

the rotatable assembly includes:

first posts extending from the first base, and second posts extending from the second base; and individual first posts of the first posts couple to individual second posts of the second posts for forming the shafts.

* * * * *